(12) United States Patent
Lynn

(10) Patent No.: US 9,777,669 B2
(45) Date of Patent: Oct. 3, 2017

(54) THERMODYNAMIC MACHINE

(71) Applicant: Xeicle Limited, Central, Hong Kong (CN)

(72) Inventor: Robert Gulliver Lynn, Ashburton (NZ)

(73) Assignee: Xeicle Limited, Hong Kong (CN)

( * ) Notice: Subject to any disclaimer, the term of this patent is extended or adjusted under 35 U.S.C. 154(b) by 167 days.

(21) Appl. No.: 14/787,676

(22) PCT Filed: Apr. 29, 2014

(86) PCT No.: PCT/NZ2014/000078
§ 371 (c)(1),
(2) Date: Oct. 28, 2015

(87) PCT Pub. No.: WO2014/178732
PCT Pub. Date: Nov. 6, 2014

(65) Prior Publication Data
US 2016/0102631 A1    Apr. 14, 2016

(30) Foreign Application Priority Data

Apr. 29, 2013 (NZ) .......... 609950
Jul. 19, 2013 (NZ) .......... 613431

(51) Int. Cl.
*F02G 1/055* (2006.01)
*F02C 1/10* (2006.01)
(Continued)

(52) U.S. Cl.
CPC ........ *F02G 1/055* (2013.01); *F01K 11/04* (2013.01); *F01K 25/00* (2013.01); *F02C 1/10* (2013.01); *Y02T 50/672* (2013.01)

(58) Field of Classification Search
CPC .......... F02G 1/055; F01K 11/04; F01K 25/00; F02C 1/10; Y02T 50/672
(Continued)

(56) References Cited

U.S. PATENT DOCUMENTS 2,597,249 A * 5/1952 Kollsman ............... F02C 1/105
                                                    60/39.38
3,613,368 A * 10/1971 Doerner ................. F01K 11/04
                                                    122/11
(Continued)

FOREIGN PATENT DOCUMENTS

EP    EO 2 489 839    8/2012

OTHER PUBLICATIONS

International Search Report for International Application No. PCT/NZ2014/000078 mailed Nov. 10, 2014 (3 pages).

*Primary Examiner* — Hoang Nguyen
(74) *Attorney, Agent, or Firm* — Merchant & Gould P.C.

(57) ABSTRACT

A thermodynamic machine, comprising: a rotor, configured to rotate about a rotor axis, a working fluid circulation path and a coolant fluid path formed within the rotor, the coolant fluid path fluidically isolated from the working fluid circulation path, the working fluid circulation path spanning radially from the rotor axis to close to the periphery of the rotor; a working fluid circulation drive configured to drive the circulation of a working fluid about the working fluid circulation path; at least one working fluid cooler heat exchanger formed as part of the working fluid circulation path and the coolant fluid path, in use coolant fluid passing through the working fluid cooler heat exchanger to transfer heat from the working fluid to the coolant fluid, and; a working fluid heater in the working fluid circulation path configured to heat a working fluid circulating around the working fluid circulation path.

48 Claims, 16 Drawing Sheets

(51) Int. Cl.
*F01K 11/04* (2006.01)
*F01K 25/00* (2006.01)

(58) Field of Classification Search
USPC .......................................... 60/650, 682–684
See application file for complete search history.

(56) References Cited

U.S. PATENT DOCUMENTS

| | | | | |
|---|---|---|---|---|
| 3,931,713 | A | * | 1/1976 | Eskeli ....................... F01D 1/32 |
| | | | | 60/650 |
| 4,004,426 | A | | 1/1977 | Laing |
| 7,748,220 | B2 | | 7/2010 | Hirschmanner |
| 8,051,655 | B2 | * | 11/2011 | Silver ....................... F02C 1/10 |
| | | | | 60/516 |

* cited by examiner

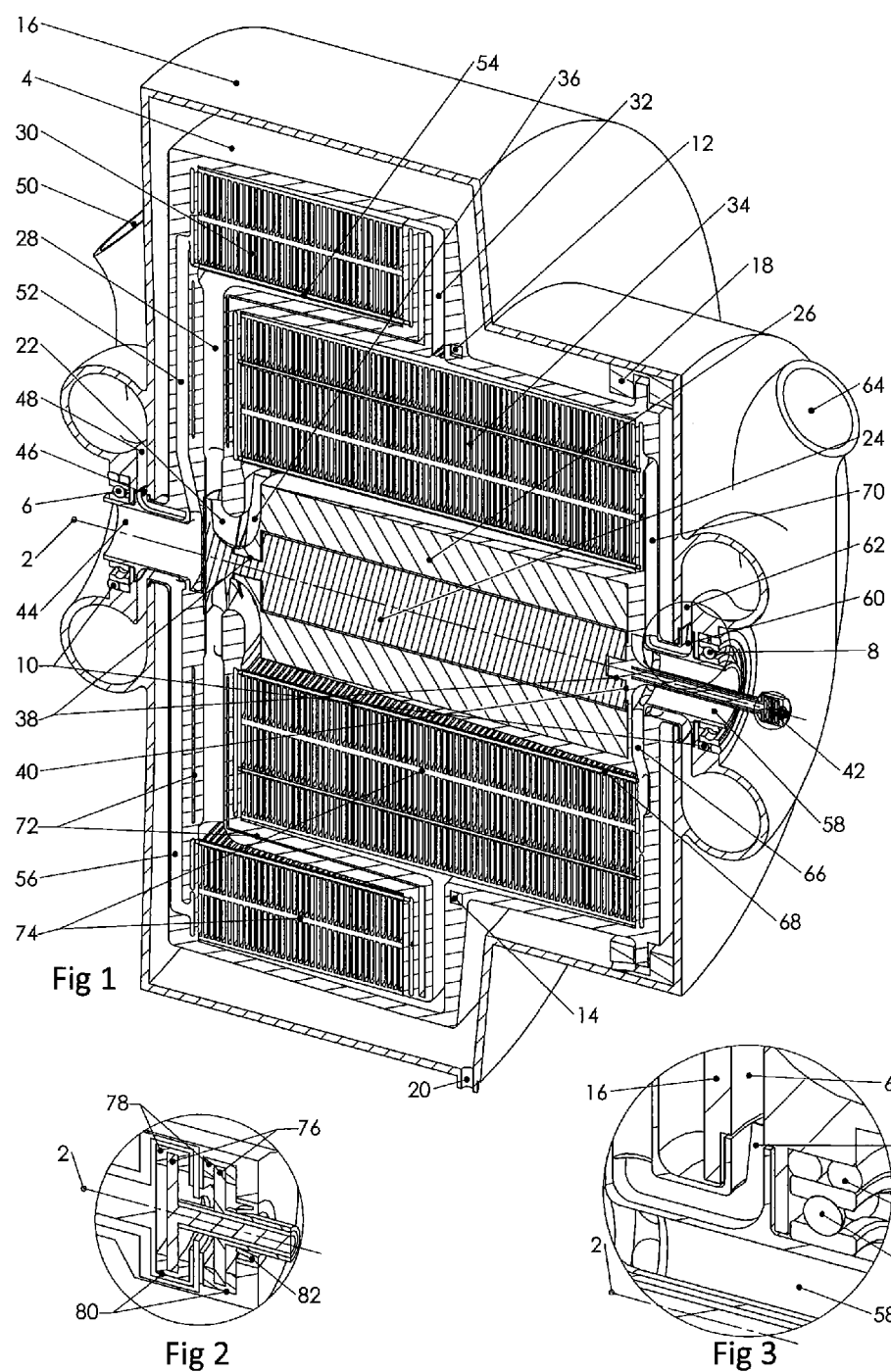

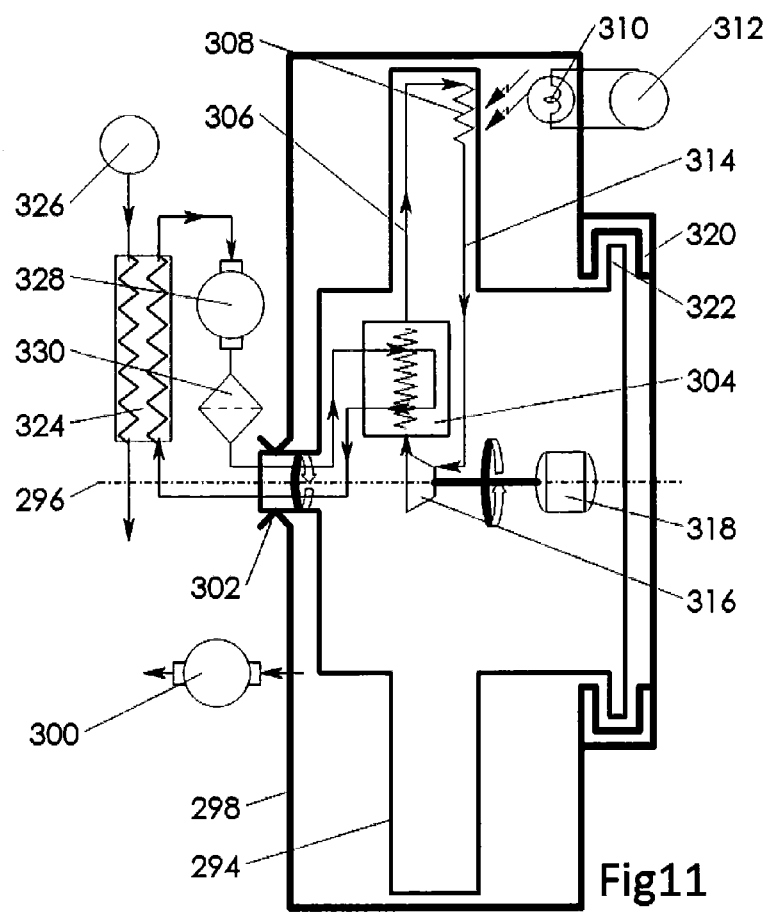
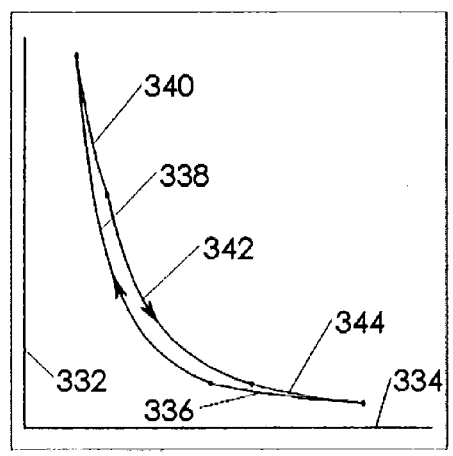
Fig12
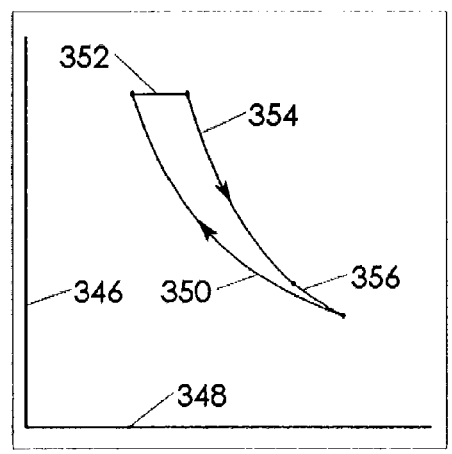
Fig13

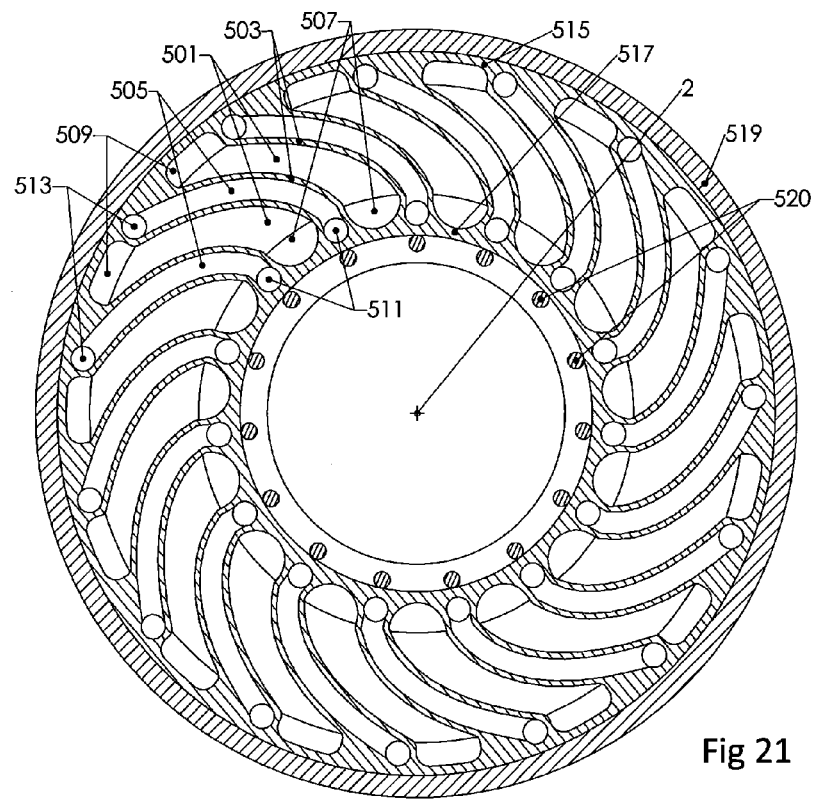
Fig 21
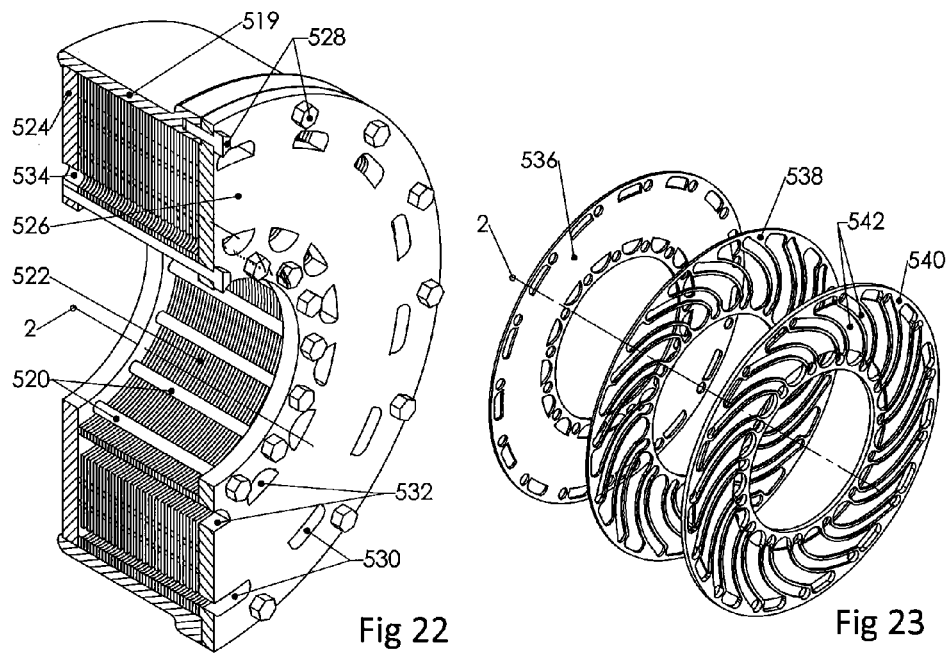
Fig 22
Fig 23

THERMODYNAMIC MACHINE

This application is a National Stage Application of PCT/NZ2014/000078, filed 29 Apr. 2014, which claims benefit of Serial No. 609950, filed 29 Apr. 2013 in New Zealand and Serial No. 613431, filed 19 Jul. 2013 in New Zealand and which applications are incorporated herein by reference. To the extent appropriate, a claim of priority is made to each of the above disclosed applications.

FIELD OF THE INVENTION

The present invention relates to a thermodynamic machine. More particularly, the invention relates to a closed cycle heat pump or engine having a rotor that rotates and contains rare or noble gases as the working fluid that are sealed within the rotor and undergo cyclical thermodynamic processes. Even more particularly the rotor in some configurations rotates within a sealed and evacuated casing with ports at one or both ends of the rotor to allow cooling and heating fluids to enter and exit the rotor through rotor fluid ports, and in some configurations through rotary vacuum seals that seal the fluids from the evacuated casing. Even more particularly, the invention relates to a closed cycle heat pump or engine with compact radial spiral heat exchangers. Even more particularly, the invention relates to a closed cycle heat pump or engine where external liquids (coolant fluid and heating fluid/s) are passed to and from the rotor at opposite ends of rotor to reduce unwanted conduction.

BACKGROUND TO THE INVENTION

Heat pumps use input energy to drive the transport of heat energy from a cold heat source to a warm heat sink, thereby cooling the cold heat source (acting as a cooler) and heating the warm heat sink (acting as a heater). Most conventional heat pumps utilise a compressor driven by an electric motor or other mechanical power source to raise the pressure and temperature of the working fluid. However in the case of absorption heat pumps changes in temperature of absorption liquids or solids are used to cyclically absorb a working fluid at lower pressure and then release it at a higher pressure thereby effectively pumping the working fluid by non-mechanical means but with typically low efficiency. Similarly Vuilleumier cycle heat pumps utilise a high temperature input of heat energy to drive a heat pumping cycle between a cold heat source and warm heat sink, but have not been widely used due to difficulties with economic implementation.

Much energy consumption is for domestic and industrial heating and cooling. Electricity is a common medium by which this power is distributed and is typically a high cost source of energy due to generation and distribution costs that frequently make it several times the cost of an equivalent quantity of heat energy available to them from other sources such as geothermal heat, natural gas, other combustible fuels, solar, nuclear or waste heat sources. It is therefore a primary goal of the current invention to enable an alternative means of heating and cooling that may utilise energy sources that are cheaper than electricity and additionally to provide a method by which mechanical or electrical power may be more economically generated from some sources of energy, or to at least offer the public a useful choice.

Waste heat streams in the form of hot fluids like engine exhausts, cooling fluids and other hot industrial fluids are frequently large in size but uneconomic to exploit, with many existing methods of utilising that energy only able to utilise a relatively small proportion of the heat energy, leaving a large amount of heat energy in the fluid at temperatures still far above ambient temperatures. It is therefore a goal of the invention to offer novel heat pumps and engines that may utilise a larger proportion of the heat energy in a waste heat fluid stream for useful purposes, or to at least offer the public a useful choice.

Refrigeration and heating are frequently provided by means of heat pumps that cyclically compress and expand gaseous working fluids that are also heated and cooled and may undergo phase changes at one or more parts of the thermodynamic cycle. The compression and expansion processes frequently have inefficiencies that reduce overall efficiency. Similarly in engines the compression and expansion processes are often inefficient, reducing engine efficiency. Phase changes in the working fluid in engines and heat pumps may also increase energy losses. It is therefore an object of this invention to offer novel heat pumps and engines that have relatively high efficiencies by means of utilising highly efficient expansion and compression processes, as well as partly or wholly avoiding phase changes in the working fluid, or to at least offer the public a useful choice.

Many applications require heat sources at temperatures over 100° C., frequently provided by the burning fuels or electrical heating. Heat pump usage for high temperature applications is rare due to the lower price of heating fuels compared to electricity used in low efficiency high temperature electrically driven heat pumps. It is therefore an object of this invention to offer novel heat pumps that may be more economic for heating to temperatures in excess of 100° C. using high temperature heat sources or electricity as the energy input, or to at least offer the public a useful choice. Some power sources are intermittent, unreliable or inadequate in size to power a heat pump of required capacity at all times. It is therefore an object of this invention to offer a novel heat pump that may utilise more than one source of energy to power its operation, or to at least offer the public a useful choice.

The operating temperature ranges of many heat pump cycles are heavily dependent upon the critical temperature of the working fluid utilised. This may restrict the temperature range that a heat pump design may operate over. It is therefore an object of this invention to offer a novel heat pump design that may be modified to service a wide range of temperatures, or to at least off the public a useful choice.

Many heat pumps require auxiliary electric heaters to limit ice accumulation from air. It is therefore an object of this invention to offer a novel heat pump in which the de-icing of atmospheric heat exchangers does not require the use of an auxiliary electric heater, or to at least offer the public a useful choice.

Stirling Cycle engines produce mechanical power from heat sources and when driven by a motor may operate as heat pumps in applications such as cryogenic cooling. The Vuilleumier Cycle is a modified Stirling Cycle that operates as a heat pump powered by high temperature heat energy input. To date apart from some niche applications neither Stirling Cycle nor Vuilleumier Cycle have found widespread application due to high costs, weight and bulk, and in some cases unreliability. It is therefore an object of this invention to provide novel engines and heat pumps with higher efficiency and/or lower costs than Stirling and Vuilleumier Cycle machines for many fields of application, or to at least offer the public a useful choice.

A number of inventors have discovered and innovated upon the idea of utilising highly efficient compression and expansion of gaseous working fluids by centrifugal forces within a rotor as thermodynamic processes within both engines and heat pumps. Several inventors have also identified the use of Xenon as a preferred working fluid and some have also identified the benefits of cooling or heating the working fluid while it is undergoing compression or expansion as a way of approximating the ideal isothermal processes of the optimally efficient Carnot cycle. Additionally the benefits of evacuating a casing within which the rotor spins has been recorded. However these inventors failed to teach effective practical means for implementing machines based upon these principles given the extremely high centrifugal stresses created in high speed rotors.

Further objects and advantages of the invention will be brought out in the following portions of the specification, wherein the detailed description is for the purpose of fully disclosing the preferred embodiment of the invention without placing limitations thereon.

The background discussion (including any potential prior art) is not to be taken as an admission of the common general knowledge.

SUMMARY OF THE INVENTION

In a first aspect, the invention may broadly be said to consist in a thermodynamic machine, comprising: a rotor, configured to rotate about a rotor axis in use, a working fluid circulation path and at least one coolant fluid path formed within the rotor, the coolant fluid path fluidically isolated from the working fluid circulation path, the working fluid circulation path spanning substantially radially from at or near the rotor axis to close to the periphery of the rotor, a working fluid circulation drive configured to drive the circulation of a working fluid about the working fluid circulation path;
  at least one working fluid cooler heat exchanger formed as part of the working fluid circulation path and the coolant fluid path, and configured so that in use coolant fluid passing through the working fluid cooler heat exchanger is in close proximity to working fluid so that heat is transferred from the working fluid to the coolant fluid, and;
  at least one working fluid heater formed as part of the working fluid circulation path within the rotor configured to heat a working fluid circulating around the working fluid circulation path.

Preferably the thermodynamic machine further comprises a working fluid primarily composed of one or more of xenon, krypton, or argon.

Preferably the working fluid is xenon, in use at a minimum pressure below 5 MPa within the working fluid circulation path within the rotor.

Preferably the thermodynamic machine further comprises a casing, the rotor at least partially enclosed within the casing.

Preferably in use the casing is partially evacuated relative to atmosphere outside casing to reduce the density of gases within the casing.

Preferably the working fluid path is configured so that in use the working fluid flows through the at least one working fluid cooler heat exchanger in a substantially radially outwards direction from the rotor axis.

Preferably the working fluid path is configured so that in use the working fluid flows through the at least one working fluid heater in a substantially radially inwards direction towards the rotor axis.

Preferably the working fluid circulation path incorporates at least one section formed as an expansion passage extending over a radial span and through which the working fluid flows from a larger radius to a smaller radius.

Preferably the working fluid circulation path incorporates a plurality of expansion passage sections extending over a radial span through which the working fluid flows in parallel from a larger radius to a smaller radius in use.

Preferably the expansion passages are distributed circumferentially around the rotor axis.

Preferably the working fluid circulation path incorporates at least one section formed as a compression passage extending over a radial span and through which the working fluid flows from a smaller radius to a larger radius in use.

Preferably the working fluid circulation path incorporates a plurality of compression passage sections extending over a radial span through which the working fluid flows in parallel from a smaller radius to a larger radius in use.

Preferably the compression passages are distributed circumferentially around the rotor axis.

Preferably the working fluid circulation path comprises one or more compression passages configured so that in use as the working fluid flows substantially radially outwards therethrough, the working fluid undergoes substantially adiabatic compression with little or no heat transfer into or out of the working fluid.

Preferably the working fluid circulation path comprises one or more expansion passages configured so that in use as the working fluid flows substantially radially inwards therethrough, the working fluid undergoes expansion with little or no heat transfer into or out of the working fluid.

Preferably the thermodynamic machine further comprises a hot working fluid heater and wherein the working fluid circulation path is at least in part configured to act as a centrifugal thermosiphon for the working fluid, so that heat energy input is made within the hot working fluid heater to the working fluid circulating around the working fluid circulation path at an average radius that is greater than the average radius where that same heat energy is extracted from the working fluid.

Preferably the centrifugal thermosiphon heat energy input to the working fluid is made at or near the outermost radius of the rotor.

Preferably the centrifugal thermosiphon heat energy input to the working fluid is made in the hot working fluid heater.

Preferably the hot working fluid heater is configured to be heated primarily by a hot heating fluid that enters and exits the rotor at or near the rotor axis.

Preferably the hot working fluid heater comprises a counterflow hot working fluid heater having a working fluid path and a hot heating fluid path, configured so that in use the working fluid exits the counterflow hot working fluid heater directly adjacent to the entry for the hot heating fluid.

Preferably the counterflow hot working fluid heater is configured so that the working fluid exiting the counterflow hot working fluid heater is hotter than the hot heating fluid exiting the counterflow hot working fluid heater.

Preferably the thermodynamic machine further comprises a radiative receiver configured to receive heat energy by way of radiative heat transfer from a radiant heat source, the hot working fluid heater heated by conduction from the radiative receiver.

Preferably the hot working fluid heater is configured so that a majority of the heat energy added to the working fluid flowing through the hot working fluid heater is added while the working fluid is flowing from a larger radius to a smaller radius.

Preferably the thermodynamic machine is configured to in use absorb heat energy from a cold heat transfer fluid and transfer it to a warm heat transfer fluid at a higher temperature to the cold heat transfer fluid.

Preferably the at least one working fluid heater is a cold working fluid heater configured so that in use a working fluid flowing therethrough will absorb heat energy from a cold heat transfer fluid flowing through the cold working fluid heater.

Preferably the at least one working fluid cooler is configured so that in use a working fluid flowing therethrough will transfer heat energy into a warm heat transfer fluid that is a coolant fluid flowing through the working fluid cooler.

Preferably the working fluid circulation path and coolant fluid path are configured so that in use each of the cold heat transfer fluid and the warm heat transfer fluid both enter and exit the rotor at or near the rotor axis.

Preferably the working fluid circulation drive comprises a compressor within the rotor.

Preferably the working fluid circulation path is configured so that the working fluid in use flows continually in a sequential loop through a compressor at or near the rotor axis, radially outwards through one or more compression passages, radially outwards through the working fluid cooler transferring heat to the warm heat transfer fluid, radially inwards though one or more expansion passages, radially inwards through the cold working fluid heater absorbing heat energy from the cold heat transfer fluid and back into the compressor.

Preferably the working fluid circulation is driven at least in part by a centrifugal thermosiphon.

Preferably the working fluid circulation path within the rotor is configured so that the working fluid in use flows continually in sequential loop radially outwards from at or near the rotor axis through one or more compression passages, through the hot working fluid heater at or near the maximum radius of the rotor, radially inwards through one or more expansion passages, radially outwards through the working fluid cooler transferring heat to the warm heat transfer fluid, radially inwards though one or more expansion passages, radially inwards through the cold working fluid heater absorbing heat energy from the cold heat transfer fluid, and back into the radially inner end(s) of the compression passage(s).

Alternatively the working fluid circulation path within the rotor is configured so that the working fluid in use flows continually in a sequential loop radially outwards from at or near the rotor axis through one or more compression passages, radially outwards through a first working fluid cooler transferring heat to the warm heat transfer fluid, radially outwards through one or more compression passages, through the hot working fluid heater at or near the maximum radius of the rotor, radially inwards through one or more expansion passages, radially outwards through a second working fluid cooler transferring heat to the warm heat transfer fluid, radially inwards though one or more expansion passages, radially inwards through the cold working fluid heater absorbing heat energy from the cold heat transfer fluid, and back into the radially inner end(s) of the compression passage(s).

Alternatively the working fluid circulation path within the rotor is configured so that the working fluid in use flows continually in a sequential loop radially outwards from at or near the rotor axis through one or more compression passages, radially outwards through a first working fluid cooler transferring heat to the warm heat transfer fluid, through the hot working fluid heater at or near the maximum radius of the rotor, radially inwards through one or more expansion passages, radially inwards through the cold working fluid heater absorbing heat energy from the cold heat transfer fluid, and back into the radial inner end(s) of the initial compression passage(s).

Preferably the thermodynamic machine further comprises a compressor located in the working fluid circulation path within the rotor immediately after the cold working fluid heater, the compressor operable to at least partly drive circulation of the working fluid.

Preferably the warm heat transfer fluid enters and exits the rotor at the opposite end to the cold heat transfer fluid.

Preferably the coolant fluid in use is maintained at a temperature above 100° C.

Preferably the thermodynamic machine is adapted to operate as an engine.

Preferably the outer radial extent of the hot working fluid heater is located at or near the periphery of the rotor and the inner radial extent of the working fluid cooler is located closer to the rotor axis than the inner radial extent of the hot working fluid heater so that the working fluid is driven within the rotor by a working fluid centrifugal thermosiphon.

Preferably the thermodynamic machine further comprises a turbine at or near the rotor axis configured to extract power from the pressure gain created in the circulating working fluid.

Preferably the working fluid circulation path is configured so that in use the working fluid flows continually in a sequential loop through a turbine at or near the rotor axis, radially outwards through the working fluid cooler transferring heat to the coolant fluid, radially outwards through one or more compression passages, through the hot working fluid heater at or near the maximum radius of the rotor, radially inwards through one or more expansion passages, and back into the turbine.

Preferably the working fluid circulation path is configured so that in use the working fluid flows continually in a sequential loop through a turbine at or near the rotor axis, radially outwards through the working fluid cooler transferring heat to the coolant fluid, through the hot working fluid heater at or near the maximum radius of the rotor, radially inwards through one or more expansion passages, and back into the turbine.

Preferably the thermodynamic machine is configured so that in use the temperature of the working fluid flowing out of the turbine is at a temperature within 50 degrees Kelvin of the coolant fluid temperature.

Preferably the fluid paths are configured so that in use the hot heating fluid and coolant fluid enter and exit the rotor at opposed ends or sides.

Preferably the thermodynamic machine further comprises at least one reservoir for one or more of: the hot heating fluid, the warm heat transfer fluid, the cold heat transfer fluid, the reservoir or reservoirs located external to the rotor.

Preferably the working fluid circulation path comprises one or more radially inwards facing working fluid condensation collection cavities of revolution arranged around the rotor axis at or close to the outer radius of the coldest heat exchanger within the rotor in which condensed working fluid may accumulate.

Preferably the one or more heat exchangers have the general form of an annular body of revolution about the rotor axis penetrated by multiple parallel flow working fluid flow channels having the general overall form of spirals that are separated axially by fins and circumferentially by spiral walls centred on the rotor axis that connect the inner and outer radial surfaces of the heat exchanger and that are arrayed circumferentially and axially within the heat exchanger.

Preferably the working fluid flow channels within the one or more heat exchangers are at least in part formed from axial layers of metallic foil component parts bonded together into a monolithic body.

Preferably the axial layers of metallic foil component parts are bonded by brazing of a surface coating alloy that is present on at least some of the metallic foil component parts of the heat exchanger.

Preferably the working fluid flow channels within the one or more heat exchanger are formed as spaces between axially adjacent annular discs separated by multiple spiral fingers substantially evenly arrayed about the rotor axis and axially aligned through all axial layers so as to provide continuous axial columns of material parallel to the rotor axis having the general form of axial spiral columns.

Preferably the working fluid flow channels within the at least one heat exchanger are formed as spaces between axial layers of substantially circular arrays of substantially identical spiral segments spaced evenly and at constant radius around the rotor axis to form circular arrays, adjacent circular arrays angularly offset around the rotor axis to create consistent overlapping joints along their lateral spiral edges, the overlapping joints between successive circular arrays axially aligned to provide continuous axial columns of material parallel to the rotor axis that are in general form axial spiral columns.

Preferably the heat exchanger or heat exchangers further have a plurality of axial fluid tubes penetrating axially through the axial spiral columns, aligned parallel to the axis of rotation and configured to allow the passage of fluid therethrough to enable heat transfer to or from the working fluid.

Preferably the inner surfaces of the axial fluid tubes of the heat exchanger or heat exchangers are sealed against fluid leakage by one or more processes from a list that includes: insertion and bonding of a smaller tube within the axial fluid tube, metal plating, fusion welding or brazing, application of a polymeric sealant.

Preferably the heat exchanger forms a substantially annular body about the rotor axis, the working fluid circulation path within the heat exchanger configured so that the working fluid flows radially inwards or outwards through multiple working fluid flow channels simultaneously, each channel shaped to spiral outwards from the rotor axis, the working fluid flow spiral channels arrayed circumferentially and axially.

Preferably the spiral channels reduce in cross-sectional area with increasing radius.

Preferably the heat exchanger further comprises multiple coolant fluid channels and/or heating fluid channels shaped to spiral outwards from the rotor axis, the coolant fluid or heating fluid channels arrayed circumferentially and axially so that the coolant fluid or heating fluid flows through multiple spiral channels radially inwards or outwards simultaneously and in fluid isolation from the working fluid.

Preferably in use coolant and working fluid flows radially outwards through their respective heat exchanger spiral channels.

Alternatively in use heating fluid flows radially outwards through the heat exchanger while working fluid flows radially inwards, each fluid flowing through their respective heat exchanger spiral channels.

Preferably the flow channels and/or the axial flow tubes are configured so that in operation one or both fluids flowing through the heat exchanger flow with laminar flow and/or an average bulk flow speed within a channel or tube of below $2\ \mathrm{m\cdot s^{-1}}$.

Preferably the spiral flow channels for each fluid are axially arrayed to form axial spiral columns of multiple channels with the same fluid flowing though them, the columns aligned substantially parallel to the axis of the rotor, the heat exchanger further comprising a plurality of fins aligned substantially perpendicularly to the rotor axis and located in the heat exchanger to separate axially adjacent spiral flow channels.

Preferably the spiral flow channels for each fluid are axially arrayed to form axial spiral columns of multiple channels with the same fluid flowing though them, the columns twisted helically about the rotor axis, the heat exchanger further comprising a plurality of fins aligned substantially perpendicularly to the rotor axis and located in the heat exchanger to separate axially adjacent spiral flow channels.

Preferably circumferentially adjacent spiral flow channel columns alternate between conveying working fluid and conveying coolant fluid or heating fluid.

Preferably the thermodynamic machine further comprises an axial connection passage or passages at the radial inner and/or outer ends of the spiral flow channels to distribute or collect fluid flows to or from axially adjacent spiral flow channels.

Preferably the spiral channels of the heat exchanger are formed from an axial stack of generally annular outline laminates having perforations and/or other features cut through them and/or into one or both axial faces, the laminates axially stacked and bonded together into a solid generally annular or cylindrical block so that the perforations and/or features form internal fluid flow passages for working fluid and coolant fluid or heating fluid within the heat exchanger laminate stack.

Preferably the heat exchanger is configured so that there are a greater number of fins in the axial direction for one of the fluids than for the other fluid.

Preferably up to four different laminate types are used to form the laminate stack, the laminates stacked so that the stack has a repeating axial sequence within the laminate stack of 1, or 2n laminates where n is a Natural number.

Preferably the laminates in the stack are bonded together by one or more of: brazing, soldering, welding, diffusion bonding, polymeric bonding.

Preferably at least some of the component laminate parts are pre-plated or clad with soldering or brazing alloys before bonding so that the soldering or brazing alloys form a bond between the laminate parts during the laminate bonding process.

Preferably the laminate stack is of the type formed by the application of axial pressure during the bonding process.

Preferably the heat exchanger further comprises an axial end plate or plates at one or both axial ends having a thickness greater than the average of the individual laminate component parts arranged at one or both axial ends of the heat exchanger.

Preferably the structural bond between the axial end plate or plates are and laminate stack is of the type formed by the application of axial pressure to the plates and laminate stack during the bonding process.

Preferably the heat exchanger is configured so that one or both of the fluids in the heat exchanger pass through one or both of the axial end plate or plates.

Preferably the heat exchanger further comprises a substantially continuous circumferential radial outer wall at the outer diameter of the heat exchanger, and/or a substantially continuous circumferential radial inner wall at the inner diameter of the heat exchanger.

Preferably the heat exchanger further comprises radial spoke sections that extend from the radial outer ends of the spiral walls that separate the working fluid spiral flow channels and the heat transfer fluid spiral flow channels, to the enclosing cylindrical radial outer wall of the laminate stack and/or the radial inner wall of laminate stack.

Preferably the heat exchanger further comprises a tensile retaining ring of high strength material enclosing the outer radius of the laminate stack and/or the axial end plates.

Preferably in use the tensile retaining ring applies compressive pre-load on the laminate stack.

Alternatively in use the tensile retaining ring applies compressive pre-load on the axial end plates.

Preferably the structural connection between the tensile retaining ring and laminate stack and/or the axial end plate/s is of the type formed by thermal shrink fit.

Preferably the axial layers of metallic foil are formed from one or more alloys of which aluminium or copper is the majority constituent.

Alternatively the axial layers of metallic foil are formed from one or more alloys of which iron, nickel, cobalt or molybdenum is the majority constituent.

Preferably the heat exchanger further comprises axial clamping features connected and configured to in use resist axial pressure loads within the axial layers of metallic foil.

Preferably the axial clamping features are bolts.

Preferably the heat exchanger further comprises tensile load carrying material configured to carry tensile axial loads at a radius outside the outer radial extent of the spiral flow channels and/or inside the inner radial extent of the spiral flow channels.

Preferably the tensile retaining ring is configured to at least in part transmit tensile loads along the axial length of the tensile retaining ring.

Preferably the tensile retaining ring is formed from one or more alloys of which aluminium or copper is the majority constituent.

Preferably the heat exchanger is configured as a counter-flow hot working fluid heater, in use hot heating fluid flowing generally radially outwards through the counterflow hot working fluid heater, the working fluid flowing generally radially inwards through the counterflow hot working fluid heater.

Preferably the thermodynamic machine further comprises one or more of: a coolant fluid; a warm heat transfer fluid; a cold heating fluid; and/or a hot heating fluid, each of the fluids comprising a mixture of sodium and potassium.

Preferably the thermodynamic machine further comprises a coolant fluid and/or a cold heat transfer fluid each of the fluids comprising water containing a salt.

Preferably the thermodynamic machine further comprises one or more of: a warm heat transfer fluid; a cold heat transfer fluid; a coolant fluid; a hot heat transfer fluid comprising primarily water, or primarily alcohol, or a mixture of water and an alcohol.

Preferably the thermodynamic machine further comprises a cold heat transfer fluid comprising primarily water, or primarily alcohol, or a mixture of water and an alcohol.

Preferably the warm heat transfer fluid and/or the cold heat transfer fluid are water containing a salt to suppress freezing temperature.

Preferably the thermodynamic machine further comprises a hot heating fluid and wherein the largest constituent component of the hot heating fluid is one of: water, an alcohol, a hydrocarbon, lithium, sodium, potassium, hydrogen, helium.

Preferably the thermodynamic machine further comprises a filter or filters configured for filtering one or more of the fluids that enter rotor prior to the fluid or fluids entering the rotor.

Preferably the thermodynamic machine further comprises an electrical motor configured to rotate the rotor in use.

Preferably the electrical motor is located within the casing.

Preferably the electrical motor is of the axial flux type.

Preferably the thermodynamic machine further comprises at least one pump, each pump or pumps adapted to supply one or more fluids to a rotor fluid inlet or inlets.

Preferably the thermodynamic machine further comprises a pump configured to maintain the fluid flow within the rotor of either the warm heat transfer fluid, or the cold heat transfer fluid, or the coolant fluid, or the hot heating fluid, or any selection of fluids that enter the rotor, the pump integrated into a fluid outlet from the rotor, such that in use the rotor fluid outlet acts as an impeller that increases the fluid's angular momentum relative to the fluid inlet about the rotor axis and in the direction of rotor rotation.

Preferably the thermodynamic machine further comprises an off rotor heater located externally to the casing and configured to warm the cold heat transfer fluid.

Preferably the thermodynamic machine further comprises an off rotor cooler located externally to the casing and configured to cool the warm heat transfer fluid or coolant fluid.

Preferably the connections of the cold and warm heat transfer fluids to the external heat exchangers are detachable and substantially identical so that the connections can be changed around for the purpose of directing the warm heat transfer fluid to warm and thereby defrost the cold heat transfer fluid's normal external heat exchanger.

Preferably the radiant heat source is a radiator mounted within the casing.

Preferably the casing is at least partially thermally insulated to reduce heat transfer to the casing from the radiator and the rotor.

Preferably the radiator is formed from one or more radiator tubes containing gases, or liquids, or both, from which the heat energy is transferred to the radiator tube(s).

Preferably the radiator tube(s) is/are formed from metal.

Alternatively the radiator tube(s) is/are at least partially formed from ceramic.

Preferably the thermodynamic machine further comprises a boiler, fluidically connected to at least one of the radiator tubes, the radiator tubes heated by condensing gas created in the boiler.

Preferably the boiler is located so that in use condensed liquid drains back to boiler under gravity.

Preferably the thermodynamic machine further comprises lithium or sodium contained in the radiator tube(s) in gaseous and/or liquid form.

Preferably the boiler is heated by multiple heat sources of different types.

Preferably at least two of the multiple heat sources are combustion of a fuel with an oxidiser and concentrated solar radiation, each of which can be applied individually or simultaneously.

Preferably the radiator tube(s) is/are configured to be heated by combustion gases of the type produced by burning a fuel in air.

Preferably the thermodynamic machine is configured so that in use fuel and air are combined within the thermodynamic machine in a ratio that when combusted produces combustion products that contain less than 5% free oxygen by volume in the combustion gases that are exhausted from the thermodynamic machine.

Preferably fuel is mixed and combusted with air in the radiator tube(s) in distinct sequential zones as the air flows through the radiator tube(s).

Preferably the thermodynamic machine further comprises a regenerative or recuperative heat exchanger that uses heat energy from the combustion gases exhausted from the radiator tube(s) to pre-heat the in-coming air before it is combusted with fuel to heat the radiator tube(s).

Preferably the thermodynamic machine further comprises a fan at the air inlet blows air and combustion gases through the radiator tube(s).

Preferably the radiative receiver is electrically heated either by inductive heating or by radiative heating from an electrically heated resistive element.

Preferably the thermodynamic machine further comprises an aperture in the rotor casing configured so that solar radiation can be directed in use onto the radiative receiver.

Preferably the thermodynamic machine further comprises a Fresnel lens configured to concentrate solar radiation for indirectly heating the hot working fluid heater.

Preferably the radiative receiver comprises at least one generally annular radiative receiver area extending radially inwards from the periphery of one or both sides of at least one generally disc shaped radiative receiver structure formed as part of the rotor with an axis of revolution coincident with the rotor axis and extending outwards to substantially the maximum radius of the rotor.

Preferably annular radiative receiver areas extend radially inwards from the periphery of both axial sides of at least one disc shaped radiative receiver structure.

Preferably each disc shaped radiative receiver structure is metallic.

Preferably the hot working fluid heater is formed from a plurality of working fluid flow passages bonded to or formed within the disc shaped radiative receiver structure within the radial span of the annular radiative receiver area(s).

Preferably the working fluid circulation path is at least partially formed by a plurality of working fluid flow passages which are bonded to the disc.

Preferably the working fluid circulation path is at least partially formed by a plurality of passages which are interior to the disc.

Preferably for at least one disc shaped radiative receiver structure a plurality of working fluid flow passages are arranged to extend approximately radially outwards to the annular radiative receiver area or areas and are substantially evenly spaced around the rotor axis with alternating radial outward flow where the working fluid is compressed and radial inward flow where the working fluid expands.

Preferably within the radial span of the annular radiative receiver area or areas the working fluid flow passages have average cross sectional flow areas that are smaller than the average cross sectional flow area of the working fluid flow passages radially inwards from the annular radiative receiver area or areas but radially outwards of the working fluid cooler or coolers.

Preferably there are multiple disc shaped radiative receiver structures arrayed axially along the rotor, radiators attached to the casing located between each axially adjacent pair of discs.

Preferably the radiator or radiators are at least partly formed from a molybdenum alloy.

Preferably the radiative receiver or radiative receivers are at least partly formed from a molybdenum alloy.

Preferably part or all of the radiator or radiators are coated with a coating or coatings that have higher emissivity than the underlying material.

Preferably part or all of the radiative receiver or radiative receivers are coated with a coating or coatings that have higher absorptivity than the underlying material.

Preferably the radiative receivers are configured so that at least two different radiative heat sources can deliver radiant heat energy individually or simultaneously.

Preferably the thermodynamic machine further comprises a compressor that is a dynamic compressor internal to the rotor.

Preferably the compressor has an axis of rotation coincident with the rotor axis.

Preferably the compressor is a centrifugal compressor.

Alternatively the compressor is an axial flow compressor.

Preferably the compressor is a multistage compressor.

Preferably the compressor is contra-rotating with respect to the rotor.

Preferably the compressor is electrically powered by a compressor motor within the rotor.

Preferably the compressor motor incorporates permanent magnets.

Preferably an inductive rotary coupling between the spinning rotor and a stationary electrical power supply is used to deliver electricity to the compressor motor.

Preferably the total magnetic force applied to the rotor is approximately zero.

Preferably the time varying magnetic flux of the inductive rotary coupling is transferred through substantially axial faces on the rotor.

Preferably the inductive rotary coupling is integrated into the rotor electric motor to drive rotation of the rotor.

Preferably rotary sliding contact electrical slip rings between the spinning rotor and a stationary electrical power supply or electrical load are used to deliver electricity to the compressor motor.

Alternatively a liquid metal rotary electrical coupling between the spinning rotor and a stationary electrical load is used to deliver electricity to the compressor motor.

Preferably the liquid metal alloy is an alloy containing gallium.

Preferably the compressor is supported on at least one magnetic bearing.

Alternatively the compressor is supported on at least one gas lubricated bearing.

Alternatively the compressor is supported on at least one ceramic rolling element bearing.

Preferably the rolling element bearing is partially or completely sealed from the working fluid.

Preferably the thermodynamic machine further comprises a turbine that is a dynamic turbine internal to the rotor.

Preferably the turbine has an axis of rotation coincident with the rotor axis.

Preferably the turbine is a radial inflow turbine.

Alternatively the turbine is an axial flow turbine.

Preferably the turbine is a multistage turbine.

Preferably the turbine is contra-rotating with respect to the rotor.

Preferably the turbine powers a rotor generator within the rotor to produce electricity.

Preferably the turbine generator incorporates permanent magnets.

Preferably an inductive rotary coupling between the spinning rotor and a stationary electrical power supply is used to receive electricity from the turbine generator.

Preferably the total magnetic force applied to the rotor is approximately zero.

Preferably the time varying magnetic flux of the inductive rotary coupling is transferred through substantially axial faces on the rotor.

Preferably the inductive rotary coupling is integrated into the rotor electric motor to drive rotation of the rotor.

Alternatively rotary sliding contact electrical slip rings between the spinning rotor and a stationary electrical power supply or electrical load are used to receive electricity from the turbine generator.

Alternatively a liquid metal rotary electrical coupling between the spinning rotor and a stationary electrical power supply is used to receive electricity from the turbine generator.

Preferably the liquid metal alloy is an alloy containing gallium.

Preferably the turbine is supported on at least one magnetic bearing.

Alternatively the turbine is supported on at least one gas lubricated bearing.

Preferably the turbine is supported on at least one ceramic rolling element bearing.

Preferably the rolling element bearing is partially or completely sealed from the working fluid.

Preferably the thermodynamic machine further comprises at least one rotor vacuum seal sealing between the rotor and the casing, the space between the rotor and the casing adjacent the maximum radius of the rotor maintained in partial or complete fluid isolation from the ambient atmosphere surrounding the casing, one or more heat transfer fluids entering and exiting the rotor through the centre of the rotor vacuum seals.

Preferably the thermodynamic machine further comprises rotor vacuum seals located at both axial ends of the rotor.

Preferably the rotor vacuum seals at each end of the rotor are substantially the same diameter.

Preferably a vapour space maintained adjacent the higher pressure side of the one or more rotor vacuum seals has a liquid drain configured to drain any coolant fluid or heating fluid liquid that in use accumulates in this space.

Preferably the rotor is configured so that a coolant fluid or heating fluid that passes into the rotor can be drained from the spaces directly adjacent the rotor vacuum seal by gravity.

Preferably the thermodynamic machine further comprises a pump and wherein the rotor is configured so that a coolant fluid or heating fluid that passes into the rotor can be drained by the pump to maintain the vapour filled space adjacent to the rotor vacuum seal.

Preferably the pressure differential across the one or more rotor vacuum seals that seals between the rotor and the rotor casing and through which one or more coolant fluid/s and/or heating fluid/s passes is less than 50% of atmospheric pressure.

Preferably one or more of the fluids that passes into and out of the rotor has a free surface within the fluidically connected volumes that the fluid occupies outside of the rotor, the free surface maintained at a pressure substantially lower than atmospheric pressure and/or at a pressure approximately equal to the vapour pressure of the coolant fluid or heating fluid at that location.

Preferably at least one rotor vacuum seal is cooled by one or more fluids from a list that includes: coolant fluid, warm coolant fluid, cold heating fluid.

Preferably the at least one rotary vacuum seal is a barrier liquid seal having a barrier liquid that provides a gas-tight seal at the sliding interface between the stationary and rotating components of the seal, the barrier liquid seal or seals being one or more from a list that includes: hydrodynamic seals, dynamic/expeller/repeller seals, magnetic fluid seals, lubricated face seals and lubricated polymeric lip seals.

Preferably the barrier liquid seals utilise a low vapour pressure barrier fluid.

Preferably at least one rotary vacuum seal is a dynamic/expeller/repeller seal.

Alternatively at least one rotary vacuum seal is a magnetic fluid seal.

Preferably the magnetic fluid seal(s) have multiple magnetic reversing poles of alternating polarity along the axial length of the seal(s).

Preferably the magnetic fluid seals are combined with dynamic seals that provide sealing at high rotor speeds.

Preferably the casing is partially filled with gas of lower molecular weight than air.

Preferably the gas is primarily one of hydrogen, helium, methane, steam or ammonia.

Preferably the thermodynamic machine further comprises a vacuum pump connected to the casing to partially evacuate the casing in use.

Preferably in use the vacuum pump is configured to operate intermittently to maintain the vacuum pressure below a required level.

Preferably the vacuum pump is configured to vent gases from inside the rotor casing into a fluid that enters and exits the rotor on the higher pressure side of one or both rotor vacuum seal/s.

Preferably the rotor and fluid paths are configured so that at least one fluid enters and/or exits the rotor without passing through a rotary vacuum seal, and is directly exposed to the gas pressure within the rotor casing.

Preferably the at least one fluid has a vapour pressure below 5000 Pa as it enters or exits the rotor.

Preferably the thermodynamic machine further comprises rotor bearing(s) at a single axial end of rotor.

Preferably the thermodynamic machine further comprises rotor bearings at both ends of rotor.

Preferably at least one of the rotor bearings is a rolling element bearing.

Preferably the rolling elements in the rolling element bearing are ceramic.

Preferably the at least one rotor bearing is lubricated by seal barrier liquid or a fluid that enters and exits the rotor.

Preferably the at least one rotor bearing does not have any fluids flowing through the inner diameter.

Preferably the axial loads upon the rotor are reacted by rotor bearings at only one end of the rotor.

Preferably in use the rotor axis is aligned parallel to the direction of the combined gravitational and inertial acceleration applied to the rotor.

Preferably the rotor bearings and/or the rotor bearings mounts have low radial stiffness so that the maximum rotational speed of the rotor in use is above the first natural radial frequency of oscillation for the rotor in the low radial stiffness rotor bearings and/or rotor bearing mounts.

Preferably the thermodynamic machine further comprises one or more autobalancers which comprise rolling elements that are free to circulate within an annular cavity centred on rotor axis.

Preferably in use the autobalancer is configured to passively redistribute the autobalancer rolling elements to bring the rotor centre of mass into close alignment with the rotor axis.

Preferably the working fluid circulation path is sealed at least within the rotor.

In a second aspect the invention may broadly be said to consist in a land air or sea vehicle, comprising a thermodynamic machine outlined in one or more of the preceding statements and configured for use within the vehicle.

BRIEF DESCRIPTION OF THE DRAWINGS

Embodiments of the present invention will now be described, by way of example only, with reference to the accompanying drawings, in which:

FIG. 1 shows a cutaway cross sectional view of a preferred embodiment of the thermodynamic machine of the present invention, configured as a heat pump and driven by an electrically powered compressor, a rotor rotating at a rotor angular speed about a rotor axis in an anticlockwise direction when viewed from the right, and supported on a warm end rotor bearing and a cold end rotor bearing, the warm end rotor bearing and the cold end rotor bearing each mounted within radially compliant bearing mounts that have relatively low radial stiffness;

FIG. 2 shows an enlarged cross sectional view of a liquid metal rotary electrical coupling used in the thermodynamic machine of FIG. 1, current flowing to and from the rotor by means of stationary electrode discs coaxial with the rotor axis, each stationary electrode disc being attached to one terminal of an external electrical supply (not shown), and otherwise insulated from contact with each other;

FIG. 3 shows an enlarged cross sectional view of the rotor cold heat transfer fluid outlet used in the thermodynamic machine of FIG. 1, showing detail of a rotor cold heat transfer fluid outlet and a the rotor cold heat transfer fluid inlet, and illustrating the manner in which the rotor cold heat transfer fluid outlet is radially exterior to the rotor cold heat transfer fluid inlet and forms the impeller for a centrifugal pump that discharges into a cold heat transfer fluid outlet diffuser attached to the rotor casing, the figure also showing detail of a radially compliant bearing mount of the cold end rotor bearing;

FIG. 11 is a simplified flow diagram and cross section of the thermodynamic machine of the current invention configured as an engine showing the general configuration of fluid flows within the engine which utilises a centrifugal thermosiphon to generate a pressure gain that circulates the working fluid through a turbine internal to the rotor to produce electrical power, and that utilises radiative heat transfer near the outer radius of the rotor to provide the heat energy that drives the working fluid centrifugal thermosiphon;

FIG. 12 is a graph that illustrates the idealised cyclic thermodynamic changes that occur within the working fluid as it circulates around the working fluid circulation path within the rotor of the engine of FIG. 11 using idealised thermodynamic processes that will only be approximated in reality, pressure graphed on the vertical axis and mass specific fluid volume, the inverse of fluid density, on the horizontal axis;

FIG. 13 is a graph that illustrates the idealised cyclic thermodynamic changes that occur within the working fluid as it circulates around the working fluid circulation path within the rotor of the engine of FIG. 9 using idealised thermodynamic processes that will only be approximated in reality, pressure graphed on the vertical axis and mass specific fluid volume, the inverse of fluid density, on the horizontal axis;

FIG. 21 shows an end view of an axial cross section of a further preferred embodiment of a working fluid heater or working fluid cooler such as could be used in the heat pump of FIG. 1 or other heat pumps and engines of the current invention, the working fluid heater or cooler shown in isolation from the rest of the rotor, the working fluid heater or cooler in general form a cylindrical volume of revolution about the rotor axis, and containing a plurality of working fluid flow passages arrayed around the rotor axis through which the working fluid flows either in a generally radially outwards direction if undergoing compression or a generally radially inwards direction if undergoing expansion, the working fluid flow passages spiralled about the rotor axis and having a cross sectional flow area that diminishes with increasing distance from the rotor axis, spiral walls separating the working fluid flow passages from circumferentially adjacent spiralled heat transfer fluid passages of relatively constant cross sectional area;

FIG. 22 shows an perspective view of a cross section taken in a plane coincident with the rotor axis of the heat exchanger of FIG. 21, an annular laminate stack arranged between axial end plates that are rigidly bonded to the laminate stack, further loading provided by a retaining ring clamped to the right hand axial end plate by bolts, the working fluid entering the heat exchanger through multiple inlet holes that are distributed circumferentially about the rotor axis in the right hand axial end plate, and leaving the heat exchanger through multiple outlet holes that are also distributed circumferentially about the rotor axis in the right hand axial end plate, the heat transfer fluid entering and exiting the heat exchanger through multiple inlet and outlet holes distributed circumferentially around the rotor axis in the left hand axial end plate;

FIG. 23 shows an isometric view of three different types of generally annular outline form laminates, each shown in isolation arrayed along the rotor axis, that when appropriately angularly positioned with respect to each other about the rotor axis may be axially stacked in large numbers and bonded together to form the annular laminate stacks of the heat exchanger shown in FIG. 21 and FIG. 22;

DESCRIPTION OF THE INVENTION

Figure 4:
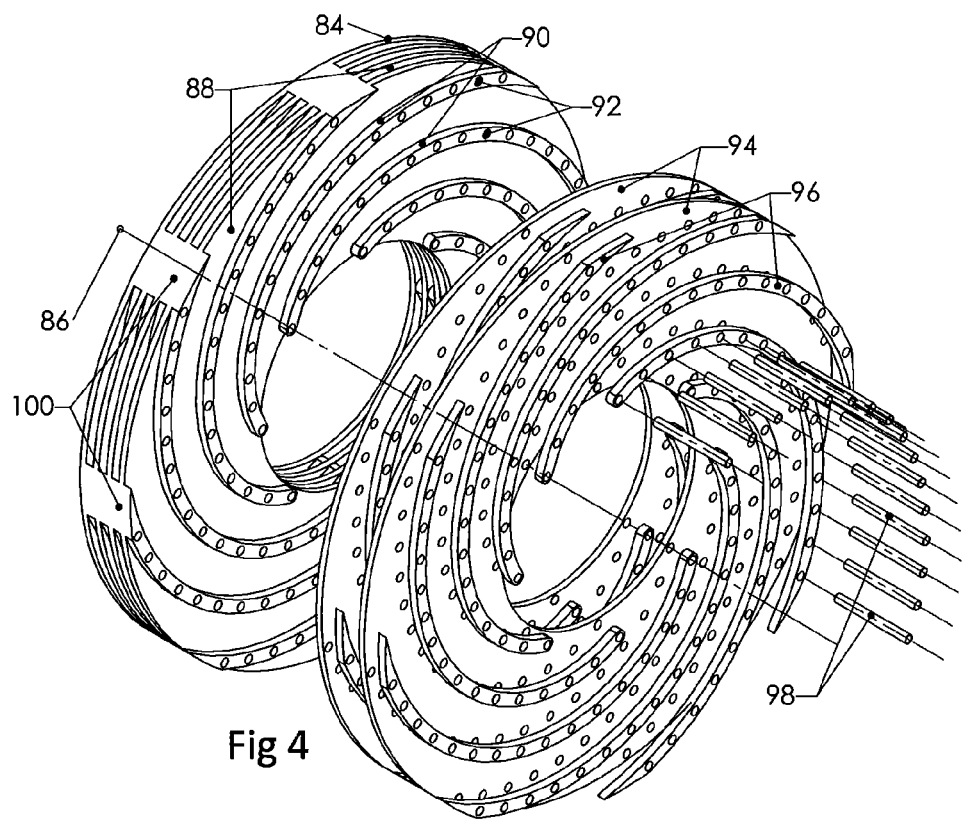
FIG. 4 shows details of preferred embodiment of the working fluid heater and/or working fluid coolers such as are used in the thermodynamic machine configured as a heat pump of FIG. 1, and that may also be utilised in other heat pumps and engines of the current invention and which operate as heat exchangers to transfer heat between the working fluid and the warm heat transfer fluid or cold heat transfer fluid or coolant fluid or hot heating fluid.

The invention will now be described in general terms before expanding upon various areas and features in more detail.

Description of Rotor Compression and Expansion Processes

The heat pumps and engines of the current invention utilise a rotor that rotates about a rotor axis. A gaseous working fluid is circulated at typically relatively low flow speeds around a generally hermetically sealed working fluid circulation path within the rotor that takes it from near the rotor axis, to near the periphery of the rotor and back. This working fluid is subjected to large centripetal accelerations within the spinning rotor that result in radial pressure gradients due to the action of the acceleration on the working fluid mass. As the working fluid circulates around the working fluid circulation path within the rotor the centripetal accelerations result in high efficiency compression as the fluid travels away from rotor axis and high efficiency expansion as the fluid travels towards the rotor axis. If the working fluid is flowing slowly and if there is little heat transfer to or from the flow passage walls, caused primarily by thermal conductivity of the flow passages walls in a radial direction, then these compression and expansion processes may approximate the thermodynamic ideals of adiabatic (free of heat transfer into or out of the fluid) and isentropic (process does not increase entropy) compression and expansion for which efficiency is typically maximised in thermodynamic heat engines.

Integrating heating and cooling processes as part of expansion and compression processes respectively within the rotor will in some instances introduce further benefits. Cooling the working fluid continuously in a heat exchanger as it flows radially outwards results in simultaneous compression and cooling that more rapidly increases the gas density and creates a larger pressure gain for a given increase in radius. If there is sufficient cooling to maintain a constant gas temperature as the working fluid flows radially outwards then the compression process may closely approximate ideal isothermal compression. Similarly warming working fluid continuously in a heat exchanger as it flows radially inwards reduces density and leads to a smaller drop in pressure for a given decrease in radius. With sufficient heat addition this process may closely approximate ideal isothermal expansion.

Combining adiabatic and isothermal compression and expansion processes offers the potential for approximating the optimally efficient Carnot cycle for both heat pumping and mechanical energy production purposes.

Centrifugal Thermosiphon

In a centrifugal thermosiphon a fluid is heated within a spinning rotor at a radius greater than where that same heat energy is extracted from it. The reduced density of the heated fluid flowing inwards relative to the cooled fluid flowing outwards creates a smaller pressure drop in the inwards flowing fluid than the pressure gain in the outwards flowing fluid. This creates a net pressure gain in the fluid as it circulates. Heat pumps and engines of the current invention make use of centrifugal thermosiphons to create pressure gains within the working fluid circulation path and the coolant fluids in the rotor.

The pressure gain in a gaseous working fluid centrifugal thermosiphon may be used to drive the circulation of the working fluid around a closed circulation path within the rotor while extracting energy to power a turbine and produce mechanical power or electricity in the case of an engine of the current invention. Alternatively in the case of some heat pumps of the current invention the pressure gain may be utilised to pump working fluid against the pressure loss of a heat pump thermodynamic cycle within the rotor.

Correspondingly there is also a net pressure drop when forcing fluid to flow around a circulation path in which the fluid is instead cooled at a larger radius and heated at a smaller radius. To maintain the fluid circulation against such a drop in pressure requires a pump or compressor or other powered means of driving the flow.

An important effect of this in engines and heat pumps of the current invention is that when a coolant enters and exits a spinning rotor and is heated at significant radius from the rotor axis, then the centrifugal thermosiphon within the coolant will typically provide a pressure gain that will drive the flow of the coolant through the rotor. If a heating fluid enters and exits a spinning rotor and is cooled at significant radius from the rotor axis then it will be working against a pressure drop and will need to be pumped through the rotor to maintain the desired rate of flow.

The pressure gain created by a centrifugal thermosiphon is proportionally larger when: the fluid is colder, the rotor speed or range of radii spanned by the centrifugal thermosiphon is increased, the temperature differential between inwards and outwards flow is increased or the bulk modulus or isobaric specific heat of the fluid is decreased.

Basic Description of Engine of the Current Invention

The engine of the current invention utilises a rotor containing a working fluid that is sealed within the rotor and that is heated by one or more of a variety of possible heat sources and cooled by a coolant fluid that enters and exits the rotor by means of a rotary fluid coupling near the rotor axis. A centrifugal thermosiphon within the circulating working fluid in the rotor creates a pressure gain that drives a turbine within the rotor to produce mechanical or electrical power.

Initial Compression and Cooling Process

Working fluid exits the turbine near the rotor axis and flows radially outwards through a working fluid cooler undergoing centrifugal compression while simultaneously being cooled by heat transfer to the coolant fluid, to maximise efficiency this combined compression and cooling process preferably approximates an isothermal compression process.

Constant Temperature Heat Source

If the source of heat energy used to heat the working fluid in the engine is able to stay at a near constant temperature even as energy is being supplied to the engine, such as with combustion of a fuel, solar heat, engine coolant heat or nuclear heat then it is preferred that the heat addition to the working fluid be at near to the maximum temperature and so it is preferred that prior to this heating the working fluid undergo a further approximately adiabatic compression process in which the working fluid flows radially outwards to a greater radius so that its pressure and temperature increase. For maximum efficiency the final temperature achieved in this approximately adiabatic compression process should be slightly below the temperature of the heat source. The working fluid is then heated in a working fluid heater at or near the maximum radius.

In one preferred engine configuration this working fluid heater is a radiative receiver at or near the maximum radius of the rotor to which heat energy is transferred by means of radiation from a radiative heat source that is external to the rotor.

In another preferred configuration heat energy is transported into the rotor from the hot heat source by means of a hot heating fluid that enters and exits the rotor by means of a rotary fluid coupling at or near the rotor axis. The working fluid heater is a heat exchanger at or near the maximum radius of the rotor that heats the working fluid using heat transferred from the hot heating fluid.

It is preferred that for both radiative heating and hot heating fluid heating the working fluid flow radially inwards by some distance while it is being heated so that during start-up the flow of the working fluid will be established in the desired thermosiphon driven direction. Heating the working fluid while it is also flowing radially inwards and expanding may approximate an isothermal heating process, though rotor speed limitations will in many cases mean that such isothermal heating will have little or no benefit to overall efficiency, it being generally advantageous to add as much heat energy as possible at as great a pressure as possible in the absence of peak temperature limitations.

Waste Heat Fluid Stream Heat Source

If the heat source used to heat the working fluid in the engine is a waste heat fluid stream that cools as it provides energy to the engine such as geothermally heated steam, water, stored thermal energy, or the exhaust from a combustion process or a fuel burning engine then it is preferred that there be little or no additional compression of the working fluid after it has exited the working fluid cooler. This enables the maximum useful extraction of heat energy from the waste heat fluid stream.

Heat energy is transported into the rotor from the waste heat fluid stream by a hot heating fluid that is heated by the waste heat fluid stream in an external counterflow heat exchanger and that enters and exits the rotor by means of a rotary fluid coupling at or near the rotor axis. The working fluid heater is a counterflow heat exchanger at or near the maximum radius of the rotor in which the working fluid is heated by the hot heating fluid as it cools down and the flow rates of the working fluid and the hot heating fluid are preferably controlled such that the working fluid exits the counterflow heat exchanger at near to the temperature of the hot heating fluid entering the working fluid heater and the hot heating fluid exits the counterflow heat exchanger at near to the temperature of the working fluid entering the working fluid heater.

Expansion and Turbine

For both the constant temperature heat source and the waste heat fluid stream heat source versions of the engine after the working fluid is heated it flows radially inwards to the turbine undergoing a preferably approximately adiabatic expansion process so that its temperature and pressure have decreased prior to entering the turbine.

The turbine within the rotor is preferably of the dynamic type and will typically be either a radial inflow or axial flow turbine with one or more stages that rotates relative to the rotor about an axis coincident with the rotor axis. The turbine will typically operate at relatively low temperatures with a working fluid outlet temperature that will ideally approach the temperature of the coolant fluid to maximise efficiency of the engine. The turbine drives a generator within the rotor and both the turbine and the attached generator rotor are supported on bearings within the rotor that allow them to rotate with respect to the rotor. In engines with high maximum working fluid temperatures these bearings are preferably gas-lubricated or magnetically levitated so that there are no evaporated lubricants that can decompose and contaminate the working fluid or form deposits in the hot parts of the working fluid circulation path, though this may be less of an issue in rotors where the maximum temperatures are below 700K. Low vapour pressure grease or oil lubricated rolling element bearings may also be suitable for use as turbine and generator bearings, particularly if they employ seals to limit lubricant contamination of the working fluid circulation path.

The generator is preferably of the permanent magnet type for high efficiency and low weight, and the electricity generated by the generator is preferably transferred off of the rotor by means of a rotary electrical coupling of which non-contacting inductive rotary couplings, dry sliding contact slip rings or liquid metal rotary electrical couplings are preferred examples. The generator windings that are attached to and spin with the rotor are preferably cooled by the coolant fluid or the working fluid.

Engine Efficiency

The engine utilising a constant temperature heat source with isothermal compression and expansion processes to respectively cool and heat the working fluid approximates the Carnot cycle, and is therefore capable of very high efficiencies compared to other engines operating with similar temperature limits.

The engine utilising the waste heat fluid stream heat source may also be highly efficient at extracting energy from a waste heat fluid stream, and may retain relatively high efficiencies in small sizes for which there are few other efficient options.

Basic Description of Heat Pump of the Current Invention

The heat pump of the current invention utilises a rotor containing a working fluid that is sealed within the rotor and that absorbs heat energy from a cold heat transfer fluid and rejects heat energy to a warm heat transfer fluid that is a coolant fluid at a higher temperature than the cold heat transfer fluid. Both the cold and the warm heat transfer fluid enter and exit the rotor by means of rotary fluid couplings near the rotor axis. The heat pump process absorbs energy and requires a pumping means to drive circulation of the working fluid within the rotor. Without including the pumping means of powering the cycle the basic cycle of thermodynamic processes that the working fluid undergoes in the rotor of the heat pump cycle of the current invention is as follows: The working fluid is at its coldest temperature and lowest pressure when it is nearest to the rotor axis. The working fluid flows radially outwards through one or more compression passages undergoing approximately adiabatic compression, increasing in pressure and temperature until it is preferably slightly hotter than the warm heat transfer fluid. The working fluid then enters and flows radially outwards through a working fluid cooler transferring heat energy from the working fluid to the warm heat transfer fluid as it undergoes further compression. Preferably the rate of flow of the warm heat transfer fluid is sufficiently high that its temperature increase within the working fluid cooler is relatively small so that the compression of the working fluid within the working fluid cooler ideally approximates an isothermal compression process.

The working fluid then flows radially inwards through one or more expansion passages undergoing approximately adiabatic expansion that decreases its pressure and temperature until it is preferably slightly colder than the cold heat transfer fluid. The working fluid then enters and flows radially inwards through a cold working fluid heater absorbing heat energy from the cold heat transfer fluid as it undergoes further expansion. Preferably the rate of flow of the cold heat transfer fluid is sufficiently high that its temperature decrease within the working fluid cooler is relatively small and the expansion of the working fluid within the working fluid cooler ideally approximates an isothermal expansion process. This completes the basic working fluid thermodynamic cycle of the heat pump of the current invention, but does not include the necessary pumping means used to power the circulation against the pressure loss that occurs in the working fluid as it circulates through this heat pump cycle.

Compressor Driven Heat Pump Working Fluid Circulation

In a preferred configuration of the heat pump of the current invention the circulation of the working fluid through the heat pumping cycle is driven by a working fluid compressor integrated into the rotor between the outlet of the cold working fluid heater and the start of the adiabatic compression process.

The compressor within the rotor is preferably of the dynamic type and will typically be either a radial (centrifugal) compressor or an axial flow compressor with one or more stages that rotates relative to the rotor about an axis coincident with the rotor axis. The compressor is driven by a motor within the rotor and both the compressor and the attached compressor motor rotor are supported on bearings within the rotor that allow them to rotate with respect to the rotor. In rotors with high maximum working fluid temperatures these bearings are preferably gas-lubricated or magnetically levitated so that there are no evaporated lubricants that can decompose and contaminate the working fluid or form deposits in the hot parts of the working fluid circulation path, though this may be less of an issue in rotors where the maximum temperatures are below 700K. Low vapour pressure grease or oil lubricated rolling element bearings may also be suitable for use as compressor and compressor motor bearings, particularly if they employ seals to limit lubricant contamination of the working fluid circulation path.

The compressor motor is preferably of the permanent magnet type for high efficiency and low weight, and the electricity used by the motor is preferably transferred to the rotor by means of a rotary electrical coupling of which non-contacting inductive rotary couplings, dry sliding contact slip rings or liquid metal rotary electrical couplings are preferred examples. The compressor motor windings that are attached to and spin with the rotor are preferably cooled by the warm or cold heat transfer fluids or by the working fluid.

Centrifugal Thermosiphon Driven Heat Pump Working Fluid Circulation

In another preferred configuration of the heat pump of the current invention the circulation of the working fluid through the heat pumping cycle is driven by a centrifugal thermosiphon that produces a pressure gain in the flow of working fluid by adding heat energy to the working fluid at a larger radius than where it is removed in a similar manner to the engine of the current invention. This requires the addition of a hot working fluid heater at a radius that is greater than the radius of the working fluid cooler, and in many cases will be most advantageously linked into the heat pump cycle by additional adiabatic compression before and adiabatic expansion after the hot working fluid heater.

This hot working fluid heater may be inserted into the sequence of heat pump cycle processes either before or after the working fluid cooler, or the working fluid cooler may be split so that part of the working fluid cooling is before the hot working fluid heater and part of it is after the hot working fluid heater within the sequence of flow processes. The most preferred configuration that will generally (and advantageously) maximise the efficiency for a constant temperature heat source and for a given rotor peripheral velocity is to insert the hot working fluid heater before the working fluid cooler so that the general sequence of processes is:

Approximately adiabatic compression of working fluid from near rotor axis to maximum radius where the hot fluid heater is located, the working fluid will gain temperature and pressure during this compression to ideally reach a temperature just below the temperature of the hot working fluid heater.

Heating of working fluid in hot working fluid heater, this heat addition will preferably be made with at least some simultaneous expansion as the working fluid flows radially inwards during the heat addition process. In some cases the heat addition may even approximate an isothermal heat addition, although that is not essential.

Approximately adiabatic expansion of the working fluid as it flows radially inwards cooling until it reaches a radius where its temperature is preferably slightly above the temperature of the warm heat transfer fluid and enters the working fluid cooler where it flows radially outwards transferring heat energy into the warm heat transfer fluid in an ideally approximately isothermal compression process.

This is followed by further approximately adiabatic expansion of the working fluid as it flows radially inwards towards the cold working fluid heater cooling and expanding until it is ideally at a temperature slightly colder than the cold heat transfer fluid. The working fluid then undergoes approximately isothermal expansion and heating as it flows radially inwards through the cold working fluid heater absorbing heat energy from the cold heat transfer fluid. This completes the sequence of processes in this preferred embodiment of heat pump driven by centrifugal thermosiphon.

Constant Temperature Heat Source Centrifugal Thermosiphon Driven Heat Pump

If the source of heat energy used to heat the working fluid in the centrifugal thermosiphon driven heat pump is able to stay at near constant temperature even as energy is supplied to the heat pump, such as with combustion of a fuel, solar heat, internal combustion engine coolant heat or nuclear heat then it is preferred that this heat addition to the working fluid be made at or near to the maximum working fluid temperature and to maximise efficiency the final working fluid temperature achieved in this heating process should ideally be not much below the temperature of the heat source.

In one preferred heat pump configuration the hot working fluid heater is a radiative receiver located at or near the maximum radius of the rotor to which heat energy is transferred by means of radiation from a radiative heat source that is external to the rotor.

In another preferred configuration heat energy is transported into the rotor from a hot heat source by means of a hot heating fluid that enters and exits the rotor through a rotary fluid coupling at or near the rotor axis and the hot working fluid heater is a heat exchanger at or near the maximum radius of the rotor that heats the working fluid using heat transferred from the hot heating fluid.

It is preferred that for both radiative heating and hot heating fluid heating that the working fluid flow radially inwards by some distance to expand while it is being heated so that during start-up the flow of the working fluid will always be established in the desired direction. Heating the working fluid in the hot working fluid heater while it is also flowing radially inwards and expanding may approximate an isothermal heating process, though such isothermal heating will not necessarily maximise efficiency given other design constraints such as limited rotational speed.

Waste Heat Fluid Stream Heat Source Centrifugal Thermosiphon Driven Heat Pump

If the heat source that drives working fluid circulation in the heat pump by means of a centrifugal thermosiphon is a waste heat fluid stream such as heat energy in a storage medium like geothermally heated water, stored thermal energy, or the exhaust from a combustion process or a fuel burning engine then in many cases it will be most economic to cool the heat source to near ambient temperature to provide the maximum energy to the heat pump. In such applications it is preferred that the working fluid flow through a working fluid cooler immediately preceding the hot working fluid heater. This working fluid cooler extending radially inwards from near the maximum radius of the rotor where the hot working fluid heater is to a smaller radius where the working fluid flowing radially outwards from the outlet of the cold working fluid heater near the rotor axis has undergone sufficient adiabatic compression heating to be just above the warm heat transfer fluid temperature.

Heat energy is transported into the rotor from the waste heat stream by a hot heating fluid that is heated by the waste heat stream in an external counterflow heat exchanger and that enters and exits the rotor by means of a rotary fluid coupling at or near the rotor axis. The hot working fluid heater is a counterflow heat exchanger at or near the maximum radius of the rotor in which the working fluid is heated by the hot heating fluid as it cools down and the flow rates of the working fluid and the hot heating fluid are preferably controlled such that the working fluid exiting the counterflow heat exchanger is near to the temperature of the hot heating fluid entering the hot working fluid heater and the hot heating fluid exiting the hot working fluid heater is near to the temperature of the working fluid entering the working fluid heater.

This configuration with approximately isothermal cooling and compression extending out to the maximum radius of the rotor in the working fluid cooler allows close to the maximum amount of useful heat energy to be extracted from the hot heating fluid that is in turn heated externally to the rotor by the waste heat fluid stream. In some cases it may be possible to use the waste heat fluid stream as the hot heating fluid without needing an external counterflow heat exchanger.

More than One Centrifugal Thermosiphon in Series to Increase Pressure Gain

More than one cycle of centrifugal thermosiphon involving compression, heating, expansion and cooling may be connected together in series so that the working fluid flows through first one centrifugal thermosiphon and then the next so as to produce a larger pressure gain that may then allow a greater heat pump temperature differential to be maintained relative to the temperature of the hot heat source.

Addition of a Compressor to Centrifugal Thermosiphon Driven Heat Pump

A compressor may optionally be added to a centrifugal thermosiphon driven heat pump to variably augment or even at times replace the pressure gain provided by the working fluid centrifugal thermosiphon to drive the working fluid circulation.

Heat Pump Efficiency and Economics

Utilising isothermal compression and expansion processes to respectively cool and heat the working fluid in the heat pump of the current invention approximates a reversed Carnot cycle, and is therefore potentially capable of very high heat pump efficiencies when driven by a compressor.

Driving the heat pump cycle with a centrifugal thermosiphon also has the potential for exceptionally high energy efficiency as the centrifugal thermosiphon if utilising adiabatic compression and expansion as well as an isothermal heat addition approximates a Carnot cycle. The reversed Carnot cycle of a heat pump being driven by the Carnot cycle of a centrifugal thermosiphon offers theoretically the highest possible energy efficiency for turning a heat source at a given temperature into useful cooling or heating at lower temperatures.

Being able to utilise an otherwise useless or waste heat fluid stream as a heat source to drive a heat pump offers many potential advantages and applications, such as vehicle and transport air-conditioning and refrigeration. It may therefore contribute to large energy savings.

A centrifugal thermosiphon driven heat pump is driven by heat energy that is in most cases far cheaper than utilising electrical or other sources of mechanical energy to drive a compressor.

Heat Pump Defrosting

During operation some heat pumps of the current invention may need to absorb heat energy from air at below the freezing point of water, and this may lead to frosting up of the heat absorbing heat exchanger. A preferred means for defrosting the heat absorbing heat exchanger is to temporarily swap the flow of the warm heat transfer fluid with the cold heat transfer fluid so that the heat absorbing heat exchanger is briefly warmed by a flow of warm heat transfer fluid, causing the accumulated ice to melt, before the heat transfer fluids are swapped back and the cold heat transfer fluid again starts to absorb heat in the heat absorbing heat exchanger.

Equations Including $C_p$, k, v, r, w, p, T. v Sets p, T for Given Gas

The theoretical equations to describe adiabatic isentropic compression and expansion processes in an ideal gas can be linked to changes in Enthalpy h. For a rotor rotating at angular velocity w about the rotor axis the tangential velocity v is given by the equation $v=w \cdot r$ where r is the radial distance from the rotor axis. If the ideal gas contained within the rotor flows from radius $r_1$ to radius $r_2$ without heat transfer it will result in a change in enthalpy of $h=0.5w^2(r_2^2-r_1^2)=0.5(v_2^2-v_1^2)$ within the ideal gas, and a consequent change in temperature T given by the equation $h=c_p(T_2-T_1)=0.5(v_2^2-v_1^2)$ or $(T_2-T_1)=0.5(v_2^2-v_1^2)/c_p$ where $c_p$ is the isobaric specific heat of the ideal gas and is constant. The change in pressure p can then be found from the equation for adiabatic isentropic compression $p_1=p_2 \cdot (T_1/T_2)^{(k/(k-1))}$ where k is the ratio of the isobaric to isochoric specific heat for the ideal gas and is constant. So for an ideal gas circulating slowly within the rotor without heat transfer the changes in temperature and pressure are primarily governed by the changes in the tangential velocity v.

Importance of $c_p$ and k

The smaller the value of the isobaric specific heat $c_p$, the larger the temperature change for a given change in tangential velocity v. Monoatomic gases have the highest values of k, advantageously giving smaller changes in pressure for a given change in temperature, which may reduce the peak gas pressures within the rotor. Isobaric specific heat $c_p$ is linked to the inverse of the Atomic Mass so generally gases with high atomic mass are best to minimise rotor speed. Ideal gas equations will in many cases provide a close approximation to the behaviour of real gases even though their $c_p$ and k values change slightly with temperature and pressure, and vary greatly from ideal behaviour at temperatures and pressures near the critical point for the gas.

TABLE 1

| Gas | Isobaric Specific Heat $c_p$ [J · kg⁻¹ · K⁻¹] | Critical Temperature [K] | Specific Heat Ratio k | Atomic Mass [g/mol] |
| --- | --- | --- | --- | --- |
| xenon | 158 | 289.8 | 1.667 | 131.3 |
| krypton | 248 | 209.4 | 1.667 | 83.8 |
| argon | 520 | 150.9 | 1.667 | 39.9 |
| neon | 1030 | 44.4 | 1.667 | 20.2 |

Working Fluid Selection

The chemical inertness, high value of k and low values of $c_p$ for noble gases makes them attractive as working fluids in the engine and heat pumps of the current invention. For most applications xenon will be the best working fluid, with low $c_p=158$ J·kg⁻¹·K⁻¹ and being useable at temperatures down to a few Kelvin above its triple point of 161.4K, sufficiently low for most applications other than cryogenics. Xenon is rare and expensive so designs will preferably minimise the quantity used as well as minimising leakage. In some applications xenon may not be suitable due to cost, nor for some low temperature cryogenic applications where lighter and cheaper gases such as krypton or argon may be used to save cost. For very low cryogenic temperatures neon or even helium may be needed. In some cases it may be best to use a working fluid mixed from two or more of these gases, comprising a lower $c_p$ higher critical temperature gas for example xenon at a partial pressure limit fixed by condensation to liquid at the minimum temperature in the cycle (particularly for heat pumps at the inlet to the cold heat exchanger), and supplementing that gas with the next lightest noble gas, in this example krypton, resulting in a working fluid gas mixture with $c_p$ above that of xenon but still below that of krypton by itself.

Temperature and Rotor Rim Tangential Velocity Effects on Efficiency

Heat Engines have thermal efficiency n that is ultimately limited by the Carnot equation $f=1-(T_c/T_h)$, where $T_h$ and $T_c$ are respectively the maximum and minimum cycle temperatures measured in K. Heat pumps similarly have performance that is measured in terms of COP, the Coefficient of Performance. COP is equal to the desired output (heating or cooling) divided by the required input and is similarly limited to maximum COP for heating $COP_{heat}=T_h$/Lift and maximum COP for cooling $COP_{cool}=T_c$/Lift where $T_c$ is cold temperature where heat is absorbed and $T_h$ is the warm temperature where heat is released and Lift=$T_h-T_c$ is the temperature difference between $T_h$ and $T_c$. No heat pump or engine can achieve these ultimate levels of COP or thermal efficiency, but the use of high efficiency compression and expansion processes within the rotor of the current invention make it possible to get closer to these ultimate limits than is feasible with more conventional engines and heat pumps.

The temperature change in an adiabatic compression or expansion process caused by the working fluid flowing radially within the rotor for an ideal working fluid is given by the equation $(T_2-T_1)=0.5(v_2^2-v_1^2)/c_p$, where T is the working fluid temperature, $c_p$ is the isobaric specific heat of the working fluid and v is the tangential velocity of the rotor at a given radius, with subscripts 1 and 2 referring to the start and the end radial locations for the adiabatic process.

In several preferred configurations of the engine and the centrifugal thermosiphon driven heat pump of the current invention the gain in temperature in the working fluid is produced almost entirely by an adiabatic compression process as the working fluid flows radially outwards to near the maximum rotor radius at the rotor rim/periphery. In such cases the rotor rim tangential velocity $v_{rim} > (2c_p(T_h-T_c))^{0.5}$ and because $(T_h-T_c)$ has a strong influence upon the efficiency of the engine or centrifugal thermosiphon driven heat pump so efficiency is highly dependent upon $v_{rim}$ and $c_p$. Xenon with $c_p=158$ allows high efficiencies to be achieved at lower rotor velocities than krypton with $c_p=248$ or argon with $c_p=520$.

Material stresses within the rotor are in general proportional to $v_{rim}^2$ as well as material density, so for $_p$ the same rotor design to have similar adiabatic compression temperature increases to achieve similar efficiency but with a different working fluid with higher $c_p$ will typically increase the material stresses in proportion to the increase in $c_p$. The stresses in a continuous ring spinning at a given peripheral tangential velocity will in general be far higher than for a radial spoke or disk spinning at the same tip tangential velocity. Other factors such as the kinetic energy that must be contained in event of a rotor failure, some bearing forces and also acceleration time are also strongly linked to $v_{rim}^2$. Centripetal acceleration induced stresses may be a limiting factor on the maximum rotor speed, particularly if the rotor has high temperature components near the maximum rotor radius made of materials that lose tensile strength as temperature increases.

Benefit of Isothermal Processes

Employing isothermal heating (expansion) and cooling (compression) processes within the engines and heat pumps of the current invention has many advantages:

Having the heat transfer occur with approximately constant temperature differentials between the working fluid and the warm heat transfer fluid as well as the cold heat transfer fluid will typically minimise the size of the temperature differential or Lift that the heat pump must pump heat energy across. It is this Lift that drives the amount of input pumping power required and greater working fluid temperature variation above and below the warm and cold heat transfer fluid temperatures that define the Lift typically requires greater power input. Isothermal heating and cooling processes permit the highest thermodynamic cycle efficiencies to be attained given limits on maximum and minimum temperatures, and with no losses may allow thermodynamic cycles that approach Carnot efficiencies.

Using isothermal heating and cooling processes means that more heat energy may enter and exit the working fluid on each circuit through the working fluid circulation path with little impact upon overall efficiency. This may reduce working fluid mass flow rate for a given power output, typically reducing flow passage cross sectional area and volume for a given circulation path length and flow velocity, thereby reducing working fluid mass. The working fluid circulation path will typically have a length that cannot be easily decreased and an average flow velocity that cannot be increased without decreasing efficiency. For expensive working fluids like xenon and krypton this reduction in mass within the rotor may be critical to making engines or heat pumps of the current invention economic.

Having heat exchangers that operate at near constant temperature also has the advantage of minimising stresses created by differential thermal expansion within the heat exchanger.

Working Fluid Pressurisation

It is typically very advantageous to pressurise the working fluid in engines and heat pumps of the current invention to pressures far above atmospheric pressure as it decreases working fluid volume reducing volume and weight of the heat exchangers required to transfer a given quantity of heat efficiently. This produces a further benefit in that smaller volume heat exchangers will generally allow a reduction in the size and weight of the rotor and so reduce the length of the working fluid flow path and the amount of working fluid required. Smaller rotors with less working fluid will typically be cheaper to manufacture, and the smaller rotor will also have lower windage losses and bearing frictional losses, and in some cases may even make it unnecessary to utilise an evacuated windage reducing rotor casing with rotor vacuum seals. This is particularly true for heat pumps of the current invention that utilise xenon as a working fluid and use only a compressor to drive the working fluid circulation, as they will have relatively low rotor peripheral speeds. An additional benefit of greater working fluid pressurisation may be a reduction in average pressure differential between the gaseous working fluids and liquid heat transfer fluids within the heat exchangers as working fluid pressure is increased.

There are several issues that tend to limit the optimal working fluid pressure. If there is a compressor motor or turbine generator in the rotor then it will typically be immersed in the working fluid and will suffer from increasing working fluid frictional drag losses in the magnetic flux gap between the stator and the rotor of the motor or generator as the working fluid pressure increases. This may be partially mitigated by utilising a longer and smaller diameter compressor motor or turbine generator so that the surface speed in the magnetic flux gap is reduced, but this increases the size and weight for the motor or generator.

In engines and heat pumps that utilise centrifugal thermosiphons to drive the circulation of the working fluid using higher pressures may lead to the maximum pressure in the hot working fluid heater near the maximum radius of the rotor effectively exceeding the strength capabilities of the materials being used to construct the passages through which the working fluid flows.

The behaviour of gases varies greatly from ideal gas behaviour near their critical temperatures and pressures. This is an important consideration for using xenon in engines and heat pumps of the current invention as xenon has a critical point of 289.8K and 5.841 MPa that is near to typical ambient temperatures. The non-ideal gas behaviour of xenon at temperatures and pressures slightly above the critical temperature and pressure will typically negatively impact the efficiency of heat pumps and engines of the current invention operated with xenon at such temperatures and pressures.

For this reason it is preferred that for engines and heat pumps of the current invention that utilise xenon as a working fluid the minimum operating pressure within the working fluid circulation path be below 5 MPa, and in the case of heat pumps the minimum pressures will need to be sufficiently low that the xenon does not condense at the inlet to the cold heat exchanger in which it expands and absorbs heat energy, for many heat pumping applications this will limit the xenon pressure at this point to 3-4 MPa.

The higher pressure and higher molecular weight of xenon and to a lesser extent krypton and argon relative to air both serve to greatly increase the Reynolds numbers in the rotor turbines and compressors for a given power and temperature change. Increased Reynolds numbers will normally reduce viscous flow losses and so increase the achievable efficiencies of compressors and turbines in heat pumps and engines of the current invention relative to similarly powerful compressor and turbines using air.

Relative to air the lower isobaric specific heat $c_p$ of xenon, krypton and argon also means that turbines and compressors have much lower peripheral velocity for given temperature change through the turbine or compressor so that centrifugally induced stresses and strains are much reduced. In conjunction with generally lower temperatures this will typically enable smaller clearances and higher efficiencies than would normally be possible for similarly powerful compressors and turbines using air.

Working Fluid Condensation Capture in Volume of Revolution

Additionally it is preferred that the minimum working fluid pressure be sufficiently low that the working fluid does not condense at any point within the working fluid circulation path as cyclical condensation and evaporation will reduce the efficiency of the engine or heat pump. But if any working fluid does condense into a liquid at any point in the cycle then it is preferred that there be radially inwards facing liquid collection cavities within the working fluid circulation path that will collect any condensed liquid working fluid close to the point of condensation and with little heat transfer into the condensing liquid to prevent further unnecessary cyclical evaporation and condensation. By collecting any condensing liquid in such a cavity the working fluid pressure will be gradually reduced thereby depressing the temperature of condensation until no further condensation is occurring, and in this way the working fluid pressure may be automatically adjusted as the minimum working fluid temperature changes due to operational conditions. It is preferred to have the liquid collecting cavities distribute any collected liquid evenly around the rotor axis so that it does not create an unbalanced mass in the rotor and so it is preferred that the liquid collection cavity to be in general form a radially inwards facing volume of revolution around the rotor axis.

Rotor Heat Exchangers

Reducing the temperature differential between the working fluid and heat transfer fluid within rotor heat exchangers generally improves heat pump or engine efficiency. It is also important to limit the flow losses through the heat exchangers and to make them compact in order to reduce the size and weight of the rotor as well as to reduce the amount of expensive xenon or krypton used. These preferred working fluids have relatively poor thermal conductivity and need very small diameter flow passages in heat exchangers in order to achieve high rates of heat transfer with small temperature differentials.

Performing heating and cooling processes as part of radial inflowing expansion and radially out-flowing compression processes respectively makes it possible to construct heat exchangers out of very thin axially spaced metallic foil fins bonded into heat exchangers that are cheap to manufacture and that have fins with their thinnest dimension parallel to the rotor axis so that they are minimally deflected by the large centripetal accelerations acting upon them. Such axial spaced fins are also minimally affected by circumferential pressure gradients in the working fluid caused by coriolis accelerations as the working fluid flows radially inwards or outwards. Such an arrangement of axially spaced fins can favourably have many thousands of square meters of working fluid heat transfer area per cubic meter of heat exchanger. The heat exchangers also need to have rotational symmetry so as not to produce out of balance forces within the spinning rotor.

An annular stack of axially spaced fins centred on the rotor axis is the most preferred solution, but brings many potential problems and issues to deal with: rotor rotation will create potentially large circumferential flow velocities within the working fluid unless there are flow barriers to prevent unwanted circumferential flow within the heat exchanger; the radially inner surface has smaller area than the radially outer surface; the working fluid will increase in density with increasing radius; the rate of heat transfer at any given radius required to maintain an ideal isothermal process will increase approximately proportionally to the radius squared; the optimal length of the working fluid flow path through the heat exchanger may not equal the radial span of the heat exchanger; the optimal cross sectional area of the working fluid flow path through the heat exchanger is unlikely to match the radially increasing circumferential area of the heat exchanger; it is highly desirable to limit the maximum distance between the working fluid and the heat transfer fluid (coolant, cold heat transfer, warm heat transfer or hot heating fluid) in the heat exchanger; it is highly desirable to have a relatively large cross sectional area for the heat transfer fluid (coolant, cold heat transfer, warm heat transfer or hot heating fluid) within the heat exchanger and yet there will be very large pressure differentials between the working fluid and the heat transfer fluids to be structurally accommodated; construction should be cheap and simple.

Heat Exchanger with Spiral Working Fluid Flow Channels and Axial Heat Transfer Fluid Flow Channels A first preferred configuration of heat exchanger is therefore a generally cylindrical heat exchanger that incorporates multiple separate working fluid flow channels between axially spaced fins through which the working fluid may flow in parallel, the working fluid flow channels being in general form spirals about the rotor axis with typically multiple spiral working fluid flow channels arrayed symmetrically around the rotor axis at any given axial location. The walls between circumferentially adjacent working fluid flow channels are aligned into axial columns along the length of the heat exchanger and are penetrated along their axial length by multiple close-spaced heat transfer fluid (coolant, cold heat transfer, warm heat transfer or hot heating fluid) axial fluid passages that do not penetrate into the working fluid flow channels and through which axial fluid passages the heat transfer fluid will typically flow at least partially in parallel, though possibly also partially in series such as in passing through the heat exchanger in both axial directions.

The length of the spiral working fluid flow channels may advantageously be altered by increasing or decreasing the spiral pitch and their cross sectional flow area may also be varied along their length by changing the spiral pitch with radius.

The preferred method of construction for these axially stacked spiral working fluid flow channel heat exchangers is to cut fins from sheet metal stock and assemble them into axial stacks that are then bonded together, typically with a brazing or other metallic fusion process that utilises a brazing alloy cladding or coating on the surfaces of some or all of the sheet metal components with lower melting point than the primary sheet metal alloy. The axial stack may be in the form of multiple symmetrically circumferentially distributed spiral shaped barrier wall fingers between successive annular discs and the fingers may have different thickness to the annular discs so that the fins and working fluid flow passages have different and optimised axial thicknesses. Alternatively the axial stack may be constructed from successive spiral fins that overlap other axially adjacent spiral fins along the spiral lateral edges of the spiral working fluid flow passages. The heat exchanger fin stack is then able to be constructed from a single type of sheet metal component, but the compromise is that the passage axial thicknesses are approximately the same as the fin axial thicknesses which may not be optimal.

The axial fluid passages for the heat transfer fluid (coolant, cold heat transfer, warm heat transfer or hot heating fluid) may be cut into the sheet metal components of the heat exchangers prior to their being bonded together or they may be drilled after the heat exchanger is bonded together. There may be additional processes applied to the finishing of the axial fluid passages to provide a more reliable fluid seal, such as; finish drilling or reaming of axial fluid passages, internal plating, polymeric sealants, internal coatings, additional metal fusing processes applied to the inner diameter of the axial passages, the insertion and bonding of tubes within the axial fluid passages.

Heat Exchanger with Circumferentially Alternating Working Fluid and Heat Transfer Fluid Spiral Flow Channels A second preferred embodiment of heat exchanger is a generally cylindrical or annular laminate stack heat exchanger that incorporates multiple separate working fluid flow channels between axially spaced fins through which the working fluid may flow in parallel, the working fluid flow channels being in general form spirals about the rotor axis with typically multiple spiral working fluid flow channels arrayed symmetrically around the rotor axis at any given axial location. Similarly the heat transfer fluid being one of: coolant fluid, cold heat transfer fluid, warm heat transfer fluid or hot heating fluid flows in parallel through multiple heat transfer fluid flow channels that are also in general form spirals about the rotor axis. These spiral heat transfer fluid flow channels alternate about the rotor axis with the spiral working fluid flow channels so that each spiral working fluid flow channel has spiral heat transfer fluid flow channels circumferentially adjacent in both directions. The walls between these spiral working fluid and heat transfer fluid flow channels are also spirals of preferably approximately constant thickness, and these spiral walls along with the spiral working fluid and spiral heat transfer fluid flow channels are aligned into axial columns parallel to the rotor axis, or alternatively into long-pitch helixes about the rotor axis, though helixes are unlikely to have any benefit over axial columns.

The radial inner and radial outer ends of each of these spiral working fluid and spiral heat transfer fluid flow channels terminate in, respectively, axial working fluid and axial heat transfer fluid connecting passages that fluidically connect in parallel all of the spiral fluid flow channels in an axial column. These axial connecting passages serve as fluid conduits to distribute and collect the fluid flows from the multiple spiral fluid flow channels along each axially aligned column of spiral flow channels that are otherwise each separated from their axially adjacent spiral fluid flow channels by axially spaced fins perpendicular to the rotor axis. The axial connecting passages are connected to fluid transfer passages that transfer the fluids to and from other parts and components of the rotor.

The length of the spiral working fluid and heat transfer fluid flow channels may be altered by increasing or decreasing the spiral pitch and their cross sectional flow area may also be varied along their length by changing the spiral pitch with radius It is generally preferred that the cross sectional flow area of the spiral working fluid flow channels decrease with increasing radius to compensate for the increasing pressures and density of the working fluid at greater radii, as this helps to maintain working fluid flow velocity closer to constant to typically reduce frictional flow losses.

Low flow velocities that ensure laminar flow and that are typically below 2 m·s$^{-1}$ will generally result in the lowest flow losses and highest efficiencies for the thermodynamic machines of the current invention as it relies more on thermal conductivity of the fluid rather than power dissipating turbulent mixing to produce the necessary heat transfer.

In most cases it is expected that a solid radial outer wall will be utilised in the heat exchanger to retain fluids and increase strength, while a solid radial inner wall may or may not be utilised depending upon how fluids are supplied or extracted to or from the heat exchanger. The ends of the heat exchanger will typically be capped by axial end plates that provide rigid axial termination to the fluid pressures within the spiral columns of the working fluid flow channels and heat transfer fluid flow channels.

The preferred method of construction for these annular laminate stack heat exchangers is to cut, stamp, forge, blank, or otherwise form or machine thin laminates that are typically annular in general outline with various perforations from appropriate sheet metal stock and assemble them into axial stacks that are bonded together with a metallic fusion process such as soldering or brazing that utilises a soldering or brazing alloy cladding or coating on the surfaces of some or all of the sheet metal components with lower melting point than the primary sheet metal alloy, but possibly also by welding, diffusion bonding, or polymeric bonding. The laminates may be of constant thickness, in which case at least two types of laminate component assembled in alternating axial sequence will be required, or may in some cases have multiple different thicknesses over their faces in which case only one type of laminate may be required.

The annular laminate stack may be retained within a generally cylindrical tensile ring that is preferably shrink fitted around the outer diameter of the heat exchanger using relative heating and/or cooling of tensile ring or annular laminate stack respectively to induce compressive loads in the radial, circumferential and axial directions within the annular laminate stack and axial end plates, and thereby make it more resistant to the tensile loads created by fluid pressure or centripetal accelerations.

It is generally preferred that during the process of bonding together the axial stacks of annular laminates to form the heat exchangers of the current invention that significant axial pressure, that may be only slightly below the yield strength of the materials at the bonding temperature be applied so as to reduce the chances of any fluid leaking gaps existing in the finished heat exchanger.

Aside from the brazing, soldering, welding, diffusion bonding and polymeric bonding are also potential methods for bonding the laminate layers of these heat exchangers and axial end plates together.

Once bonded together the heat exchangers may optionally also be subjected to internal electroless or chemical plating of the flow passages or application of polymers in order to provide better corrosion resistance or to seal any potential leaks within the heat exchanger.

At low to moderate temperatures aluminium alloys will typically be the preferred material for these heat exchangers owing to low cost, high thermal conductivity, low density and simple processing, however copper alloys may also be utilised in some cases and high thermal conductivity carbon fibre or carbon nanotube composites may also be selected for some applications in which case the system for bonding the fins together is likely to be polymer bonding. At high temperatures there are many materials that may see application such as nickel, iron or cobalt superalloys or possibly molybdenum alloys.

Rotor Counterflow Heat Exchanger

The advantages and simplicity of construction of the axially stacked spiral working fluid flow passage heat exchanger means that this is also a favoured method for making a counterflow heat exchanger for efficiently heating the working fluid with a hot heating fluid stream that is cooling.

The working fluid in the preferred configuration of heat exchanger having spiral working fluid flow channels and axial heat transfer fluid flow channels when utilised as a counterflow heat exchanger preferably flows radially inwards while the hot heating fluid flows back and forth axially through the axial fluid passages that are between the spiral working fluid flow passages at progressively increasing radii starting at the inner radius and finishing at the outer radius. It may be of benefit to utilise smaller working fluid flow passage dimensions in such a counterflow heat exchanger in conjunction with a lower thermal conductivity material to make the heat exchanger in order to reduce the rate of unwanted conduction of heat from the hot inner radius to the cold outer radius through the metal of the heat exchanger.

The other preferred embodiment of heat exchanger with alternating spiral working fluid and heat transfer fluid flow passages within an annular laminate stack may also be used as a counterflow heat exchanger, with the heating fluid flowing in the reverse direction radially, and preferably radially outwards, compared to the working fluid.

Utilising either of these two preferred configurations of rotor heat exchanger as a counterflow heat exchanger has a further advantage in that the outer diameter of the counterflow heat exchanger is relatively cool and so may be more easily retained within a radially exterior structural support ring made of a material that only has high strength at low temperatures. However it may be necessary to limit the axial length of the counterflow heat exchanger in order to prevent damage from differential thermal expansion between the inner radius and outer radius, there are also some materials such as Invar™ or Kovar™ that have relatively low values of thermal expansion coefficient and so may be of use for creating a counterflow heat exchanger of this type. Molybdenum with its relatively high thermal conductivity and low thermal expansion coefficient when compared to most iron, nickel and cobalt alloys may also be a suitable choice of material.

Coolant, Warm Heat Transfer and Cold Heat Transfer Fluids

Desirable attributes for the coolant, warm heat transfer fluid and cold heat transfer fluid are in general: high volumetric specific heat capacity, low viscosity, low bulk modulus (low compressibility), low chemical reactivity, low cost and low toxicity. Liquids are strongly preferred due to their high density and therefore generally smaller flow passage requirements than gases to deliver a given heat flux. Liquids that are primarily composed of water or alcohol with optionally additives to reduce or limit corrosion or other undesirable deposits are likely to be the preferred option in most cases. Water in particular has a high bulk modulus that results in little heating as it undergoes compression and a high specific heat and density that may make it possible to use relatively small diameter flow passages when compared to those that would be required for other heat transfer fluids. Salts or other additives may be added to water to suppress or lower freezing temperature for some applications. For high temperatures there may be other liquids that are preferred such as some alcohols, oils or liquid metals that have relatively low vapour pressure at high temperatures. At very low temperatures it may be desirable to utilise hydrocarbon liquids or even gases such as hydrogen or helium.

Hot Heating Fluid

There are many fluids that may be suitable for transferring heat energy into the rotor. It is preferred that liquid densities be relatively low so as to limit the pressure within the hot working fluid heater inside the rotor. Hydrocarbon oils are attractive at temperatures up to almost 700K. Liquid alkali metals such as sodium-potassium eutectic and lithium have very good heat transfer properties and relatively low density and so are preferred options at higher temperatures. It is also possible that high specific heat gases such as helium and hydrogen may be preferred for use as the hot heating fluid for some applications.

There will be a pressure drop in the hot heating fluid due to the cooling it receives at large radius within the rotor. The pressure drop will increase with greater cooling of the hot heating fluid within the rotor and the heat transfer fluid will thus generally need to be supplied to the rotor under pressure so that the outlet pressure is above zero. As a result the hot working fluid will in many cases need to be pumped into the rotor by an external pump through a hot heating fluid rotary coupling that will typically also need to incorporate a rotary seal to contain and prevent leakage of the hot heating fluid. It is generally preferred to situate the hot heating fluid pump and any such rotary seal at or near the hot heating fluid outlet from the rotor where the hot heating fluid is at its coolest. In many cases it is expected that the hot heating fluid pump will be integrated into the outlet from the rotor, with the rotor acting as a dynamic pump impeller for the hot heating fluid.

Heat Transfer Fluid Pumping

The cold heat transfer fluid and the hot heating fluid both undergo cooling within the rotor, and as such are subject to pressure losses within the rotor as they flow in the reverse direction to a centrifugal thermosiphon and will require external pumps to maintain their flow through the rotor. The warm heat transfer fluid in the heat pump or the coolant fluid in the engine of the current invention both undergo heating within the rotor and will thus have a pressure gain produced by centrifugal thermosiphon to at least partially drive their circulation, but may require an additional external pump to overcome flow losses and maintain the flow at the desired rate.

These heat transfer fluid circulation pumps may be external pumps controlled individually or together and powered by one or more electric motors or the like. In a preferred configuration one or more of the necessary heat transfer fluid pumps in a heat pump or engine of the current invention is integrated into the fluid outlets from the rotor, such that the rotor fluid outlet acts as an impeller that increases the fluid's angular momentum about the rotor axis and in the direction of rotor rotation relative to the fluid inlet.

Heat Transfer Fluid Filters

It will generally be necessary to filter larger particles and detritus from the fluids entering the rotor in order to prevent their accumulation within the rotor that may lead to unacceptable blockage of flow paths or excessive unbalanced mass build-up. Small particles in the heat transfer fluids will typically be transported out of the rotor by viscous drag of the flowing fluids acting upon them. In rotors with the same peripheral velocity but larger diameter the centripetal accelerations will be lower and so larger particulates will be more easily transported back out of the rotor by viscous drag in the heat transfer fluid, and therefore filtering requirements may be relaxed for larger diameter rotors. It is generally preferred that fluids be filtered immediately prior to entering the rotor.

Radiative Heat Exchanger

Radiative heat transfer is a preferred means for transferring heat energy from an external heat source into the rotor to heat the working fluid and thereby create a centrifugal thermosiphon. The heat energy is preferably transferred into the hot heat exchanger by means of placing a radiator within the rotor casing next to but not in contact with the spinning rotor. This radiator radiates heat energy to be absorbed by a radiative receiver that is part of or attached in close proximity to the hot heat exchanger in the rotor, the radiative receiver area required to efficiently receive radiation at high temperatures will in general be a large surface of revolution about the rotor axis and it will often be advantageous to utilise a construction in which received radiative heat is delivered to the working fluid by means of conduction through the material of the radiative receiver over distances exceeding 2-3 mm so as to reduce the number of working fluid flow passages required. The rate of heat transfer is proportional to the difference between the forth power of the temperature of the radiator and the radiative receiver, and as such the rate of heat transfer and the surface area and/or temperature differential required to transfer the necessary power diminishes rapidly as the radiator temperature increases. Some materials emit and absorb heat radiation with significantly poorer efficiency than a perfect black body, these material attributes are called emissivity and absorptivity respectively and if coatings are available that have higher emissivity or absorptivity than the materials that the radiator and radiative receiver respectively are made from, then in many cases it will be useful to apply them to the radiator and/or radiative receiver to increase the rate of radiative heat transfer.

Radiative Disc Receivers

The most preferred configuration for the radiative receiver is that it be in general form of one or more discs of generally annular form centred on the rotor axis and in the case of multiple discs spaced along the rotor axis, with the radiator receiver area through which the radiative heat is absorbed into the rotor being distributed over the one or both axial faces of each disc in a generally annular area extending inwards from the maximum radius of each disc. The hot working fluid heater is comprised of a plurality of passages through which the working fluid flows in parallel within the annular radial zone of the radiative receiver and is either integrated internally into the disc or is bonded to the surface of the disc. The working fluid preferably flows to and from the hot working fluid heater in parallel through multiple radially aligned compression and expansion passages distributed around the rotor axis with the hot working fluid heater connecting these compression and expansion passages together with parallel flow through multiple relatively short heat transfer passages that contribute to a short working fluid circulation path length that helps to reduce the mass of working fluid (in the case of xenon or krypton). It should be noted that 'in parallel' in this context indicates simultaneous flow through the radially aligned passages, a portion of the total flow passing through each passage, and is not intended to indicate that the actual flow paths are aligned in physical parallel. It is preferred that the radial compression passages deliver the working fluid to the hot working fluid heater at a larger radius than the connection of the working fluid heater to the radial expansion passages so that the centrifugal thermosiphon will cause the working fluid to flow in the desired direction. The multiple radial compression and expansion passages also help to cool the areas of the disc radially inwards from the annular radiative receiver area.

The disc or discs will typically be constructed of metal that increases in thickness with decreasing radius in order to reduce the stresses at the hot periphery compared to the cooler inner radii.

The radiative disc receiver may alternatively be formed from multiple annular sectors connected to the rotor at their inner radii and distributed around the circumference of the rotor so that material stresses within the multiple sectors of the annular radiative receiver area are predominantly radial, with relatively small stresses in the circumferential direction.

Radiators.

The radiator used to heat the radiative receiver will in most cases be in the form of one or more radiator tubes within the partially evacuated rotor casing curved in a predominantly circumferential direction around the rotor axis. Heat is delivered to the surface of each radiator tube by a fluid or other heat source within each tube and each tube will preferably have a selectively insulated exterior to preferentially restrict and channel the radiation of heat to the radiative receiver surfaces of the rotor.

There are numerous potential heating fluids sources for the radiator tube including: combustion of a fuel with air, heat pipes in which a gas condenses on the inner surface of the tubes, high temperature heat transfer fluids, and direct radiation from nuclear sources.

For a radiative disc receiver these radiator tubes will be preferably be located axially alongside the annular radiative receiver areas on one or both axial sides of each disc.

Combustion Heated Radiator Tubes

In a preferred configuration combustion of a fuel in air, such as natural gas or some other hydrocarbon fuel, is used to produce hot combustion gases that flow through and heat the radiative tube(s). Combustion heated metallic radiative tubes may operate at temperatures up to about 1400K while some ceramics are capable of even higher temperatures approaching 1600K but are also more expensive. To reduce the amount of heat energy otherwise wasted in the exhaust from the radiative tube(s) it is preferred that there be a counterflow heat exchanger in the form of a regenerator or recuperator that uses the otherwise wasted heat energy in the exhaust gases to preheat the incoming air prior to combustion with the fuel.

The flow of air through the radiator tube(s) is preferably driven by a fan or the like at the cold air inlet to the recuperator or regenerator.

To minimise exhaust heat losses from a combustion heated radiator it is preferred to minimise the exhaust mass flow by operating the combustion at near to stoichiometric conditions so that there is almost no unreacted oxygen in the exhaust. Undesirably this would typically produce unacceptably high gas temperatures just after combustion and would create unwanted nitrogen oxides and gas temperatures that could be destructive to the radiator tube. Therefore in a preferred configuration additional fuel is injected into the air and combustion gases at multiple locations along the length of the flow path through the radiator tube(s) to burn with and reheat the combustion gases as they flow through the radiator tube(s) transferring heat energy to the radiator tubes for radiating to the radiative receiver(s). This will beneficially limit the combustion gas temperatures within the radiator tubes while still ultimately permitting near stoichiometric combustion to reduce the quantity of waste heat in the exhaust.

Heat Pipe Radiator Tubes

A further preferred configuration of radiator tube is to construct them as heat pipes that employ vaporised metals to transfer heat from a small or localised boiler that is connected to the radiator tube. The metal is boiled in the boiler and condenses on the inner surface of the radiator tube to then transfer heat via radiation to the radiative receiver. Such a heat pipe can provide relatively consistent heating of the radiator tube with the condensed liquid metal preferably draining using gravity back to the boiler and sodium and lithium being preferred examples of heat pipe fluid for use at high temperatures in excess of 1000K. Molybdenum and other refractory metals may be utilised for heat pipe in areas that are not exposed to hot oxidising gases, the partially evacuated rotor casing may be suitable for such refractory materials if it contains little oxygen or water. A solar boiler made from a refractory metal for concentrated solar energy may be constructed within an evacuated volume covered by a transparent window to prevent unwanted oxidation of the refractory metal.

Electrical Heating of Radiative Receiver

In some applications it may be desirable to occasionally utilise electricity as an energy source to heat the radiative receiver, in which case the energy may be transferred to the radiative receiver either as radiant heating from a hot resistive element within the rotor casing, or by means of electromagnetic induction utilising rapidly oscillating magnetic fields on the surface of the rotor radiative receiver to heat the electrically conductive metal of the rotor radiative receiver area.

Solar Concentrator

A further preferred option for the radiator is to utilise a concentrating optical system such as a parabolic mirror or lens to focus concentrated sunlight through a transparent aperture in the rotor casing directly onto the radiative receiver. Sunlight can typically be economically concentrated by over 2000 times in a parabolic mirror or Fresnel lens to produce very concentrated radiative flux when compared to the radiative flux from a radiator tube at less than 1400K. High solar concentration makes it feasible to deliver solar heat by means of one or more relatively small apertures to only a very small proportion of the total radiative receiver area, and use the rapid rotation of the rotor to maintain a lower average heating flux over the radiative receiver surface as it is cyclically illuminated by the concentrated sunlight. Concentrated sunlight using a Fresnel lens is preferred as the rotor will typically shade some of a parabolic mirror surface if a mirror is used instead. A Fresnel lens may also advantageously be constructed to deliver concentrated solar radiation to a non-circular radiative receiver target.

Advantageously this makes it possible to combine concentrated solar heating that illuminates only a small area of the radiative receiver with a radiator heated by a lower temperature heat source that heats the rest of the radiative receiver with a lower radiative heat flux. In this way solar heating may be supplemented or replaced when it is insufficient.

Rotor Windage

The gas frictional drag on the outside of a spinning rotor is known as windage and creates a windage power loss approximately proportional to the density of the gas surrounding the rotor, the rotor rim tangential velocity $v_{rim}$ to the power of three and the rim radius $r_{rim}$ to the power of two. The windage power loss for a rotor spinning at high speed in the atmosphere is relatively large and such atmospheric windage would in most cases overwhelm any power savings that the engine or heat pump of the current invention might otherwise provide compared to more conventional compressor driven heat pumps and other types of engine. This necessitates design features to reduce windage power loss.

Reducing $v_{rim}$ and $r_{rim}$ and the axial length of the rotor will generally all help to reduce windage power loss, and this may be made easier by increasing the density of the working fluid. The greatest potential for reducing the rotor windage losses comes from surrounding the rotor in a gas of low density relative to the ambient atmosphere that will almost always require the use of a rotor casing within which the rotor rotates and in which a low density gas can be contained in isolation from the atmosphere. The low density gas can be created by employing one or more of the following: filling the rotor casing with a low molecular weight gas, heating, partially evacuating the rotor casing.

Rotor Casing

The rotor casing will typically be in general form a shell of revolution about the rotor axis, and will have rotor casing ports at one or both axial ends of the rotor through which fluids may enter or leave the rotor and through which mechanical connections such as bearing mounts and rotary drives may be connected to the rotor. The rotor casing ports will generally be circular and will in many instances be partially or completely sealed by rotary rotor vacuum seals between the spinning rotor and the rotor casing so that fluids may enter and exit the rotor in partial or complete fluid isolation from the gas within the rotor casing. If the rotor vacuum seals are subject to some leakage either at rest or during operation then it will generally be necessary to make use of a vacuum pump to reduce the pressure of the gas within the rotor casing.

The rotor casing also serves as a protective barrier preventing external objects from impacting upon the fast spinning rotor and in the event of a rotor failure it will preferably be designed to retain any fast moving fragments that are released.

Windage Reduction by Rotor Casing

The rotor casing is able to reduce windage losses even if it is open to the atmosphere, as much of the windage losses will typically arise as a result of the surrounding gas being pumped in a radially outwards direction on axial faces. The rate at which this flow and windage power loss occurs can be minimised by creating an appropriate axial gap between axial faces of the rotor and the casing so that the turbulent boundary layers between the stationary and the rotating axial faces are merged. This is generally preferred even if other means are also used to further reduce rotor windage losses. The gas within the rotor casing will also be heated slightly by both the windage and convection from the hot surfaces of the rotor, and this may additionally reduce the gas density and windage losses.

Reducing Windage Using Partial Evacuation

The most preferred method of windage reduction is reducing the pressure, and therefore density of the gas within the rotor casing relative to the ambient air using a vacuum pump or the like enabling the rotor windage drag to be reduced to extremely low levels. The vacuum pump will typically have an inlet within the rotor casing and will be vented to the ambient atmosphere, and depending upon the type of rotor vacuum seals that are employed may only need to be operated intermittently in order to maintain the rotor casing vacuum below the desired level.

Reduced Windage Using Lower Molecular Weight Gases

Gas contained within the rotor casing to reduce windage losses can be reduced in density by replacing air with an average molecular weight (MW) of 28 g·mol$^{-1}$ with a gas that has lower molecular weight with examples in order of increasing average molecular weight including hydrogen, helium, methane, ammonia and water. Hydrogen and helium are significantly lower than the other gases, and have another potential advantage in that the stagnation temperatures created by the impact of these low MW gases upon the outside of the high velocity exterior rotor surfaces will be relatively low due to the high specific heats that hydrogen and helium have. Methane is a potentially useful option because many applications may have natural gas available that can be used as a supply of methane.

Water is also of potentially a good choice as it is cheap, safe, commonly available, and can be used to displace air or other gases from the rotor casing by first filling the rotor casing with water when the rotor is stationary and then draining it at startup, quickly establishing a partial vacuum at a pressure set by the vapour pressure of water, after which a vacuum pump may be used or possibly a refrigerated trap to condense water vapour out of the rotor casing and further reduce the pressure.

Using a non-oxidising low density gas within the rotor casing may also enable the use of some materials like molybdenum that have good strength at high temperature but are not oxidation resistant.

For some preferred embodiments of the heat pump of the current invention it may be possible to leave the rotor casing venting to the atmosphere. In particular for heat pumps of the current invention utilising only a compressor to drive the working fluid circulation and using xenon as the working fluid the rotor tangential velocity at the maximum radius is likely to be low enough that it is unnecessary to make any further efforts to reduce the gas density within the rotor casing.

Rotor Vacuum Seals

It is necessary to pass fluids to and from the rotor to extract and optionally deliver heat energy and if the rotor casing is to be filled with a low density gas or be partially evacuated then these fluids need to enter and exit the rotor through circular rotor vacuum seals that seal between the spinning rotor and the stationary rotor casing at or near the rotor axis at one or both ends of the rotor.

It is preferred that the rotor vacuum seals have low friction, low leakage to reduce vacuum pumping requirement and low wear to reduce maintenance. The seals may be subjected to relatively high sliding speeds at their sealing interfaces due to high rotor peripheral speeds and the volume of heat transfer fluids that must enter and exit the rotor thorough their inner diameters. Increased sliding speeds tend to greatly increase frictional losses so to minimise seal sliding speeds and losses it is generally preferred that there be a rotor vacuum seal at each end of the rotor and that they be of similar internal diameter.

There are many types of seals that may be utilised, but the most preferred general class of seal are liquid barrier seals that includes hydrodynamic seals, dynamic/expeller/repeller seals, magnetic fluid seals, lubricated face seals and lubricated polymeric lip seals all of which utilise a liquid barrier fluid at the sliding interface to prevent gas leakage into the partially evacuated rotor casing and reduce seal wear. Each of these seals may be suitable for use as rotor vacuum seals on the engine and heat pump of the current invention, but there are two types of liquid barrier seal that are most preferred for use as rotor vacuum seals in the engine and heat pump of the current invention:

Magnetic fluid seals utilise a fluid containing magnetic particles that is held in place between a matched set of inner and outer arrays of ring-shaped magnetic poles, so that the magnetic fluid forms a sequence of axially separate rings of fluid. Each of these magnetic fluid rings is typically capable of withstanding a pressure of a fraction of sea level atmospheric pressure so normally several such rings are required to provide an atmosphere to vacuum seal. This type of seal is highly advantageous in that it can be used to provide a near-perfect hermetic seal both when the rotor is rotating and when it is stationary. This may greatly reduce the amount of vacuum pumping required to maintain the partial vacuum inside the rotor casing or even eliminate the need to use a vacuum pump altogether after it is initially evacuated. Magnetic fluid seals generally cannot maintain a seal at high surface sliding speeds and so while they are likely to be capable of providing sealing over the range of operational speeds for some rotors they may not be capable of sealing some rotors at higher speeds.

Dynamic seals otherwise known as repeller or expeller seals operate by spinning a barrier liquid rapidly about the rotor axis within a radially inwards facing dynamic seal barrier liquid cavity that is a cavity of revolution about the rotor axis, thereby establishing a radial pressure gradient within the barrier liquid. A dynamic seal rotor that is a body of revolution about the rotor axis and that rotates about the rotor axis relative to the dynamic seal barrier liquid cavity is partially immersed in the barrier liquid within the dynamic seal barrier liquid cavity and drives the rotation of the barrier liquid within the dynamic seal barrier liquid cavity. A pressure differential between the two axial sides of the dynamic seal rotor causes a relative radial displacement of the radially inner free surface of the barrier liquid between the two axial sides of the dynamic seal rotor thereby compensating for the pressure differential using the radial pressure gradient within the rotating barrier liquid, so that on the lower pressure side the free surface of the barrier liquid will be at a smaller radius from the rotor axis than on the higher pressure side. To create the necessary radial pressure gradient within the barrier liquid either the dynamic seal barrier liquid cavity may rotate, or the dynamic seal rotor may rotate about the rotor axis. Dynamic seals of this type may operate at very high speeds and may accommodate a relatively large amount of misalignment as well as radial and axial movement between the dynamic seal barrier liquid cavity and the dynamic seal rotor while maintaining a gas-tight seal. They do not wear, but unfortunately they do not seal without rotation meaning that without other means of maintaining the seal when the rotor slows or stops the partial vacuum within the rotor casing will need to be re-evacuated every time the rotor is started up, and this may make the process of start-up much slower and more wasteful of energy, as well as requiring a larger vacuum pump.

Dynamic rotor vacuum seals utilised for rotors of the current invention may be combined with a secondary seal that provides better sealing at low speed, and stops functioning as speed and centrifugal forces increase, preferred examples of such secondary seals are: polymeric lip seals attached to the rotor that deform and lose sealing contact when subjected to sufficient centripetal acceleration, magnetic fluid seals in which magnetic fields hold a liquid that contains magnetic particles in place against gas pressure.

The level of vacuum that can be maintained by a liquid barrier seals may be limited by the boiling of the barrier liquid as it gets hotter so it may be necessary to utilise a low vapour pressure barrier liquid in the seal such as a vacuum pump lubrication oil and also to cool the seal and possibly using a cold labyrinth seal or other clearance seal between the liquid barrier seal and the interior of the rotor casing to condense and drain away any barrier liquid that does evaporate on the low pressure side of the rotor vacuum seal.

The barrier liquid may also be used to lubricate one or more rotor bearings.

It is generally beneficial to reduce the frictional losses of the rotor vacuum seals, and one possible means for achieving this is to reduce the pressure that the rotor vacuum seals must seal against. This means that for many applications and embodiments of the thermodynamic machine of the current invention it will be preferred that the heat transfer fluids that enter and exit the rotor, possibly including one or more of: warm heat transfer fluid, cold heat transfer fluid, coolant fluid and hot heating fluid, will have a static pressure at the rotor inlet and/or rotor outlet fluidically adjacent the rotor vacuum seal or seals that is at a pressure significantly lower than ambient atmospheric pressure. Ideally the static pressure on the rotor vacuum seal will be at or just above the vapour pressure of the heat transfer fluid.

This may be achieved by sealing the liquid heat transfer fluid in question within a heat transfer fluid circulation system isolated from the atmosphere or other external pressure sources. The heat transfer fluid circulation system is preferably connected to the rotor heat transfer fluid inlets and outlets through the centre of the rotor vacuum seal or seals and then evacuated to remove gases and vapour until the only vapour present in the system is the gaseous form of the heat transfer fluid itself. In doing this a 'free surface' boundary between the liquid and gaseous forms of the heat transfer fluid will generally be formed somewhere within the heat transfer fluid circulation system. An example of this would be the generally flat top surface of the liquid in a partly filled heat transfer fluid reservoir tank, with the gaseous form of the heat transfer fluid above it. Using this approach the pressure differential that the rotor vacuum seals are subjected to may be reduced to a small fraction of atmospheric pressure, and in some cases either with low rotor speeds or low heat transfer fluid vapour pressures it may be that the rotor vacuum seals are no longer required to reduce rotor windage to acceptable levels.

In such a low static pressure heat transfer fluid system it is preferred that the areas adjacent any rotor vacuum seals be drained by a pump or by gravity to a heat transfer liquid reservoir tank in order to prevent the accumulation of any liquid that might otherwise overwhelm or contaminate the seal. A pump in the circulation system may be necessary to deliver heat transfer fluid to the rotor inlet at the necessary flow rate.

Reducing the static pressure of the heat transfer fluids on the higher pressure side of the rotor vacuum seal to below the typical 0.2 bar pressure limit of a simple and compact single stage magnetic fluid seal may allow the use of a single stage magnetic fluid seal with consequently low frictional losses. Usefully 0.2 bar is the vapour pressure of water at 60° C. which is typically at the upper end of temperatures required for domestic use, but there are also many other potential heat transfer fluids that have vapour pressures far lower than water, such as various vacuum oils, though few have water's useful combination of attributes that includes: low-cost, non-toxicity, relatively low viscosity, high specific heat and resistance to gas evolving decomposition at high temperature.

Even in the case of a rotor vacuum seals that do not completely seal when not in operation, such as dynamic or expeller seals, or lip seals that have some leakage during operation, maintaining the heat transfer fluids at the relatively low static pressures equal to their vapour pressure greatly reduces the amount of vacuum pumping energy required to evacuate the rotor casing and return the vapour to the heat transfer fluid circulation system to thereby reduce windage to acceptable levels.

Another preferred option is the use of eutectic or near eutectic composition liquid sodium potassium (NaK) alloy as a heat transfer fluid. It has a useful combination of very high thermal conductivity and low viscosity that give it excellent heat transfer characteristics. It also has very low vapour pressure that will in many cases eliminate the need for rotor vacuum seals entirely. It will also not decompose into unwanted gases upon hot radiator or receiver surfaces within the rotor casing, and usefully it also has a melting temperature of 261K making it a suitable cold heat transfer fluid for a wide range of heat pump applications. It may also work well as a warm heat transfer fluid, coolant fluid or hot heating fluid. Use of NaK may better enable a permanently sealed rotor system that does not require a vacuum pump after initial evacuation during manufacture through there are dangers and materials issues arising from its high levels of chemical reactivity.

Lithium also has low vapour pressure at elevated temperatures, though is generally only suited for use as a hot heating fluid owing to its relatively high melting temperature.

Rotor Bearings and Bearing Mounts

The rotor bearings that support the rotor preferably have low bearing frictional losses while operating reliably at high rotor angular speeds for extended periods. For mobile applications they may also be required to withstand large gyroscopic reaction forces. It is preferred that in most cases the rotor bearings be either rolling element bearings or hydrodynamic bearings. Rolling element bearings normally have lower frictional losses than hydrodynamic bearings, but hydrodynamic bearings may have greater reliability and longer life at high speeds. Hydrodynamic journal bearings may also include intermediate cylindrical bushes commonly known as floating rings between the inner and outer bearing surfaces that may reduce the bearing friction and reduce radial stiffness. Hydrodynamic rotor bearings may also be usefully combined with various types of rotor vacuum seal and utilise the hydrodynamic bearing lubricant as a rotor vacuum seal barrier liquid.

In a preferred configuration a rotor bearing being either a rolling element bearing or a hydrodynamic journal bearing will be located at each end of the rotor to provide widely spaced support that is better able to withstand rotor inertial forces upon the rotor bearings. Heat transfer fluids may or may not flow through the inner diameter of the rotor bearings to enter and/or exit the rotor. If they do not flow through the inner diameter of the bearings then the rotor bearing may be smaller diameter with lower frictional losses and longer life, though additional rotary seals may then be necessary to isolate the rotor bearing from heat transfer fluids, such seals may be omitted if the bearing is lubricated by heat transfer fluid, and in such cases ceramic rolling element bearings are particularly well suited for being lubricated by well filtered heat transfer fluids like water or alcohols.

It is preferred that only a single rotor bearing incorporate a capability to resist axial loads from the rotor so as not to create unnecessary axial bearing loads in both rotor bearings.

In a further preferred configuration for rotors that are used in stationary applications the rotor axis may be aligned vertically so that a single rotor bearing may then be used at the top end of the rotor, suspending the rotor directly underneath. This may be particularly advantageous when utilising a hot heating fluid to bring heat energy into the rotor, as it may make it possible to have one end of the rotor at high temperature with no bearings to keep cool.

The rotor bearings will generally be mounted in rotor bearing mounts within the rotor casing or as an extension from the rotor casing.

Autobalancers

The centre of mass of the rotor and all the fluids that it contains may shift away from the rotor axis slightly over time and with changing rotor speed owing to a number of factors such as: changing fluid densities, variable filling of fluid passageways, accumulation of detritus in fluid passages, erosion or corrosion of fluid passages and hot components, elastic or thermal deformation, plastic deformation of components, foreign object ingestion and damage, outgassing from polymeric materials and rotor asymmetry due to design and/or manufacturing variance. Such rotor imbalance may lead to high rotor bearing forces that are detrimental to both bearing life and bearing friction. For this reason it is preferred that the rotor bearings or rotor bearing mounts for the rotor have relatively low radial stiffness and that the rotor operate at a speed above the first natural frequency of radial oscillation for the rotor mass in the low stiffness radial bearings or rotor bearing mounts so that the rotor has a tendency to rotate about an axis of rotation that is moved from the rotor axis towards the rotor's centre of mass. Additionally it is preferred that one or more autobalancers be incorporated within the rotor so that when operating at speeds above the first natural frequency of radial oscillation the autobalancer redistributes mass within itself in a manner that tends to bring the centre of mass of the rotor back into coincident alignment with the rotor axis thereby reducing radial oscillation of rotor bearings and rotor vacuum seals.

The autobalancer will preferably be constructed of a number of identical rollers that partially fill the circumference of a cavity of revolution about the rotor axis. Additionally there may be a viscous fluid of some type partially filling the cavity of revolution in order to rapidly reduce angular speed differentials between the rollers and the rotor during rotor angular acceleration. If there is a single autobalancer within the rotor then the centre of mass of the autobalancer rollers is preferably in the same plane perpendicular to the rotor axis as the rotor centre of mass, but if there are multiple autobalancers within the rotor then it is preferred that the rotor centre of mass lies axially between them.

Rotor Motor

In almost all cases the rotor of the engines and heat pumps of the current invention will need to be powered by a rotor motor to accelerate the rotor up to the desired operational speed and to overcome the frictional losses associated with rotor windage, bearings and rotor vacuum seals as well as any fluid pumping that is performed by the rotor on the heat transfer fluids exiting the rotor with a net increase in angular momentum in the direction of rotor rotation compared to their angular momentum when they entered the rotor. It is preferred that the rotor motor be electrically powered so that the rotor speed may be easily controlled. The motor may also be able to operate as a generator to convert rotational kinetic energy into electricity when slowing the rotor.

It is preferred that the rotor motor be direct drive, with the rotating part of the motor (the motor rotor) attached to the rotor, and that the rotor be within the partially evacuated rotor casing so as to reduce the windage losses associated with the motor as well as allowing the motor to be large diameter to thereby reduce the weight of the motor rotor. An axial flux type motor is preferred as it reduces the size of the magnetic forces acting in a radial direction that might perturb the radially soft rotor bearing mounts and thus potentially interfere with the operation of the autobalancers. Permanent magnet rotor motors are preferred as they will generally have higher efficiency.

Rotary Electrical Couplings

For the engine of the current invention containing a power turbine as well as for heat pumps of the current invention that employ a working fluid compressor it is necessary to transfer electrical power between the rotor and an exterior electrical load or supply, and this is achieved by means of a rotary electrical coupling. There are two main preferred configurations for this rotary electrical coupling: rotary inductive couplings and liquid metal rotary electrical couplings. A less preferred option is contacting electrical slip rings, as they typically suffer from wear.

Rotary Inductive Couplings

A rotary inductive coupling for the purpose of power transmission between rotor and an inductive coupling stator exterior to the rotor behaves as an electrical transformer with an air gap in the magnetic flux path between the rotor and the inductive coupling stator. There are no wearing parts, high power transfer efficiencies are possible and voltages may be efficiently altered during the power transmission process.

A rotary inductive coupling is relatively insensitive to the relative velocity across the magnetic flux gap between rotating and stationary components and so does not need to occupy locations close to the rotor axis near the ends of the rotors where fluid coupling and rotor bearings are most advantageously located, but may instead by formed as a ring around the rotor axis at relatively large radius.

It will generally be advantageous to utilise a rotary inductive coupling in which the vector sum total of magnetic forces on the surface of the rotor approximately cancel out to leave only a small residual magnetic force. If using autobalancers in the rotor it may also be important to have the majority of the inductive coupling magnetic flux air gaps between axial faces to reduce the magnitude of potential radial magnetic forces produced by the inductive coupling. In a preferred configuration the rotary inductive coupling is integrated into an axial flux rotor motor so as to reduce residual radial and axial magnetic forces.

Liquid Metal Rotary Electrical Couplings

A liquid metal rotary electrical coupling makes at least two direct electrical contacts between the electrical power circuit within the rotor and the external electrical power source or load so as to provide a complete electrical circuit that passes through the rotor. Each of the at least two electrical contacts is formed between a stationary annular electrode on the rotor axis and a complementary rotating annular cavity that the annular electrode fits within with clearance. A quantity of a liquid metal is held within each rotating annular cavity by some combination of rotary seals and centrifugal forces. There are a number of metal alloys with low melting points that may be used such as mercury, sodium-potassium eutectic, and various gallium alloys that are the most preferred owing to their low toxicity and relatively low chemical reactivity.

Applications

The high efficiency of the engine cycle of the current invention may make it economic to extract energy from relatively low temperature heat sources that have not previously been economic, and also to greatly increase the efficiency of power production from various sources of heat energy.

There are numerous applications for the engine for the current invention, some of which include: Household power generation using natural gas owing to relatively high efficiency in small sizes and long life; Power generation using exhaust from other fuel burning engines, engine coolant or waste heat from industrial processes; Power generation from geothermal energy; Power generation from solar energy either with direct illumination or from stored heat; Power generation from small nuclear heat sources; Power generation from burning of organic or industrial waste; Vehicle propulsion.

The very high efficiency of these heat pumping cycle and the relatively wide temperature range of the possible working fluids means that it may be economically applied to producing both very low temperatures and very high temperatures that have generally not been economic for the application of heat pumps.

There are a large number of potential applications for the heat pump of the current invention, some of which include: Domestic or Industrial air conditioning, both for cooling and for heating; domestic or industrial water heating; domestic or industrial refrigeration; Air liquefaction or gas separation; Providing heating above the boiling point of water for industrial processes or cooking; Cryogenic cooling; Swimming pool heating; Vehicle air conditioning; Transport refrigeration.

A further step that may be advantageous is to combine several rotors working in parallel with each other into a single heat pump or engine as then each individual rotor may be made smaller with shorter flow paths that use a smaller quantity of the expensive xenon or krypton working fluid to produce a given amount of power.

For many heating and cooling applications it will be possible to store a heated or a cooled fluid for use at periods of greater demand, and thereby potentially allow the heat pump to be smaller and cheaper.

DETAILED DESCRIPTION OF THE PREFERRED EMBODIMENTS, WITH REFERENCE TO THE DRAWINGS

FIG. 1 shows a cross sectional view of a preferred embodiment of an electrically powered compressor driven heat pump of the current invention in a plane coincident with the rotor axis 2 in which a rotor 4 made up of a large number of internal components rotates at a rotor angular speed about the rotor axis in an anticlockwise direction when viewed from the right supported on a warm end rotor bearing 6 and a cold end rotor bearing 8. The warm end rotor bearing and the cold end rotor bearing are each mounted within radially compliant bearing mounts 10 that have relatively low radial stiffness and as a result lower the first natural frequency of radial oscillation of the rotor to a speed below the normal operational speed of the rotor so that the plurality of autobalancer rollers 12 that are free to roll within the autobalancer channel 14 that is a cavity of revolution about the rotor axis within the rotor will tend to redistribute themselves to bring the rotor's centre of mass into coincident alignment with the rotor axis and as a result reduce the magnitude of oscillatory inertial radial forces on the warm end rotor bearing and cold end rotor bearing.

The radially compliant bearing mounts are supported off of the axial ends of a rotor casing 16 that is in general form a shell of revolution about the rotor axis. An electrically powered rotor drive motor 18 provides the rotor drive torque required to spin the rotor at the desired rotor angular speed and is of the axial flux variety in which almost all of the magnetic forces on the rotor are in an axial direction parallel to the rotor axis so as to reduce unwanted radial deflections of the radially compliant bearing mounts. The rotor casing provides protection against external objects impacting the rotor and also provides containment of any fast movement fragments in the event that the rotor should disintegrate. The rotor casing preferably fits about the rotor such that the clearance between the rotor and the rotor casing on those outer surfaces of the rotor that are approximately annular approximately minimises the windage drag losses caused by the formation of radially circulating air vortices. A rotor casing drain port 20 allows any fluids that leak into or condense within the rotor casing to be drained away, and may optionally also be used as a control port connected to an external pressure control device (not shown) to permit control of the air pressure within the rotor casing to either reduce windage losses by decreasing the air pressure or alternatively to prevent liquid leakage into the rotor casing by using the rotor casing drain port to increase the air pressure within the rotor casing.

The working fluid is hermetically sealed within the rotor and when in operation circulates about a working fluid circulation path, passing cyclically in succession through: a working fluid radial compressor 22 connected to the compressor motor rotor 24 that is driven to rotate with respect to the rotor by the compressor motor stator 26 that is connected to and rotates with the rotor; a plurality of compression passages 28 that the working fluid flows in parallel through as it flows radially outwards undergoing compression and rising in temperature with preferably little heat transfer into or out of the working fluid as it does so; a working fluid cooler 30 that is preferably symmetrical about the rotor axis through which the working fluid flows in a generally radially outwards direction undergoing further compression while also being cooled by heat transfer to the relatively colder warm heat transfer fluid that flows through separate fluid passages within the working fluid cooler; a plurality of expansion passages 32 that the working fluid flows in parallel through as it flows radially inwards undergoing expansion and reducing in temperature with preferably little heat transfer into or out of the working fluid as it does so; a cold working fluid heater 34 that is preferably symmetrical about the rotor axis through which the working fluid flows in a generally radially inwards direction undergoing further expansion while also being heated by heat transfer from the relatively warmer cold heat transfer fluid that flows through separate fluid passages within the working fluid heater; the working fluid then flows radially inwards through a plurality of compressor inlet passages 36 to reach the working fluid radial compressor 22 completing the sequence of thermodynamic processes within the working fluid circulation path.

The compressor motor rotor 24 rotates about the rotor axis in order to minimise the radial loads on the gas lubricated compressor bearings 38. An axial compressor bearing 40 is also incorporated to accommodate the axial load on the compressor motor rotor caused by the higher pressure on the working fluid compressor outlet. The use of a radial compressor within the rotor has several significant advantages: it is a mechanically simple and efficient form of compressor that is not subject to wear, the compressor can operate at a rotational speed independent of the rotor angular speed making it possible to match the necessary pumping power to the heat pump temperature differential as well as allowing a reduction in the overall diameter of the compressor so that the compressor blades are not unacceptably short even when the working fluid is at elevated pressure and density to reduce the size of the heat exchangers and working fluid flow passages and so reduce the size of the rotor and quantity of expensive working fluid required. The compressor motor stator is powered by an external electricity supply that is connected to the rotor by means of a liquid metal rotary electrical coupling 42.

The warm heat transfer fluid enters the rotor by means of a rotor warm heat transfer fluid inlet 44 radially interior to a rotor warm heat transfer fluid outlet 46 that operates as the impeller for a centrifugal pump that discharges into a warm heat transfer fluid outlet radial diffuser 48 attached to the rotor casing and from there flows to the warm heat transfer fluid outlet 50 to thereby drive circulation of the warm heat transfer fluid through the rotor and the heat exchangers external to the rotor (not shown) that cool the warm heat transfer fluid. The warm heat transfer fluid undergoes a slight pressure gain within the rotor owing to the effects of centrifugal thermosiphon, and this helps to diminish the pumping power required to circulate the warm heat transfer fluid. Within the rotor the warm heat transfer fluid flows in parallel through warm heat transfer fluid outward flow passages 52 to the working fluid cooler through which it then flows in parallel through a large number of working fluid cooler tubes 54 that are preferably in general parallel to the rotor axis and that are distributed throughout the axial spaced array of generally annular fins in the working fluid cooler through which the working fluid flows. After it has flowed through the working fluid cooler the warm working fluid flows back to the rotor warm heat transfer fluid outlet by means of a plurality of warm heat transfer fluid inward flow passages 56.

The cold heat transfer fluid enters the rotor by means of a rotor cold heat transfer fluid inlet 58 radially interior to a rotor cold heat transfer fluid outlet 60 that operates as the impeller for a centrifugal pump that discharges into a cold heat transfer fluid outlet diffuser 62 attached to the rotor casing and from there flows to the cold heat transfer fluid outlet 64 to thereby driving circulation of the cold heat transfer fluid through the rotor and the heat exchangers external to the rotor (not shown) that warm the cold heat transfer fluid. The cold heat transfer fluid undergoes a slight pressure loss within the rotor as it works against a centrifugal thermosiphon, and this may increase the pumping power required to circulate the cold heat transfer fluid, though the effect is somewhat diminished by the radial proximity of the working fluid heater to the rotor axis. Within the rotor the cold heat transfer fluid flows in parallel through cold heat transfer fluid outward flow passages 66 to the cold working fluid heater through which it then flows in parallel through a large number of working fluid heater tubes 68 that are preferably in general parallel to the rotor axis and that are distributed throughout the axial spaced array of generally annular fins in the cold working fluid heater through which the working fluid flows. After it has flowed through the cold working fluid heater the cold working fluid flows back to the rotor cold heat transfer fluid outlet by means of a plurality cold heat transfer fluid inward flow passages 70.

Insulating gaps 72 are utilised within the rotor to limit heat transfer between components at significantly different temperatures and thereby improve the efficiency of the heat pump.

Within the interior rotor volumes within which fluids flow across significant radial spans there are radial barriers such that they are no cavities of revolution about the rotor axis with significant radial extent. This prevents the creation of large tangential fluid velocities and flow losses associated with Coriolis effects within the fluids as they flow in radial directions. Both the working fluid cooler and the cold working fluid heater incorporate such radial barriers 74 between the largely annular fins to prevent large tangential velocities in the working fluid as it passes through the working fluid cooler and the cold working fluid heater, though in this preferred embodiment the radial barriers are in general form spirals in a plane perpendicular to the rotor axis, as is further illustrated in FIG. 4.

FIG. 2 shows an enlarged cross sectional view in a plane coincident with the rotor axis 2 of the liquid metal rotary electrical coupling 42 of FIG. 1. Current flows to and from the rotor by means of stationary electrode discs 76 coaxial with the rotor axis 2, each stationary electrode disc being attached to one terminal of an external electrical supply (not shown), and otherwise insulated from contact with each other. The stationary electrode discs are immersed at their radial outermost extent in separate annular liquid metal pools 78, each annular liquid metal pool is held in place by centrifugal reaction forces at the radially outermost extent of two separate rotor electrode cavities 80 that are part of the rotor and that are in general form cavities of revolution about the rotor axis. These annular liquid metal pools thereby provide a smoothly sliding and non-wearing electrical contact between the stationary electrode discs and their respective rotating rotor electrode cavities. Current flows from one rotor electrode cavities to the other by means of a current conducting path within the rotor that transfers electrical power to the compressor motor stator to drive the compressor motor. A liquid metal rotary electrical coupling seal 82 limits leakage of the liquid metal to the ambient environment, and the liquid metal is preferably a low melting point metal such as mercury or an alloy containing gallium or a sodium potassium alloy.

FIG. 3 shows an enlarged cross sectional view in a plane coincident with the rotor axis 2 of the rotor cold heat transfer fluid outlet 60 of FIG. 1, illustrating the manner in which the rotor cold heat transfer fluid outlet is radially exterior to the rotor cold heat transfer fluid inlet 58 and forms the impeller for a centrifugal pump that discharges into a cold heat transfer fluid outlet diffuser 62 attached to the rotor casing 16, it also shows the radially compliant bearing mount 10 of the cold end rotor bearing 8 that is in this preferred embodiment formed from flexible polymeric elements interposed between the rotor casing and the cold end rotor bearing.

FIG. 4 shows details of preferred embodiment of the working fluid heater and/or working fluid coolers such as are used in the heat pump of FIG. 1 and that may also be utilised in other heat pumps and engines of the current invention and which operate as heat exchangers to transfer heat between the working fluid and the warm heat transfer fluid or cold heat transfer fluid or coolant fluid or hot heating fluid. Four axial fin layers 84 from a complete heat exchanger are shown axially displaced from the component parts for two fin layers in axially exploded form. The heat exchanger is in general form a cylindrical body of revolution about the rotor axis 86 penetrated by a plurality of working fluid flow passages 88 that connect the inner and outer diameters of the heat exchanger and that are arrayed with rotational symmetry about the rotor axis and arrayed linearly along the rotor axis. The working fluid flow passages are each in general form planar spirals about the rotor axis that have relatively constant cross sectional flow area along their length, though the cross sectional flow area of each passage may also be varied along the length by altering the spiral pitch with radius if that is determined to be preferable. The working fluid flow passages are each separated from their respective nearest circumferentially adjacent working fluid flow passages by spiral fingers 90 that are aligned axially in each successive layer to form axial stacks along the length of the heat exchanger thereby creating a continuum of material in the axial direction of the heat exchanger associated with each spiral finger with fins bridging between circumferentially adjacent spiral fingers. The spiral fingers are penetrated in the axial direction by axial fluid passages 92 through which the warm heat transfer fluid or cold heat transfer fluid or coolant fluid or hot heating fluid flows in an axial direction in fluid isolation to the working fluid. In the preferred embodiment of FIG. 4 the heat exchanger is constructed from thin annular discs 94 that are stacked in alternating layers with spiral fingers 96 and bonded together to form a solid mass. The spiral fingers may have different thickness to the annular discs in order to improve the strength or heat transfer performance of the working fluid heater or cooler. Optionally there are also axial tubes 98 inserted through each axial fluid passage and bonded within them to better seal the passages from fluid leakage to or from the working fluid flow passages.

In a preferred method of construction the annular discs and spiral fingers are created by cutting them from sheet metal feedstock, the sheet metal feedstock being preferably primarily an aluminium or copper alloy owing to their high thermal conductivity, though other materials may be preferably for some applications. It is also preferred that the spiral fingers or less preferably the annular discs, or both, have a brazing metal or alloy surface coating on both sides with a melting temperature below that of the sheet metal feedstock. This brazing surface coating may be applied to the sheet metal feedstock before or after it is cut to create the spiral fingers and/or the annular discs. To form a finished working fluid heater or cooler the component parts are clamped together into a correctly aligned axial stack and then heated while axial pressure is applied to allow the brazing metal or alloy to melt and flow and bond all of the components together into a rigid assembly. It is anticipated that in many cases the brazing process will provide a sufficiently perfect bond between the barrier wall fingers and the annular discs that the axial fluid passages will be sealed and will not require any further treatment to contain the cold heat transfer fluid or other coolants and/or heating fluids, however it may be necessary in some instances to either employ additional axial tubes brazed or otherwise bonded within the axial fluid passages or the application of an internal metal plating or other sealant or coating to the axial fluid passages to improve their integrity against fluid leakage into or out of the working fluid.

This form of construction has numerous advantages: it is a rigid and solid structure that may have very large heat transfer surface area in a relatively small volume, it is relatively simple to modify the length width and thickness of the working fluid flow passages within a given annular volume to optimise heat transfer attributes, the materials are relatively cheap and the method of construction is relatively simple to automate, the spiral fingers brazed to the annular discs strengthen the annular discs around the otherwise weakened location of the axial fluid passages and also contribute to improved thermal conductivity around the axial fluid passages, the axially continuous land areas 100 on the outer diameter may optionally also be replicated on the inner diameter and provide robust locations both for handling and for mounting the heat exchanger within the rotor without damage to the relatively delicate thin fins, the fins are aligned with their thinnest dimension that is weakest in bending perpendicular to the rotor axis and so are less vulnerable to deflection or deformation caused by centripetal accelerations within the spinning rotor. Utilising working fluid flow passages that are in general form planar spirals is beneficial in that is helps to minimise the average distance between the working fluid and the warming or coolant fluid and thereby usefully help to reduce the temperature differentials between them.

Figure 5:
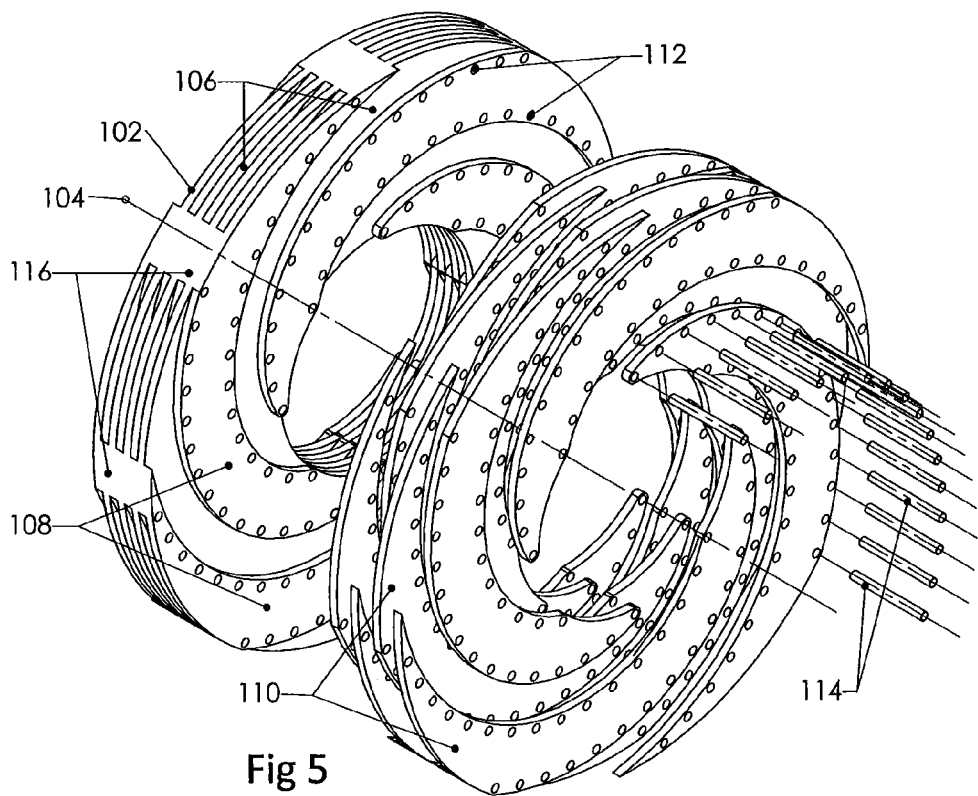
FIG. 5 shows details of a preferred embodiment of the working fluid heater and/or working fluid coolers such as are used in the thermodynamic machine configured as a heat pump of FIG. 1 and that may also be utilised in other heat pumps and engines of the current invention and which operate as heat exchangers to transfer heat between the working fluid and the warm heat transfer fluid or cold heat transfer fluid or coolant fluid or hot heating fluid.

FIG. 5 shows details of a preferred embodiment of the working fluid heater and/or working fluid coolers such as are used in the heat pump of FIG. 1 and that may also be utilised in other heat pumps and engines of the current invention and which operate as heat exchangers to transfer heat between the working fluid and the warm heat transfer fluid or cold heat transfer fluid or coolant fluid or hot heating fluid. The preferred embodiment of FIG. 5 is similar to the preferred embodiment of FIG. 4, but differs in some details of construction. Eight axial fin layers 102 from a complete heat exchanger are shown axially displaced from the component parts for four fin layers in axially exploded form. The heat exchanger is in general form a cylindrical body of revolution about the rotor axis 104 penetrated by a plurality of working fluid flow passages 106 that connect the inner and outer diameters of the heat exchanger and that are arrayed with rotational symmetry about the rotor axis and arrayed linearly along the rotor axis. The working fluid flow passages are each in general form planar spirals about the rotor axis that have relatively constant cross sectional flow area along their length, though the cross sectional flow area of each passage may also be varied along the length by altering the spiral pitch with radius if that is determined to be preferable.

The working fluid flow passages in each axial layer of the heat exchanger are located between symmetrically circumferentially arrayed spiral fins 108 that are each separated from their respective nearest circumferentially adjacent spiral fins by spaces that form the working fluid flow passages. Successive axial layers 110 of spiral fins are rotationally displaced such that along their lateral edges each spiral fin overlaps and contacts two axially adjacent spiral fins on each axial face, thereby creating a continuum of material in the axial direction associated with the areas of axial fin overlap between the successive axial layers of spiral fins.

The areas of axial fin overlap are penetrated in the axial direction by axial fluid passages 112 through which the warm heat transfer fluid or cold heat transfer fluid or coolant fluid or hot heating fluid flows in an axial direction in fluid isolation to the working fluid. Optionally there are also axial tubes 114 inserted through each axial fluid passage and bonded within them to better seal the passages from fluid leakage to or from the working fluid flow.

In a preferred method of construction the spiral fins are created by cutting them from sheet metal feedstock, the sheet metal feedstock being preferably primarily an aluminium or copper alloy owing to their high thermal conductivity, though other materials may be preferably for some applications. It is also preferred that the spiral fins have a brazing metal or alloy surface coating with a melting temperature below that of the sheet metal feedstock on one or both axial sides of each the spiral fin in at least the area in axial contact with the axially adjacent spiral fins. This brazing surface coating may be applied to the sheet metal feedstock before or after it is cut to create the spiral fins. To form a finished working fluid heater or cooler the component parts are clamped together into a correctly aligned axial stack and then heated while axial pressure is applied to allow the brazing metal or alloy to melt and flow and bond all of the components together into a rigid assembly. It is anticipated that in many cases the brazing process will provide a sufficiently perfect bond between the spiral fins that the axial fluid passages will be sealed and will not require any further treatment to contain the cold heat transfer fluid or other coolants and/or heating fluids, however it may be necessary in some instances to either employ additional axial tubes brazed or otherwise bonded within the axial fluid passages or the application of an internal metal plating or other sealant or coating to the axial fluid passages to improve their integrity against fluid leakage into or out of the working fluid.

This form of construction has numerous advantages: it is a rigid and solid structure that may have very large heat transfer surface area in a relatively small volume, it is relatively simple to modify the length width and thickness of the working fluid flow passages within a given annular volume to optimise heat transfer attributes, the materials are relatively cheap and the method of construction is relatively simple to automate, the brazed overlapping joints between the spiral fins help to strengthen them around the otherwise weakened location of the axial fluid passages and also contribute to improved thermal conductivity around the axial fluid passages, the axially continuous land areas 116 on the outer diameter may optionally also be replicated on the inner diameter and provide robust locations both for handling and for mounting the heat exchanger within the rotor without damage to the relatively delicate thin fins, the fins are aligned with their thinnest dimension that is weakest in bending perpendicular to the rotor axis and so are less vulnerable to deflection or deformation caused by centripetal accelerations within the spinning rotor. Utilising working fluid flow passages that are in general form planar spirals is beneficial in that is helps to minimise the average distance between the working fluid and the warming or coolant fluid and thereby usefully help to reduce the temperature differentials between them.

In comparison to the preferred embodiment of FIG. 4 the preferred embodiment of FIG. 5 has the advantage of only requiring a single type of fin component to manufacture and the potential disadvantage of having fins that are the same thickness as the working fluid flow passages, though this could be overcome by making spiral fins that vary in thickness across their width.

Figure 6:
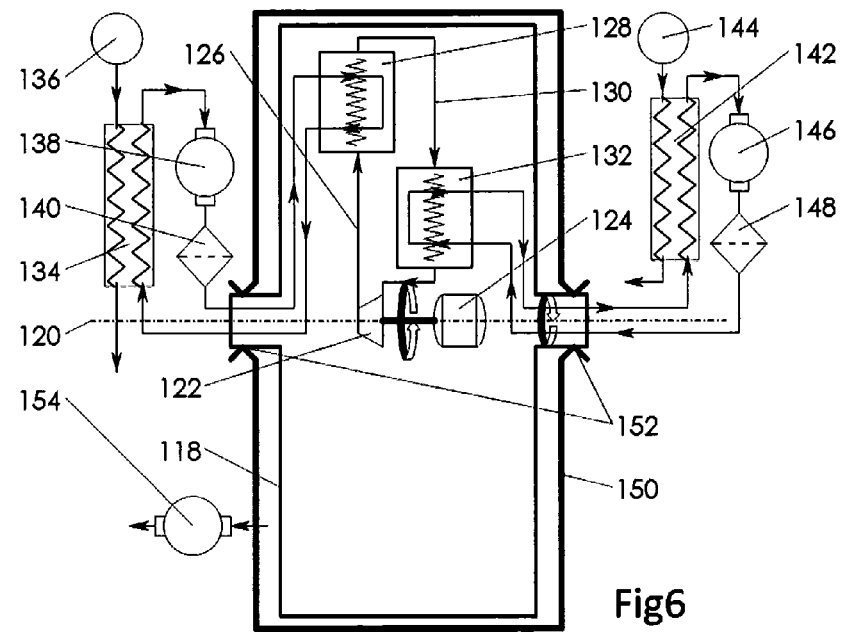
FIG. 6 is a simplified flow diagram and cross section of the thermodynamic machine configured as a heat pump of FIGS. 1-3, showing the general configuration of fluid flows within the heat pump, in which a working fluid that is preferably primarily one or more of a list that includes xenon, krypton and argon is circulated about a hermetically sealed working fluid circulation path within the rotor by a working fluid compressor driven by a compressor motor.

FIG. 6 is a simplified flow diagram and cross section of a heat pump of the current invention that omits much detail and some components for the sake of clarity and shows the general configuration of fluid flows within a heat pump that is similar to the heat pump of FIGS. 1-3 in which a working fluid that is preferably primarily one or more of a list that includes xenon, krypton and argon is circulated about a hermetically sealed working fluid circulation path within a rotor 118 that spins about a rotor axis 120 by a working fluid compressor 122 of the dynamic type such as an axial flow or a radial flow compressor with an impeller that preferably spins about an axis coincident with the rotor axis so as to minimise compressor bearing loads, and is driven by the compressor motor 124, that is internal to the rotor and has electrical power delivered to it by means of a rotary electrical coupling (not shown) that either utilises electromagnetic induction to transfer power or alternatively uses slip rings or a liquid metal rotary coupling. From the compressor the working fluid flows radially outwards through compression passages 126 undergoing compression and heating due to the action of rotor centripetal accelerations upon the working fluid with preferably little heat transfer into or out of the working fluid. The working fluid then flows radially outwards through the working fluid cooler 128, a heat exchanger in which the working fluid is cooled by heat transfer to the warm heat transfer fluid while simultaneously undergoing further compression in a process that preferably approximates an isothermal compression process. The working fluid then flows radially inwards through expansion passages 130 undergoing expansion and cooling due to the action of rotor centripetal accelerations upon the working fluid. The working fluid then flows radially inwards through the cold working fluid heater 132, a heat exchanger in which the working fluid is heated by heat transfer from the cold heat transfer fluid while simultaneously undergoing further expansion in a process that preferably approximates an isothermal expansion process. From the cold working fluid heater the working fluid flows back to the compressor to complete the working fluid circulation path.

The warm heat transfer fluid and the cold heat transfer fluid both enter and exit the rotor via fluid couplings on the rotor axis at each end of the rotor. The warm heat transfer fluid is cooled externally to the rotor in an off rotor cooler 134 where it may be used for heating purposes and transfers heat to a heat sink fluid 136 that will in most cases be air, water or an alcohol and may therefore be utilised for heating purposes. The warm heat transfer fluid then passes through a warm heat transfer fluid pump 138 and a warm heat transfer fluid filter 140 to remove detritus before it re-enters the rotor. In some instances the warm heat transfer fluid pump may not be required as it may be possible to rely entirely upon the centrifugal thermosiphon within the rotor to produce the pressure gain necessary to circulate the warm heat transfer fluid, or the pump may be integrated into the rotor fluid coupling with the warm heat transfer outlet from the rotor acting as a centrifugal pump. The filter may not always be necessary and the warm heat transfer fluid may simply be supplied from a large reservoir rather than being cooled by heat transfer to another heat sink fluid. The cold heat transfer fluid is warmed externally to the rotor in an off rotor heater 142 where it may be used for cooling purposes and absorbs heat from a heat sink fluid 144 that will in most cases be air, water or an alcohol. The cold heat transfer fluid then passes through a cold heat transfer fluid pump 146 and a cold heat transfer fluid filter 148 to remove detritus before it re-enters the rotor. In some instances the pump may be integrated into the rotor fluid coupling with the cold heat transfer outlet from the rotor acting as a centrifugal pump. The filter may not always be necessary and the cold heat transfer fluid may simply be supplied from a large reservoir rather than being warmed by heat transfer to another heat sink fluid.

The rotor is powered by a motor that is not shown to spin on rotor bearings that are also not shown within a rotor casing 150. Rotor vacuum seals 152 at both axial ends that allow the space between the rotor and the rotor casing to be partially evacuated by vacuum pump 154 that draws air from within the rotor casing to reduce the air friction (windage) losses of the rotor. The rotor vacuum seals allow the warm and cold heat transfer fluids to pass to and from the rotor in fluid isolation from the evacuated interior of the rotor casing. However with the relatively low rotor speeds and compact dimensions made possible for a heat pump rotor that employs primarily xenon or possibly krypton as the working fluid the rotor windage losses may be sufficiently low that the rotor vacuum seals and vacuum pump may not be required, and the rotor casing may possibly be omitted in such case, even though it offers some advantages in safety and potentially reduced windage.

Figure 7:
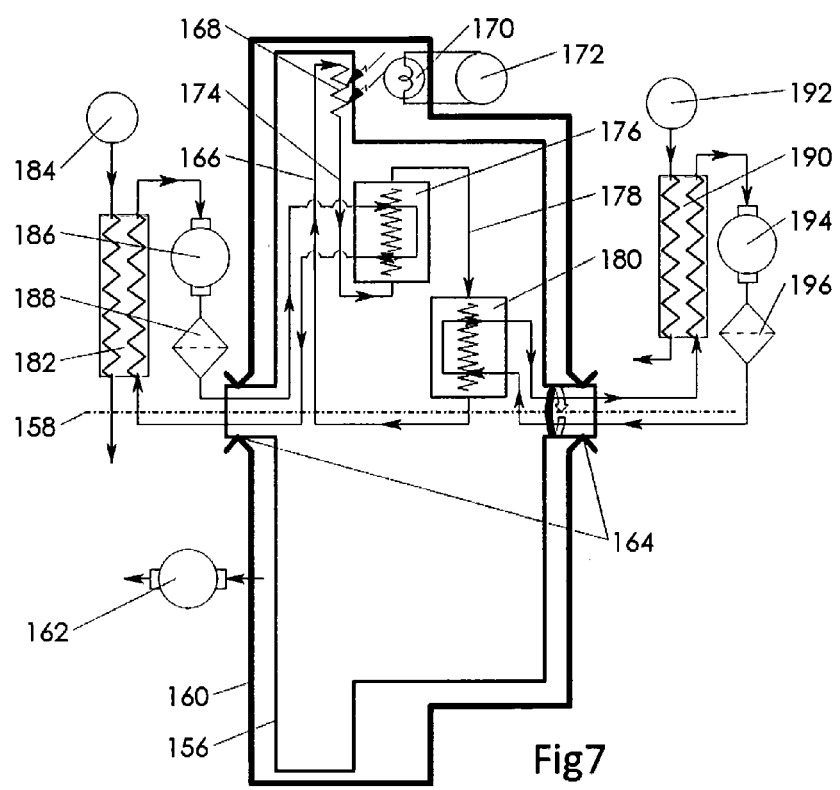
FIG. 7 is a simplified flow diagram and cross section of section of the thermodynamic machine of the current invention configured as a heat pump showing the general configuration of fluid flows within the heat pump which utilises a centrifugal thermosiphon to generate the pressure gain required to circulate the working fluid through the heat pumping process, the working fluid circulated about a hermetically sealed working fluid circulation path within the rotor, the rotor driven by a rotor motor (not shown) within a rotor casing that is partially evacuated by a vacuum pump to reduce the rotor windage to a low value.

FIG. 7 is a simplified flow diagram and cross section of a heat pump of the current invention that omits much detail and some components for the sake of clarity and shows the general configuration of fluid flows within a heat pump that utilises a centrifugal thermosiphon to generate the pressure gain required to circulate the working fluid that is preferably primarily one or more of a list that includes xenon, krypton and argon through the heat pumping process. A working fluid is circulated about a hermetically sealed working fluid circulation path within a rotor 156 that spins on rotor bearings that are not shown about a rotor axis 158 driven by a rotor motor that is also not shown and within a rotor casing 160 that is partially evacuated by a vacuum pump 162 to reduce the rotor windage to a low value. Rotor vacuum seals 164 provide a rotary seal between the spinning rotor and the rotor casing at each axial end of the rotor through which fluids may enter and exit the rotor in fluid isolation from the partially evacuated space between the rotor and the rotor casing.

Within the hermetically sealed working fluid circulation path the working fluid flows radially outwards through compression passages 166 undergoing compression and heating due to the action of rotor centripetal accelerations upon the working fluid with preferably little heat transfer into or out of the working fluid. The working fluid then flows through the hot working fluid heater 168 at or near the maximum radius of the rotor, with heat being transferred to the hot working fluid heater primarily by means of radiation from a high temperature radiator 170 within the rotor casing that utilises energy from an external energy source 172 that is one or more from a list that includes: combustion of fuel, nuclear heat sources, solar energy, electricity. The majority of the heat energy added to the working fluid within the hot working fluid heater is preferably added as it travels in a generally radially inwards direction so that the centrifugal thermosiphon acting upon the working fluid will initiate and maintain the working fluid circulation in the desired direction while the rotor is spinning.

The working fluid then flows radially inwards through expansion passages 174 undergoing expansion and cooling due to the action of rotor centripetal accelerations upon the working fluid. The working fluid then flows radially outwards through the working fluid cooler 176, a heat exchanger in which the working fluid is cooled by heat transfer to the warm heat transfer fluid while simultaneously undergoing further compression in a process that preferably approximates an isothermal compression process. The working fluid then flows radially inwards through expansion passages 178 undergoing expansion and cooling due to the action of rotor centripetal accelerations upon the working fluid. The working fluid then flows radially inwards through the cold working fluid heater 180, a heat exchanger in which the working fluid is heated by heat transfer from the cold heat transfer fluid while simultaneously undergoing further expansion in a process that preferably approximates an isothermal expansion process. The working fluid then flows back to the compression passages leading to the hot working fluid heater to complete the working fluid circulation path.

The warm heat transfer fluid and the cold heat transfer fluid both enter and exit the rotor via fluid couplings on the rotor axis at each end of the rotor. The warm heat transfer fluid is cooled externally to the rotor in an off rotor cooler 182 where it may be used for heating purposes and transfers heat to a heat sink fluid 184 that will in most cases be air, water or an alcohol. The warm heat transfer fluid then passes through a warm heat transfer fluid pump 186 and a warm heat transfer fluid filter 188 to remove detritus before it re-enters the rotor. In some instances the warm heat transfer fluid pump may not be required as it may be possible to rely entirely upon the centrifugal thermosiphon within the warm heat transfer fluid that is within the rotor to produce the pressure gain necessary to circulate the warm heat transfer fluid, or the pump may be integrated into the rotor fluid coupling with the warm heat transfer outlet from the rotor acting as a centrifugal pump powered by the rotor motor. The filter may not always be necessary and the warm heat transfer fluid may simply be supplied from a large reservoir rather than being cooled by heat transfer to another heat sink fluid.

The cold heat transfer fluid is warmed externally to the rotor in an off rotor heater 190 where it may be utilised for cooling purposes and absorbs heat from a heat sink fluid 192 that will in most cases be air, water or an alcohol. The cold heat transfer fluid then passes through a cold heat transfer fluid pump 194 and a cold heat transfer fluid filter 196 to remove detritus before it re-enters the rotor. In some instances the pump may be integrated into the rotor fluid coupling with the cold heat transfer outlet from the rotor acting as a centrifugal pump.

The filter may not always be necessary and the cold heat transfer fluid may simply be supplied from a large reservoir rather than being warmed by heat transfer to another heat sink fluid.

This configuration of heat pump is highly advantageous in that it can make use of relatively cheap sources of energy in the form of heat to provide useful cooling or heating at a cost that is potentially far below that which arises when using more expensive electricity or other mechanical power to drive a heat pump that utilises a motor driven compressor.

Figure 8:
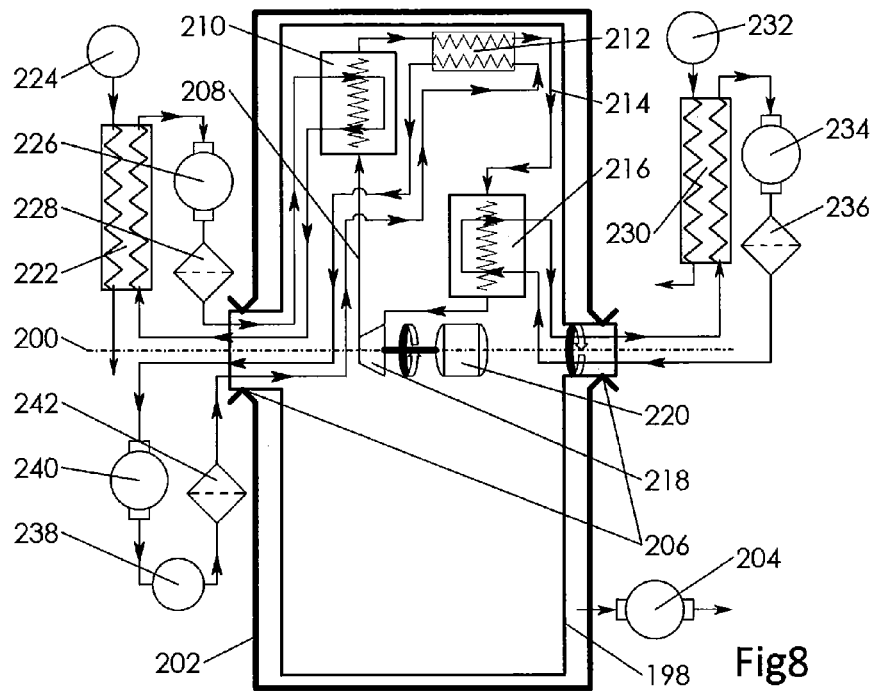
FIG. 8 is a simplified flow diagram and cross section of the thermodynamic machine of the current invention configured as a heat pump showing the general configuration of fluid flows within the heat pump which utilises a centrifugal thermosiphon or compressor or both to generate the pressure gain required to circulate the working fluid through the heat pump cycle, and which utilises an externally heated hot heating fluid to provide the heat energy that drives the working fluid centrifugal thermosiphon, the working fluid circulated about a hermetically sealed working fluid circulation path within a rotor that spins on rotor bearings and which is driven by a rotor motor (not shown) and within a rotor casing that is partially evacuated by a vacuum pump to reduce the rotor windage to a low value.

FIG. 8 is a simplified flow diagram and cross section of a heat pump of the current invention that omits much detail and some components for the sake of clarity and shows the general configuration of fluid flows within a heat pump that utilises a centrifugal thermosiphon or compressor or both to generate the pressure gain required to circulate the working fluid through the heat pump cycle, and utilises an externally heated hot heating fluid to provide the heat energy that drives the working fluid centrifugal thermosiphon. The working fluid is circulated about a hermetically sealed working fluid circulation path within a rotor 198 that spins on rotor bearings that are not shown about a rotor axis 200 driven by a rotor motor that is also not shown and within a rotor casing 202 that is partially evacuated by a vacuum pump 204 to reduce the rotor windage to a low value. Rotor vacuum seals 206 provide a rotary seal between the spinning rotor and the rotor casing at each axial end of the rotor through which fluids may enter and exit the rotor in fluid isolation from the partially evacuated space between the rotor and the rotor casing.

The working fluid that is preferably primarily one or more of a list that includes xenon, krypton and argon is circulated about a hermetically sealed working fluid circulation path within the rotor. The working fluid flows radially outwards through compression passages 208 undergoing compression and heating due to the action of rotor centripetal accelerations upon the working fluid with preferably little heat transfer into or out of the working fluid. The working fluid then flows radially outwards through the working fluid cooler 210, a heat exchanger in which the working fluid is cooled by heat transfer to the warm heat transfer fluid while simultaneously undergoing further compression in a process that preferably approximates an isothermal compression process. The working fluid then flows through a hot heat exchanger 212 at or near the maximum radius of the rotor in which it is heated by the flow of hot heating fluid, the hot heat exchanger is preferably a counter-flow heat exchanger in order to raise the temperature of the working fluid as much as possible for a given rotor inlet temperature of hot heating fluid. The working fluid then flows radially inwards through expansion passages 214 undergoing expansion and cooling due to the action of rotor centripetal accelerations upon the working fluid. The working fluid then flows radially inwards through the cold working fluid heater 216, a heat exchanger in which the working fluid is heated by heat transfer from the cold heat transfer fluid while simultaneously undergoing further expansion in a process that preferably approximates an isothermal expansion process. To complete the working fluid circulation path the working fluid then passes through the working fluid compressor 218 of the dynamic type such as an axial flow or a radial flow compressor with an impeller that preferably spins about an axis coincident with the rotor axis so as to minimise compressor bearing loads. The compressor is driven by the compressor motor 220 that is internal to the rotor and has electrical power delivered to it by means of a rotary electrical coupling (not shown) that utilises electromagnetic induction or alternatively slip rings or liquid metal rotary couplings.

The warm heat transfer fluid and cold heat transfer fluid both enter and exit the rotor via fluid couplings on the rotor axis at each end of the rotor, additionally it is preferred that the hot heating fluid also enters and exits the rotor at the same end as the warm heat transfer fluid. The warm heat transfer fluid is cooled externally to the rotor in an off rotor cooler 222 where it may be utilised for heating purposes and transfers heat to a heat sink fluid 224 that will in most cases be air, water or an alcohol. The warm heat transfer fluid then passes through a warm heat transfer fluid pump 226 and a warm heat transfer fluid filter 228 to remove detritus before it re-enters the rotor. In some instances the warm heat transfer fluid pump may not be required as it may be possible to rely entirely upon the centrifugal thermosiphon within the warm heat transfer fluid that is within the rotor to produce the pressure gain necessary to circulate the warm heat transfer fluid, or the pump may be integrated into the rotor fluid coupling with the warm heat transfer outlet from the rotor acting as a centrifugal pump powered by the rotor motor. The filter may not always be necessary and the warm heat transfer fluid may simply be supplied from a large reservoir rather than being cooled by heat transfer to another heat sink fluid. The cold heat transfer fluid is warmed externally to the rotor in an off rotor heater 230 where it may be utilised for cooling purposes and absorbs heat from a heat sink fluid 232 that will in most cases be air, water or an alcohol. The cold heat transfer fluid then passes through a cold heat transfer fluid pump 234 and a cold heat transfer fluid filter 236 to remove detritus before it re-enters the rotor. In some instances the pump may be integrated into the rotor fluid coupling with the cold heat transfer outlet from the rotor acting as a centrifugal pump. The filter may not always be necessary and the cold heat transfer fluid may simply be supplied from a large reservoir rather than being warmed by heat transfer to another heat sink fluid. The hot heating fluid is heated externally to the rotor in an external hot heater 238 by a heat source, examples of which may include: geothermal heat, solar heat, engine exhaust heat, engine coolant, nuclear heat or combustion of a fuel. The hot heating fluid is pumped by hot heating fluid pump 240 to overcome the retarding pressure of the hot heating fluid's centrifugal thermosiphon within the rotor and is filtered by hot heating fluid filter 242 prior to entering the rotor, though this filter may not always be necessary, and the hot heating fluid pump may potentially be integrated as a dynamic pump within the rotors hot heating fluid outlet. There are numerous fluids that the hot heating fluid may be composed of. At high temperatures liquid alkali metals or ionic compounds are preferred hot heating fluids, while hydrocarbons or water are preferred for lower temperatures, gaseous hot heating fluids may also be employed, with air, hydrogen and helium being preferred examples.

The compressor may be omitted in some cases if the pressure gain provided by the centrifugal thermosiphon created by the interaction of working fluid cooler and hot heat exchanger is sufficient to operate the heat pump with the required temperature differential. If there is a compressor fitted it will in most cases preferably be operated in a manner that supplements the pressure gain provided by the centrifugal thermosiphon such as during start up or other periods when the required heat pump temperature differential is greater than can be driven by the centrifugal thermosiphon alone. This is because in many cases the heat energy supplied by the hot heating fluid will be far cheaper than achieving the same pumping effect using electrical power supplied to the compressor, but the compressor may usefully boost performance when needed.

This configuration of heat pump is advantageous as it can potentially extract energy for heating or cooling purposes from a fluid stream such as an engine coolant or engine exhaust, even at relatively low temperatures, and may thus reduce overall energy consumption.

Figure 9:
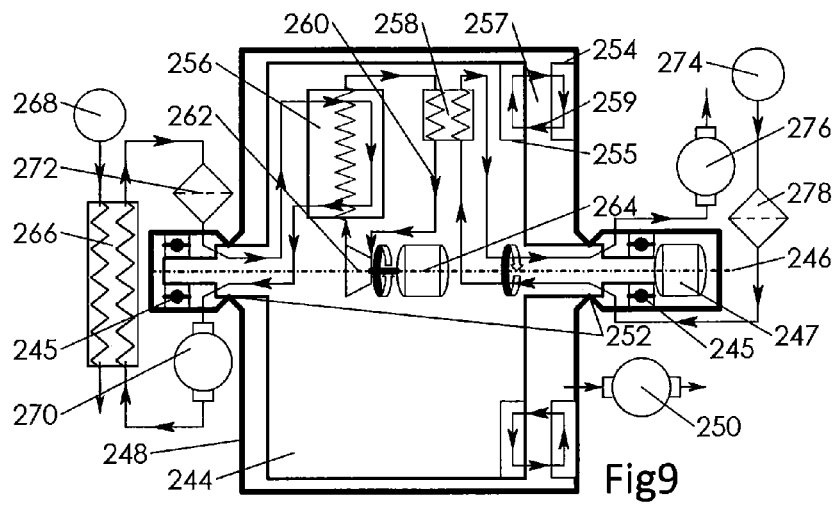
FIG. 9 is a simplified flow diagram and cross section of the thermodynamic machine of the current invention configured as an engine showing the general configuration of fluid flows within the engine, which utilises a centrifugal thermosiphon to generate a pressure gain that circulates the working fluid through a turbine internal to the rotor to produce electrical power, and that utilises an externally heated hot heating fluid to provide the heat energy that drives the working fluid centrifugal thermosiphon, the working fluid circulated about a hermetically sealed working fluid circulation path within a rotor, driven by a rotor motor (not shown) and within a rotor casing that is partially evacuated by a vacuum pump to reduce the rotor windage to a low value.

FIG. 9 is a simplified flow diagram and cross section of an engine of the current invention that omits much detail and some components for the sake of clarity and shows the general configuration of fluid flows within an engine that utilises a centrifugal thermosiphon to generate a pressure gain that circulates the working fluid through a turbine internal to the rotor to produce electrical power, and that utilises an externally heated hot heating fluid to provide the heat energy that drives the working fluid centrifugal thermosiphon. The working fluid is circulated about a hermetically sealed working fluid circulation path within a rotor 244 that spins on rolling element rotor bearings 245 at each end of the rotor about a rotor axis 246 driven by a rotor motor 247 within a rotor casing 248 that is partially evacuated by a vacuum pump 250 to reduce the rotor windage to a low value. Rotor vacuum seals 252 provide a rotary seal between the spinning rotor and the rotor casing at each axial end of the rotor through which fluids may enter and exit the rotor in fluid isolation from the partially evacuated space between the rotor and the rotor casing.

The externally heated hot heating fluid is heated by a heat source that provides heat to the hot working fluid heater. It is maintained at a substantially constant temperature.

The heat source can provide the heat by way of either radiative heat transfer, or heat energy transport in an externally heated hot heating fluid. The heat source can be one or more of: concentrated solar radiation, a heat source powered by a nuclear reaction, a combustor in which a fuel is burnt with an oxidiser, an electrical heater, a geothermal heat source, an internal combustion engine coolant liquid or lubricant.

If the heat source is a combustor, the fuel can be one or more from a list that includes coal; wood; natural gas; liquid hydrocarbon fuels; industrial, agricultural or domestic waste; biomass.

Alternatively, the hot heating fluid either is heated by, or is, one or more fluids from a list that includes: the exhaust gases from a gas turbine, internal combustion engine or other fuel burning engine.

The working fluid that is preferably primarily one or more of a list that includes xenon, krypton and argon is circulated about a hermetically sealed working fluid circulation path within the rotor. The working fluid flows radially outwards from the outlet of power turbine 262, into working fluid cooler 256, a heat exchanger in which the working fluid is compressed as it flows radially outwards while being cooled by heat transfer to the radially inwards flowing coolant fluid in a process that preferably approximates an isothermal compression process and that preferably brings the working fluid to near the maximum radius of the rotor at near to the coolant fluid temperature. The working fluid then flows radially inwards through a counterflow hot heat exchanger 258 at or near the maximum radius of the rotor in which it is heated by the radially outwards flowing of hot heating fluid, raising the working fluid temperature as much as possible for a given rotor inlet temperature of hot heating fluid. By orienting the counterflow heat exchanger in this manner the outer radius is coldest which is beneficial in creating an exterior tensile retaining ring out of high strength materials like polymer reinforced fibre composites to retain the heat exchanger against centrifugal loads. The working fluid then flows radially inwards through expansion passages 260 undergoing approximately adiabatic expansion and cooling due rotor centripetal accelerations before expanding through the power turbine to complete the working fluid circulation path. The power turbine is preferably of the dynamic type such as an axial flow or a radial inflow turbine with an impeller that preferably spins about an axis coincident with the rotor axis and in the opposite direction to the rotor (contra-rotating) so as to minimise turbine bearing loads. The power turbine drives the generator 264 that is internal to the rotor and preferably has permanent magnets in the generator rotor attached to the turbine to achieve high efficiency. The generator delivers electricity to an external electrical load by means of a rotary inductive coupling comprising a casing mounted coupling stator 254, a rotor mounted coupling rotor 255 and that utilises time varying magnetic fields 259 across the axial air gap 257 to induce alternating current in the coupling stator, the axial faces of the air gap minimise radial magnetic forces that might otherwise destabilise the rotodynamic stability of the fast spinning rotor or induce unwanted rotor radial bearing forces. Liquid metal rotary couplings are another preferred alternative for transmitting the power from the turbine generator to external electrical loads.

The coolant fluid and hot heating fluid enter and exit the rotor via fluid couplings that lie on the rotor axis at each end of the rotor. The coolant fluid will in most cases be primarily water or alcohol based and is cooled externally to the rotor in an off rotor cooler 266 where it transfers heat to a heat sink fluid 268 that will in most cases be air, water or an alcohol. The coolant fluid is pumped by coolant pump 270 and filtered by coolant fluid filter 272 to remove detritus before it re-enters the rotor. In some instances the coolant fluid pump may not be required as it may be possible to rely entirely upon the centrifugal thermosiphon within the coolant fluid that is within the rotor to produce the pressure gain necessary to circulate the coolant fluid, or the pump may be integrated into the rotor fluid coupling with the coolant outlet from the rotor acting as a centrifugal pump powered by the rotor motor. The filter may not always be necessary and the coolant fluid may simply be supplied from a large reservoir rather than being cooled by heat transfer to another heat sink fluid. The hot heating fluid is heated externally to the rotor in an external hot heater 274. This engine configuration is most beneficial for extracting the maximum useful energy from a waste heat source, examples of which may include: geothermal heat, stored thermal energy from solar heating or the like, engine exhaust heat, all of which will release the maximum amount of useful heat energy only in being cooled down to near ambient temperatures. The hot heating fluid is pumped by hot heating fluid pump 276 to overcome the retarding pressure of the hot heating fluid's centrifugal thermosiphon within the rotor and is filtered by hot heating fluid filter 278 prior to entering the rotor, though this filter may not always be necessary, and the hot heating fluid pump may potentially be integrated as a dynamic pump within the rotor's hot heating fluid outlet. There are numerous fluids that the hot heating fluid may be composed from. At high temperatures liquid alkali metals or liquid ionic compounds are preferred hot heating fluids, while hydrocarbons or water are preferred for lower temperatures, gaseous hot heating fluids may also be employed, with air, hydrogen and helium being preferred examples.

This configuration of engine is advantageous as it can potentially create electrical energy from relatively low temperature heat sources or from hot fluid streams such as engine coolants or engine exhausts with high efficiency even in relatively small sizes, and may thus be utilised as an efficient bottoming cycle for higher temperature engines in order to reduce energy consumption. The efficiency will in general be maximised when the temperature of the working fluid leaving the power turbine is at or near the temperature of the working fluid cooler and the inlet to the working fluid cooler is at or near the same radius as the power turbine outlet.

For both the heat pump of FIG. 8 and the engine of FIG. 9 if the heat source that heats the hot heating fluid is a fluid stream such as the exhaust of a fuel burning engine from which it is desirable to extract as much energy as possible, then it is generally preferred to extend the working fluid cooler out to near the maximum radius of the rotor where the hot heat exchanger is located and thereby enable greater cooling of the hot heating fluid flowing through the hot heat exchanger, then after it has left the rotor heat the hot heating fluid by means of a counter-flow heat exchanger that extracts heat energy from the fluid stream as it cools. If however the heat source that heats the hot heating fluid is at relatively constant temperature such as for example the coolant water of an internal combustion engine, a solar concentrator or a nuclear heat source then in order to maximise efficiency it is generally preferred not to extend the working fluid cooler out to the maximum radius, but rather allow the working fluid to flow out through a radial passage undergoing further near adiabatic compression and heating after it has passed through the working fluid cooler and before it passes through the hot heat exchanger, and then ideally the working fluid being heated as it flows radially inwards expanding through the hot heat exchanger in what ideally approximates an isothermal expansion process with the hot heating fluid flowing through the rotor in greater volume so that it undergoes a smaller temperature drop within the hot heat exchanger.

Figure 10:
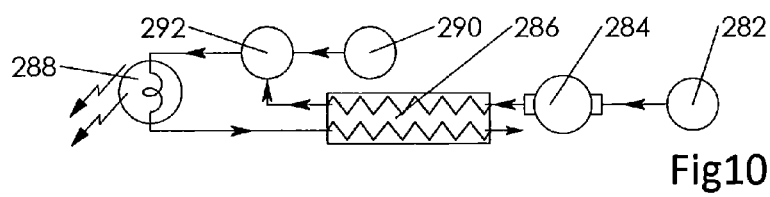
FIG. 10 is a simplified flow diagram for a preferred configuration of radiative heater for the heat pump and/or engine of the current invention such as is exemplified by FIG. 7 and FIG. 11 and FIG. 17, air pumped from an air inlet by a fan to force the air through a recuperator or regenerator where it is heated by heat transfer from the hot exhaust from a radiator before being further heated by combustion with fuel in a combustor, the hot products of combustion then heating the radiative heater to provide the necessary radiative heat transfer to the rotor and the exhaust from the radiator then passing back through the recuperator or regenerator to preheat the incoming air.
Figure 17:
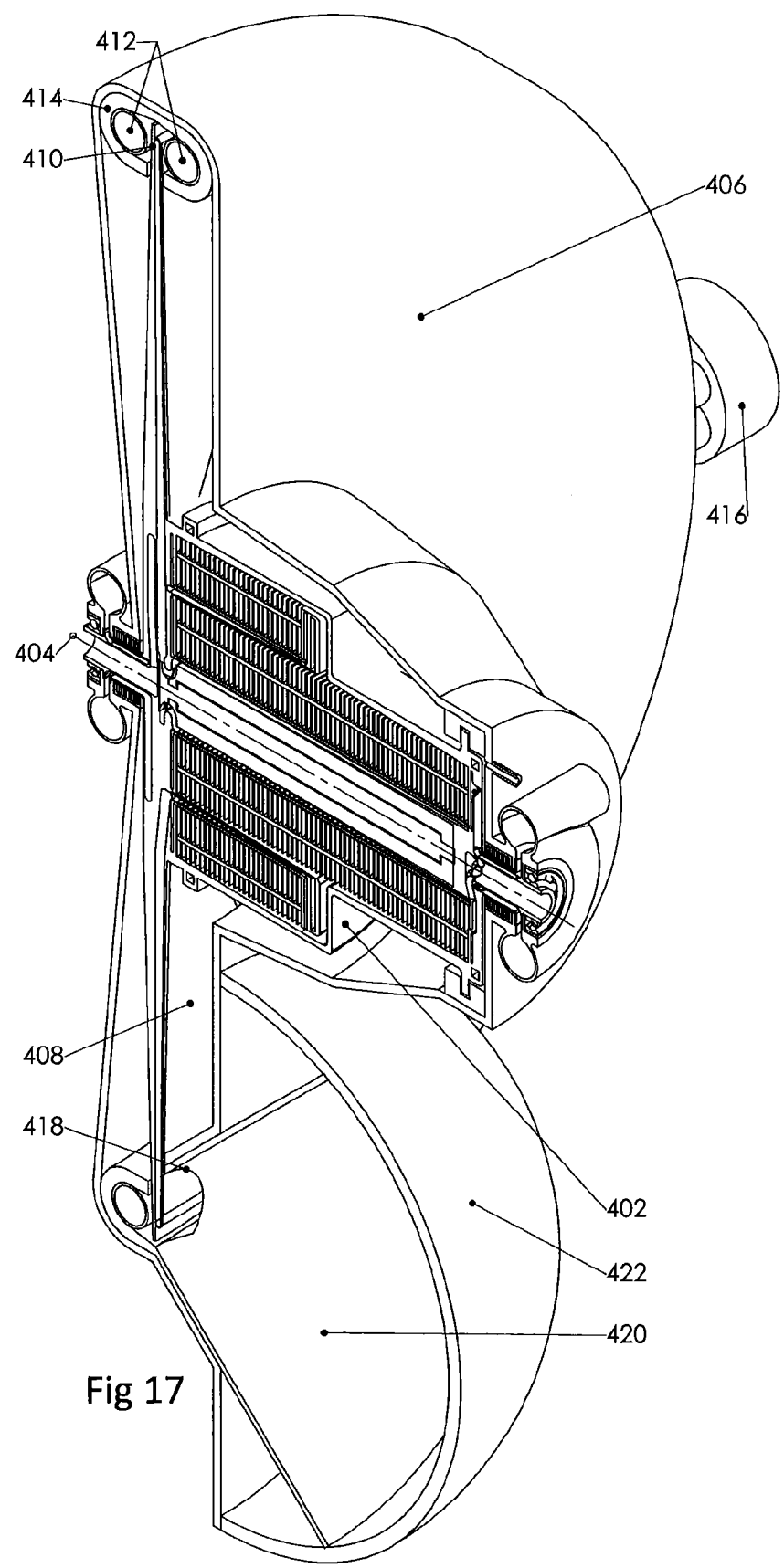
FIG. 17 shows a cross sectional view with the sectioning plane coincident with the rotor axis of a preferred embodiment of the thermodynamic machine of the present invention configured as a heat pump in which the circulation of the working fluid within the spinning rotor is powered by a radiatively heated centrifugal thermosiphon as well as an electrically powered compressor, each of which contribute a variable portion of the total pressure gain required to drive the working fluid circulation within the rotor, the rotor spinning about rotor the rotor axis within a partially evacuated rotor casing in order to reduce windage drag.

FIG. 10 is a simplified flow diagram for a preferred configuration of the radiative heater for the heat pump and/or engine of the current invention such as is exemplified by FIG. 7 and FIG. 11 and FIG. 17 in which air is pumped from an air inlet 282 by a fan 284 that forces it through a recuperator or regenerator 286 where it is heated by heat transfer from the hot exhaust from the radiator 288 before it is further heated by combustion with fuel 290 in a combustor 292, the hot products of combustion then heating the radiative heater to provide the necessary radiative heat transfer to the rotor and the exhaust from the radiator then passing back through the recuperator or regenerator to preheat the incoming air. Use of a recuperative or regenerative heat exchanger on to recover heat from the radiative heater's exhaust greatly increases the overall efficiency of converting fuel energy into radiative heat energy. The combustor may be within one or more sequential zones in the radiator where additional fuel is injected so as to reduce peak temperatures and undesirable emission formation even while leaving little free oxygen in the exhaust. This helps to increase efficiency by reducing the total exhaust mass flow.

FIG. 11 is a simplified flow diagram and cross section of an engine of the current invention that omits much detail and some components for the sake of clarity and shows the general configuration of fluid flows within an engine that in a manner similar to FIG. 7 utilises a centrifugal thermosiphon to generate a pressure gain that circulates the working fluid through a turbine internal to the rotor to produce electrical power, and that utilises radiative heat transfer near the outer radius of the rotor to provide the heat energy that drives the working fluid centrifugal thermosiphon. The working fluid is circulated about a hermetically sealed working fluid circulation path within a rotor 294 that spins on rotor bearings that are not shown about a rotor axis 296 driven by a rotor motor within a rotor casing 298 that is partially evacuated by a vacuum pump 300 to reduce the rotor windage to a low value. A rotor vacuum seal 302 provides a rotary seal between the spinning rotor and the rotor casing through which the coolant fluid may enter and exit the rotor in fluid isolation from the partially evacuated space between the rotor and the rotor casing.

The working fluid that is preferably primarily one or more of a list that includes xenon, krypton and argon is circulated about a hermetically sealed working fluid circulation path within the rotor. The working fluid flows radially outwards through working fluid cooler 304, a heat exchanger in which the working fluid is cooled by heat transfer to the coolant fluid while simultaneously undergoing further compression in a process that preferably approximates an isothermal compression process. The working fluid then flows radially outwards towards the maximum radius of the rotor through compression passages 306 undergoing further compression and heating due to the action of rotor centripetal accelerations upon the working fluid with preferably little heat transfer into or out of the working fluid. At or near the maximum radius of the rotor the working fluid then flows through the hot working fluid heater 308, with heat being transferred to the hot working fluid heater primarily by means of radiation from a high temperature radiator 310 within the rotor casing that utilises energy from an external heat energy source 312 that is one or more from a list that includes: combustion of fuel, nuclear heat sources, solar energy, electricity. The majority of the heat energy added to the working fluid within the hot working fluid heater is preferably added as it travels in a generally radially inwards direction so that the centrifugal thermosiphon acting upon the working fluid will initiate and maintain the working fluid circulation in the desired direction while the rotor is spinning. The preferred form for the hot working fluid heater is one or more axially separated discs that each have working fluid flow passages bonded to or embedded within them, and that are each illuminated on both sides over a span of radii near the maximum radius by a high temperature radiative heat source. The working fluid then flows radially inwards through expansion passages 314 undergoing expansion and cooling due to the action of rotor centripetal accelerations upon the working fluid. In order to reduce the overall length of the working fluid flow path, and so the total amount of working fluid required it is preferred that multiple compression passages and expansion passages be arrayed around the rotor axis and aligned in a largely radial direction with a portion of the total flow of working fluid flowing in parallel through each compression and expansion passage. To complete the working fluid circulation path the working fluid is then expanded through the power turbine 316 of the dynamic type such as an axial flow or a radial inflow turbine with an impeller that preferably spins about an axis coincident with the rotor axis to minimise compressor bearing loads. The power turbine drives the generator 318 that is internal to the rotor and supplies electrical power to an external load by means of an inductive rotary electrical coupling integrated with a rotor motor that is comprised of a stationary inductive coupling and motor stator 320 within the rotor casing and a spinning inductive coupling and motor rotor 322 attached to the rotor. Such a combined rotor motor and inductive coupling could also be used to provide electrical power to a working fluid compressor within the rotor of a heat pump of the current invention. The inductive coupling could also be replaced by a slip ring electrical coupling or liquid metal rotary coupling or similar.

Coolant fluid enters and exits the rotor via a fluid coupling on the rotor axis at one end of the rotor. The coolant fluid will in most cases be primarily water or alcohol based and is cooled externally to the rotor in an off rotor cooler 324 where it transfers heat to a heat sink fluid 326 that will in most cases be air, water or an alcohol. The coolant fluid is pumped by coolant pump 328 and filtered by coolant fluid filter 330 to remove detritus before it re-enters the rotor. In some instances the coolant fluid pump may not be required as it may be possible to rely entirely upon the centrifugal thermosiphon within the coolant fluid that is within the rotor to produce the pressure gain necessary to circulate the coolant fluid, or the pump may be integrated into the rotor fluid coupling with the coolant outlet from the rotor acting as a centrifugal pump powered by the rotor motor. The filter may not always be necessary and the coolant fluid may simply be supplied from a large reservoir rather than being cooled by heat transfer to another heat sink fluid.

In order to maximise engine efficiency the temperature of the working fluid exiting the power turbine is preferably near to the temperature of the coolant fluid.

FIG. 12 is a graph that illustrates the idealised cyclic thermodynamic changes that occur within the working fluid as it circulates around the working fluid circulation path within the rotor of the engine of FIG. 11 using idealised thermodynamic processes that will only be approximated in reality. Pressure is graphed on the vertical axis 332 and mass specific fluid volume, the inverse of fluid density, on the horizontal axis 334. An isothermal compression 336 that occurs in the working fluid cooler is followed by an adiabatic compression 338 in the compression passages and then an isothermal expansion 340 in the hot working fluid heater and then adiabatic expansion 342 in the expansion passages before further adiabatic expansion 344 with typically greater losses through the power turbine to complete the cycle. The isothermal cooling and heating processes in particular are likely to be only rough approximations to the reality, and may be replaced by non-isothermal cooling and heating processes. There may be some efficiency advantages to utilising a heating process that is closer to isobaric than isothermal if rotor speed is limited, though this may be difficult to integrate into a compact rotor in which the hot working fluid heater is distributed over a span of radii on a disc shaped radiative receiver, in which case isothermal expansion is more easily approximated. The clockwise loop that these linked processes form on a pressure-volume graph is indicative of a power producing cycle.

FIG. 13 is a graph that illustrates the idealised cyclic thermodynamic changes that occur within the working fluid as it circulates around the working fluid circulation path within the rotor of the engine of FIG. 9 using idealised thermodynamic processes that will only be approximated in reality. Pressure is graphed on the vertical axis 346 and mass specific fluid volume, the inverse of fluid density, on the horizontal axis 348. An isothermal compression 350 that occurs in the working fluid cooler is followed by an isobaric heat addition 352 in the hot working fluid heater and then an adiabatic expansion 354 in the expansion passages before further adiabatic expansion 356 through the power turbine to complete the cycle. The isothermal cooling and isobaric heating processes in particular are likely to be only rough approximations to the reality, and may be replaced by non-isothermal cooling and non-isobaric heating processes. In particular the isobaric heat addition may be replaced with a heating process where pressure decreases with little loss in efficiency so long as rotor speed and therefore peak compression is increased slightly. The clockwise loop that these linked processes form on a pressure-volume graph is indicative of a power producing cycle.

Figure 14:
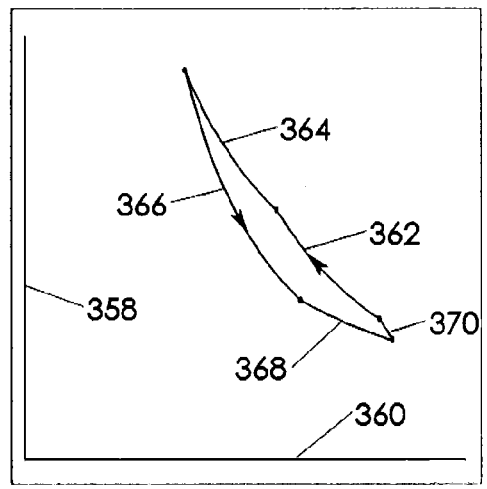
FIG. 14 is a graph that illustrates the idealised cyclic thermodynamic changes that occur within the working fluid as it circulates around the working fluid circulation path within the rotor of the heat pump of FIG. 6 using idealised thermodynamic processes that will only be approximated in reality, pressure graphed on the vertical axis and mass specific fluid volume on the horizontal axis.

FIG. 14 is a graph that illustrates the idealised cyclic thermodynamic changes that occur within the working fluid as it circulates around the working fluid circulation path within the rotor of the heat pump of FIG. 6 using idealised thermodynamic processes that will only be approximated in reality. Pressure is graphed on the vertical axis 358 and mass specific fluid volume on the horizontal axis 360. An adiabatic compression 362 in the compression passages ideally raises the working fluid temperature to just above the temperature of the warm heat transfer fluid and is followed by an isothermal compression 364 that occurs in the working fluid cooler thereby heating the warm heat transfer fluid, which is then followed by an adiabatic expansion 366 in the expansion passages that ideally cools the working fluid to just below the temperature of the cold heat transfer fluid before isothermal expansion 368 in the cold working fluid heater that cools the cold heat transfer fluid. Finally a generally adiabatic but somewhat inefficient compression process 370 within the compressor brings the working fluid back up to the original pressure to complete the cycle. The isothermal cooling and isothermal heating processes in particular are likely to be only rough approximations to the reality, and may be replaced by non-isothermal cooling and non-isothermal heating processes. The anticlockwise loop that these linked processes form on a pressure-volume graph is indicative of a power absorbing cycle, and in this case is driven by the power input to the compressor.

Figure 15:
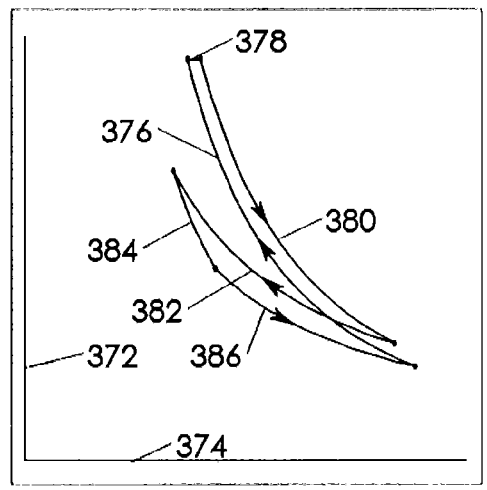
FIG. 15 is a graph that illustrates the idealised cyclic thermodynamic changes that occur within the working fluid as it circulates around the working fluid circulation path within the rotor of the heat pump of FIGS. 7 and 17-20 using idealised thermodynamic processes that will only be approximated in reality, pressure graphed on the vertical axis and mass specific fluid volume on the horizontal axis.

FIG. 15 is a graph that illustrates the idealised cyclic thermodynamic changes that occur within the working fluid as it circulates around the working fluid circulation path within the rotor of the heat pump of FIG. 7 and FIG. 17-20 using idealised thermodynamic processes that will only be approximated in reality. Pressure is graphed on the vertical axis 372 and mass specific fluid volume on the horizontal axis 374. An adiabatic compression 376 in the compression passages is followed by an isobaric heat addition 378 in the hot working fluid heater and then an adiabatic expansion 380 in the expansion passages.

These three processes together provide a centrifugal thermosiphon pressure gain in the working fluid that is used to overcome the pressure loss in the remainder of the processes. Next an isothermal compression 382 occurs in the working fluid cooler thereby heating the warm heat transfer fluid, which is then followed by an adiabatic expansion 384 in further expansion passages that ideally cools the working fluid to just below the temperature of the cold heat transfer fluid before isothermal expansion 386 in the cold working fluid heater that cools the cold heat transfer fluid completes the cycle. The isothermal cooling and heating as well as the isobaric heating processes in particular are likely to be only rough approximations to the reality, and may be replaced by non-isothermal cooling and non-isobaric heating processes. In particular the isobaric heating addition 378 may be replaced with something closer to an isothermal heat addition as the working fluid flows radially inwards through the hot working fluid heater. The area enclosed within the clockwise power producing loop bounded by the curves 376, 378, 380, 382 is equal to the area enclosed within the anticlockwise power absorbing and heat pumping loop bounded by the curves 382, 384, 386, 376.

Figure 16:
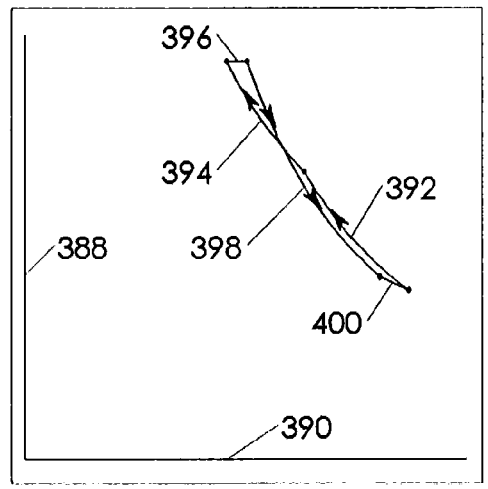
FIG. 16 is a graph that illustrates the idealised cyclic thermodynamic changes that occur within the working fluid as it circulates around the working fluid circulation path within the rotor of the heat pump of FIG. 8 using idealised thermodynamic processes that will only be approximated in reality, pressure graphed on the vertical axis and mass specific fluid volume on the horizontal axis.

FIG. 16 is a graph that illustrates the idealised cyclic thermodynamic changes that occur within the working fluid as it circulates around the working fluid circulation path within the rotor of the heat pump of FIG. 8 using idealised thermodynamic processes that will only be approximated in reality. Pressure is graphed on the vertical axis 388 and mass specific fluid volume on the horizontal axis 390. An adiabatic compression 392 in the compressor and compression passages ideally raises the working fluid temperature to just above the temperature of the warm heat transfer fluid and is followed by an isothermal compression 394 that occurs in the working fluid cooler thereby heating the warm heat transfer fluid. This is followed by an isobaric heat addition 396 in the hot working fluid heater and then an adiabatic expansion 398 in the expansion passages and finally an isothermal expansion 400 in the cold working fluid heater that cools the cold heat transfer fluid to complete the cycle. The isothermal cooling and heating as well as the isobaric heating processes in particular are likely to be only rough approximations to the reality, and may be replaced by non-isothermal cooling and non-isobaric heating processes, in particular the isobaric heating process may be replaced by a heating process in which the working fluid flows radially inwards, with little impact on efficiency. The area enclosed within the clockwise power producing loop bounded by the curves 394, 396, and 398 is equal to the area enclosed within the anticlockwise power absorbing and heat pumping loop bounded by the curves 398, 400, 392, 394.

FIG. 17 shows an isometric cross sectional view with sectioning plane coincident with the rotor axis of a preferred embodiment of a heat pump of the current invention in which the circulation of the working fluid within the spinning rotor is powered by a radiatively heated centrifugal thermosiphon as well as an electrically powered compressor that may each contribute a variable portion of the total pressure gain required to drive the working fluid circulation within the rotor. The rotor 402, comprising many parts, spins about rotor axis 404 within a partially evacuated rotor casing 406 in order to reduce windage drag. The gas within the rotor casing may also be a gas other than air in order to either further reduce the windage drag by using a low molecular weight gas such as methane, steam, ammonia, helium or hydrogen, or a non-oxidising gas such as nitrogen, hydrogen, methane, ammonia or helium in order to better allow the use of materials with low cost and high temperature strength such as molybdenum alloys that are sensitive to oxidation.

The rotor incorporates a radiative receiver disc 408 that extends out to the maximum rotor radius where it is exposed to radiative heat sources over an annular radiative receiver area 410 on each side of the disc over a span of radii nearest the disc periphery heating the working fluid in the hot working fluid heater that in this preferred embodiment is made up of tubes bonded to one side of the radiative receiver disc in the annular radiative receiver area. The radiative heat sources on each side of the disc are radiator tubes 412 that extend around generally circular paths with axis coincident with the rotor axis and that are each insulated 414 in areas that do not face the annular radiative receiver area so as to limit unwanted radiative heat losses. The radiator tubes will in most cases contain a radiator heating fluid that transfers heat to the tubes to be radiated to the annular radiative receiver area of the disc. There are many potential radiator heating fluids, some preferred examples are: combustion gases or other non-combustible gases, liquid metals or gaseous metals such as lithium or sodium undergoing condensation into liquids in a heat-pipe arrangement, liquid salts and non oxidising gases. It is also possible that a nuclear heat source may be placed directly inside the radiator tubes, or that the tubes may be heated by electricity at times where other cheaper sources of heat are unavailable. A heat source 416 supplies radiator heating fluid to the radiator tubes. There are many different possible heat sources, some examples of which include: a solar radiative receiver upon which sunlight is concentrated, a nuclear heat source, a reservoir of high temperature stored heat, a combustor burning a fuel and preferably recovering waste heat from its exhaust to preheat air prior to combustion. Boiling a metal such as lithium or sodium at the heat source to be condensed back into a liquid within the radiator tubes in a heat-pipe arrangement provides a means for circulating heat at relatively consistent temperature and without the requirement for a pump, and is made easier by placing the boiler below the radiator tubes so that gravity causes condensing radiator heating fluid to drain from the radiator heated tubes back to the boiler.

A small solar radiative receiver aperture 418 with insulated conical inlet 420 covered over by a transparent dome 422 to withstand both the pressure differential and the solar flux makes it possible to focus sunlight concentrated by a Fresnel lens or parabolic mirror or similar upon a small area of the annular radiative receiver area. The high flux intensity possible for solar concentration means that in direct sunlight one or possibly several relatively small solar apertures can deliver radiative heat energy to the annular radiative receiver area equal to the radiative heat flux that may be delivered by the greater area but lower temperature radiator tubes. This usefully makes it possible to operate a single rotor with a solar heat source as well as with a supplementary heat source such as combustion of a fuel when there is insufficient sunlight.

Figure 18:
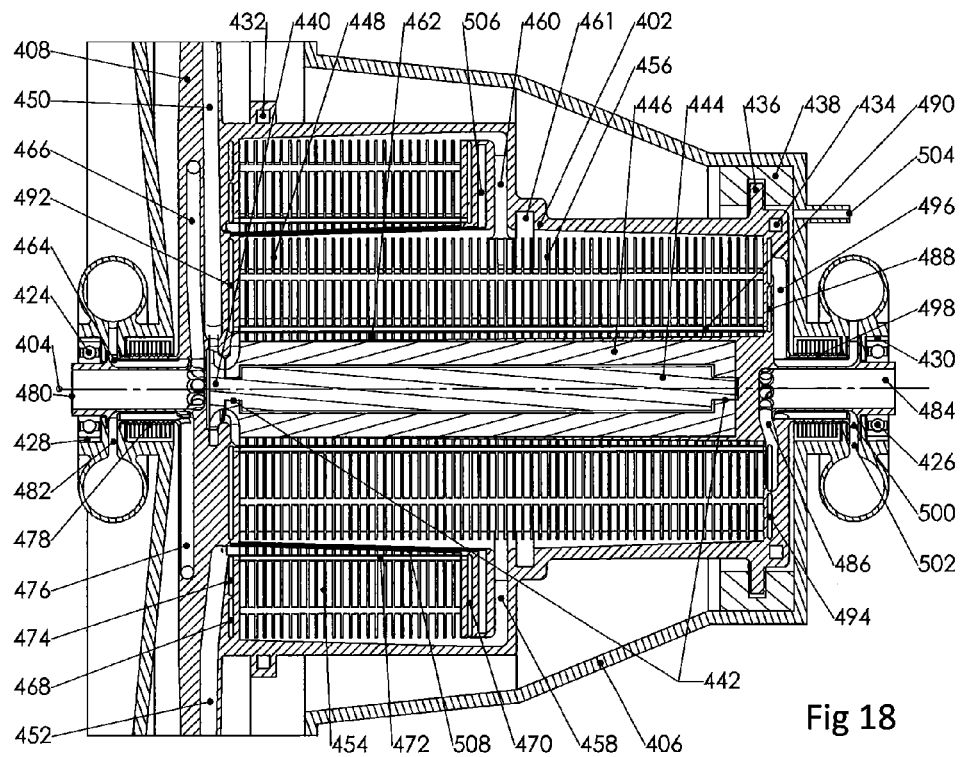
FIG. 18 shows a cross sectional view of the heat pump of FIG. 17 with the sectioning plane coincident with the rotor axis and showing detail of those parts of the heat pump close to the rotor axis.

FIG. 18 is part of a cross sectional view of the heat pump of FIG. 17 with sectioning plane coincident with the rotor axis and showing only those parts of the heat pump close to the rotor axis and omitting most of the radiative receiver disc. Circulation of the working fluid within the spinning rotor is powered by a radiatively heated centrifugal thermosiphon as well as an electrically powered compressor that may each contribute a variable portion of the total pressure gain required to drive the working fluid circulation within the rotor. The compressor may be omitted from the heat pump if it is not necessary to supplement or substitute electrical power for the heat power that drives the centrifugal thermosiphon.

The rotor 402 spins about the rotor axis 404 within the partially evacuated rotor casing 406 supported on warm end rotor bearing 424 and cold end rotor bearing 426 that are each respectively mounted within a radially soft bearing mount 428, 430 so that at maximum operational speed the rotor spins at an angular frequency above the first natural frequency of radial oscillation of the rotor mass within the radially soft bearing mounts. This condition means that the multiple identical autobalancer rolling elements within each of the two autobalancer cavities of revolution about the rotor axis 432, 434 will automatically distribute themselves within the autobalancer cavities in a manner that acts to move the centre of mass of the combined rotor and autobalancer rolling elements towards the rotor axis, so that even with changes in fluid density and fluid distribution and thermal or stress induced rotor dimensional changes the rotor imbalance will be in general minimised and thus reduce the out of balance radial bearing loads upon the rotor bearings. The rotor bearings are in this embodiment rolling element bearings, but could also be replaced by hydrodynamic bearings or even gas lubricated or magnetic bearings.

The rotor is propelled to spin by rotor motor and inductive rotary coupling that is made up of a motor rotor 436 attached to the rotor and a motor stator 438 attached to the inside of the partially evacuated rotor casing. The motor rotor and inductive rotary coupling is of the axial flux type in which the majority of the magnetic forces upon the rotor are in an axial direction in order to reduce the magnitude of radial magnetic forces that might otherwise unfavourably radially deflect the rotor bearing's radially soft bearing mounts. The inductive coupling enables the transmission of electrical power to the rotor to drive the compressor 440 for such times as it is necessary to have the compressor drive the circulation of the working fluid about the working fluid circulation path within the rotor, but could also be replaced by electrical slip rings or a liquid metal rotary coupling or the like. The compressor is a radial compressor that rotates about an axis coincident with the rotor axis in order to reduce the radial forces upon the compressor rotor bearings 442 that are preferably of the working fluid gas-lubricated type, as any vaporised hydrocarbon lubricants that get into the circulating working fluid will tend to decompose in hottest sections of the working fluid circulation path, potentially creating undesirable deposits and gaseous decomposition products in the working fluid. The compressor is driven by a compressor motor that is made up of a compressor motor rotor 444 and a compressor motor stator 446, that are relatively long and small diameter in order to reduce the fluid frictional losses that arise from the relatively dense working fluid in the cylindrical gap between the rotor and stator.

The fluids circulate within the rotor in a manner similar to the heat pump of FIG. 7, though with the addition of the compressor between the working fluid heater 448 and the hot working fluid heater (not visible in FIG. 18). Working fluid from the compressor flows radially outwards from the compressor through multiple compression tubes 450 spaced at regular intervals around the rotor axis and bonded to the surface of the radiative receiver disc 408, undergoing compression and heating as it is subjected to the large centripetal accelerations within the rotor. The working fluid is then heated further in the hot working fluid heater near the periphery of the radiative receiver disc (not visible in this FIG. 18) and then flows radially inwards through multiple expansion tubes 452 spaced at regular intervals around the rotor axis and also bonded to the surface of the radiative receiver disc, expanding and cooling as it does so. The working fluid then flows in a radially outwards direction through the working fluid cooler 454 that is preferably of similar construction to the heat exchangers of FIG. 4 or FIG. 5 with axially arrayed parallel fins and axial tubes, undergoing cooling and compression as it transfers heat to the warm heat transfer fluid that is preferably a liquid primarily composed of water or an alcohol. The working fluid then flows radially inwards to the cold working fluid heater 456 that is preferably of similar construction to the heat exchangers of FIG. 4 or FIG. 5, expanding and cooling through cold expansion passage 458 that contains radial vanes 460 distributed around the rotor axis to prevent the working fluid from rotating about the rotor axis at an angular speed greater than the rotor due to conservation of angular momentum as it moves radially inwards. The working fluid flows radially inwards through the cold working fluid heater undergoing heating and expansion as it absorbs heat energy from the cold heat transfer fluid and then flows through a predominantly axial connecting passage 462 around the outside of the compressor motor stator back to the compressor to complete the working fluid circulation path.

Working fluid that condenses as it reaches the cold working fluid heater will be thrown radially outwards and may collect in the radially inwards facing working fluid condensation collection cavity of revolution 461, an inwards facing cavity where cold liquid working fluid may collect without being unnecessarily cyclically evaporated and condensed. Collecting this condensate will gradually reduce the working fluid pressure until no further condensation occurs due to the drop in condensation temperature that occurs when pressure drops.

The warm heat transfer fluid enters the rotor through warm heat transfer fluid inlet 464 and is distributed to flow radially outwards through multiple radial outflow passages 466 to connect with the warming heat transfer fluid distribution chamber 468 from which multiple axial cooling tubes that pass through the length of the working fluid cooler transfer the warm heat transfer fluid to transfer passages 470 at the opposite end of the working fluid cooler from which further multiple axial cooling tubes 472 transfer the warm heat transfer fluid back to the warming heat transfer fluid collection chamber 474 that connects to multiple radial inflow passages 476 through which the warm heat transfer fluid flows radially inwards to then flow through the internal diameter of the warm end rotor vacuum seal 478, that it cools by conduction as it passes through and then out of the rotor through the warm heat transfer fluid outlet pump impeller 480 that increases the dynamic pressure in the warm heat transfer fluid outlet by operating as a dynamic pump impeller with the warm heat transfer fluid then being diffused within the warm heat transfer fluid outlet diffuser 482 attached to the rotor casing to create increased static pressure.

The cold heat transfer fluid enters the rotor through cold heat transfer fluid inlet 484 and is distributed to flow radially outwards through multiple radial outflow passages 486 to connect with the cold heat transfer fluid distribution chamber 488 from which multiple axial warming tubes 490 that pass through the length of the cold working fluid heater transfer the cold heat transfer fluid to transfer passages 492 at the opposite end of the cold working fluid heater from which further multiple axial warming tubes transfer the warm heat transfer fluid back to the cold heat transfer fluid collection chamber 494 that connects to multiple radial inflow passages 496 through which the cold heat transfer fluid flows radially inwards to then flow through the internal diameter of the cold end rotor vacuum seal 498 that it cools by conduction as it passes through and then out of the rotor through the cold heat transfer fluid outlet pump impeller 500 that increases the dynamic pressure in the cold heat transfer fluid outlet by operating as a dynamic pump impeller with the cold heat transfer fluid then being diffused to create increased static pressure within the cold heat transfer fluid outlet diffuser 502 attached to the rotor casing.

The rotor casing is partially evacuated by means of a vacuum pump attached to the rotor casing evacuation port 504.

An insulating cavity 506 between the working fluid cooler and the cold expansion passage and an insulating cavity 508 between the working fluid cooler and the cold working fluid heater help to limit the unwanted heat transfer between warmer and colder parts of the working fluid flow paths and are preferably fluidically connected to the partially evacuated rotor casing to improve their thermal insulating effect.

Figure 19:
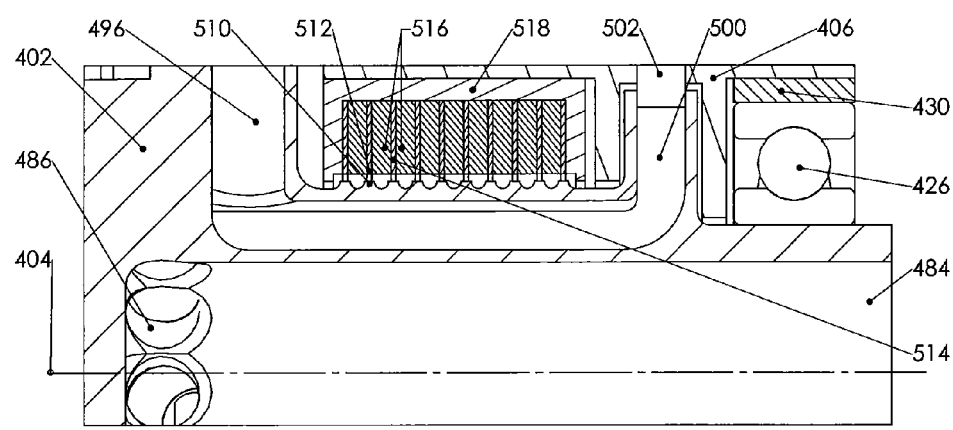
FIG. 19 is a detail view of part of the cross sectional view of FIG. 18 showing the region surrounding the cold end of the rotor adjacent the rotor axis, and showing detail of the cold end rotor bearing that is a rolling element bearing mounted within a cold end radially soft bearing mount that is preferably a deformable polymeric material mounted within the rotor casing that enables autobalancers within the rotor to bring the rotor centre of mass into close proximity with the rotor axis when the rotor is spinning at maximum speed.

FIG. 19 is a detail view of part of the cross sectional view of FIG. 18 showing the region surrounding the cold end of the rotor 402 adjacent the rotor axis 404, and shows detail of the cold end rotor bearing 426 that is a rolling element bearing, mounted within the cold end radially soft bearing mount 430 that is preferably a deformable polymeric material mounted within the rotor casing 406 that enables the autobalancers within the rotor to bring the rotor centre of mass into close proximity with the rotor axis when the rotor is spinning at maximum speed. The cold heat transfer fluid enters the rotor through cold heat transfer fluid inlet 484 and is distributed to flow radially outwards through multiple radial outflow passages 470. The outflow of the cold heat transfer fluid from the rotor is via multiple radial inflow passages 480 through which the cold heat transfer fluid flows radially inwards to then flow through the internal diameter of the cold end rotor vacuum seal and then out of the rotor through the cold heat transfer fluid outlet pump impeller 484 that expels the cold heat transfer fluid with significant tangential and radial velocity acting as a dynamic pump impeller powered by the rotor motor, this cold heat transfer fluid velocity is turned into increased static pressure within the cold heat transfer fluid outlet diffuser 502 attached to the rotor casing that may be used to drive the circulation of the cold heat transfer fluid through heat exchangers inside and outside of the rotor, and to overcome the pressure gradient caused by the cold heat transfer fluid being cooled at significant radial distance from the rotor axis within the rotor.

The rotor vacuum seal is of the magnetic barrier fluid type in which rings of magnetic fluid (not shown) having low vapour pressure and containing ferromagnetic particles are held in annular gaps between matched inner circumferential poles 510 and outer circumferential poles 512 of alternating polarity spaced axially along the axial length of the seal.

Concentrations of magnetic flux pass in a predominantly radial direction between each pair of inner and outer poles holding the magnetic fluid in place against axial pressure differentials. Each inner and outer pole pair of the magnetic bearing is able to resist a fraction of atmospheric pressure and in total they can combine to resist a pressure differential equal to atmospheric pressure over the length of the seal when the rotor is spinning or stationary. The inner circumferential poles are formed as circumferential ridges in a soft ferromagnetic material. The outer circumferential poles are formed as annular rings 514 of a soft magnetic material sandwiched between annular axially magnetised permanent magnets 516 with facing axial faces of the same polarity. The stationary magnetic components of the seal are clamped together within a non-magnetic seal body 518 to overcome the mutually repulsive forces between the annular permanent magnets in the seal. A similar magnetic fluid rotor vacuum seal is employed at the warm end of the rotor.

This type of rotor vacuum seal is gas-tight and can seal against relatively high levels of vacuum. It has low wear and friction and may accommodate some radial movement between the stationary and rotating components. It also advantageously reduces the amount of vacuum pumping required to maintain the desired low rotor casing pressure, and in some cases may even allow the elimination of the vacuum pump altogether after the initial vacuum has been established, or may otherwise enable the use of only infrequent running of a vacuum pump to evacuate the rotor casing.

Figure 20:
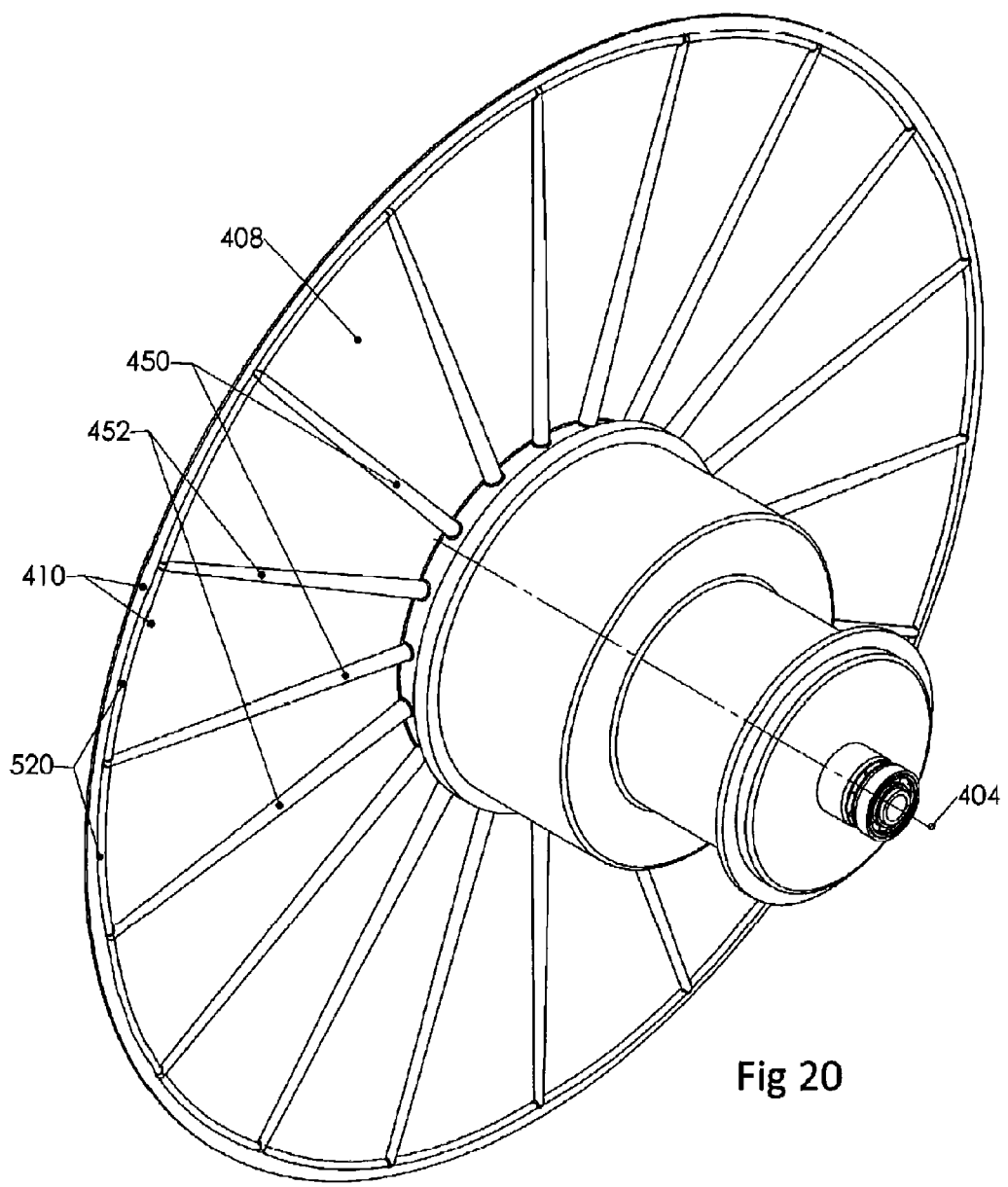
FIG. 20 is a perspective view of the rotor of the heat pump of FIGS. 17-19 with the rotor casing not shown, illustrating a preferred layout for the working fluid passages bonded to the radiative receiver disc, the working fluid flowing radially outwards through compression tubes arrayed around the rotor axis, the tubes tapering to smaller diameters with increasing radius, the working fluid flowing through each compression tube then splitting to flow in parallel in both circumferential directions through hot working fluid heater tubes that are also bonded to the surface of the radiative receiver disc in the annular radiative receiver area radially adjacent the periphery of the radiator receiver disc absorbing heat energy, the working fluid heater tubes then joining up to expansion tubes through which the working fluid flows radially inwards undergoing expansion and cooling and decreasing in density, the expansion tubes tapered with increasing internal diameter at smaller radii to maintain the desired flow velocity as the working fluid density reduces.

FIG. 20 is an isometric view of the rotor of the heat pump of FIG. 17-19 without the rotor casing and illustrating a preferred layout for the working fluid passages bonded to the radiative receiver disc 408. The working fluid flows radially outwards through compression tubes 450 arrayed around the rotor axis undergoing compression and increasing in temperature and density. The tubes are tapered to smaller diameters with increasing radius to maintain the desired flow velocity in the increasingly dense working fluid. The working fluid flowing through each compression tube then splits to flow in parallel in both circumferential directions through hot working fluid heater tubes 520 that are also bonded to the surface of the radiative receiver disc in the annular radiative receiver area 410 radially adjacent the periphery of the radiator receiver disc absorbing heat energy. The working fluid heater tubes then join up to the expansion tubes 452 through which the working fluid flows radially inwards undergoing expansion and cooling and decreasing in density. The expansion tubes are tapered with increasing internal diameter at smaller radii to maintain the desired flow velocity as the working fluid density reduces. The radial distance of the generally circumferentially path of the working fluid heater tubes from the rotor axis preferably decreases slightly from the end of the compression tubes to the expansion passages so that as the working fluid is heated centripetal buoyancy forces created by the centrifugal thermosiphon will tend to push the working fluid in the desired direction of flow, thereby ensuring that the working fluid flow initiates and maintains the desired flow direction during start-up and normal operation.

It is generally preferred that there be a relatively large temperature differential between the working fluid and the hot working fluid heater tubes as it reduces the amount of tube surface area required to transfer the necessary heat into the working fluid, and the heat pump efficiency is less sensitive to large temperature differentials in this heat exchanger than it is in the other heat exchangers.

The temperature of the working fluid in the compression and expansion tubes falls rapidly with decreasing radius and so helps to cool the radiative receiver disc at radii smaller than the radii of the annular radiative receiver area. The radiative receiver disc is thus only very hot in an area close to the rim and material strength will generally increase rapidly with decreasing radii helping to reduce the thickness of radiative receiver disc required to provide sufficient strength to support the hot working fluid heater.

It is advantageous to have a relatively large number of compression and expansion tubes connected by relatively short hot working fluid heater tubes as it reduces the total length of the flow path within the working fluid circulation path and so may help to reduce the mass of expensive working fluid required.

There are many other ways in which the hot working fluid heater could be integrated within the radiative receiver disc: the working fluid flow passages could be partially or wholly internal to the disc, and the compression and expansion tubes could each be joined together by a single hot working fluid heater tube, or by more than two hot working fluid heater tubes with parallel flow in them.

The materials from which the radiative receiver disc is made will ideally have a combination of high strength at high temperature, low density and low cost. While there are many nickel, cobalt and iron based alloys that may be suitable, it is also possible that molybdenum will provide an attractive alternative given very high strength at high temperatures as well as relatively high thermal conductivity. In some cases it may be possible to only utilise more expensive high temperature capable materials close to the hot rim of the rotor, and bond those high temperature materials to cheaper materials at smaller radii.

An axial cross section of a further preferred embodiment of a working fluid heater or working fluid cooler such as is used in the heat pump of FIG. 1 is shown in FIG. 21, in isolation from the rest of the rotor. The working fluid heater or cooler may also be utilised in other heat pumps and engines of the current invention, and operates as a heat exchanger to transfer heat energy between the working fluid and the warm heat transfer fluid or cold heat transfer fluid or coolant fluid or hot heating fluid. In this embodiment the heat exchanger operates as either a working fluid heater or a working fluid cooler and is in general form a cylindrical volume of revolution about the rotor axis 2 and contains a plurality of working fluid flow channels 501 arrayed around the rotor axis through which the working fluid flows either in a generally radially outwards direction if undergoing compression or a generally radially inwards direction if undergoing expansion. The working fluid flow channels are in general form spirals about the rotor axis and preferably have a cross sectional flow area that diminishes with increasing distance from the rotor axis in order to maintain a relatively constant flow velocity for the working fluid as its density increases due to centripetal acceleration induced compression with increasing radius. Spiral walls 503 separate the working fluid flow channels from circumferentially adjacent heat transfer fluid flow channels 505 through which the warm heat transfer fluid or cold heat transfer fluid or coolant fluid or hot heating fluid flows in a generally radial direction in fluid isolation to the working fluid.

These heat transfer fluid flow channels are also in general form spirals, though in most cases they will be of relatively constant cross sectional area with increasing radius as the heat transfer fluid flowing through them will typically not undergo significant changes in density. The working fluid flow channels and heat transfer fluid flow channels are additionally arrayed axially in prismatic columns parallel to the rotor axis with axially adjacent working fluid flow and heat transfer fluid flow channels being separated by thin fins that transfer heat into and out of the fluids, these axial prismatic columns may alternatively be constructed as helixes about the rotor axis though there is unlikely to be any benefit in doing so. The working fluid flow channels fluidly connect to axial working fluid connecting passages at their radial inner 507 and radial outer 509 ends. Similarly the heat transfer fluid flow channels fluidly connect to axial heat transfer fluid connecting passages at their radial inner 511 and radial outer 513 ends. These axial connecting passages distribute or collect the fluids that flow through each of the individual working fluid flow and heat transfer fluid flow channels within the heat exchanger. A circumferential radial outer wall 515 and a radial inner wall 517 seal the pressurised fluids within the heat exchanger and further contribute strength to resist the centripetal acceleration induced stresses within the heat exchanger.

The circumferentially and axially arrayed heat transfer fluid flow channels of this heat exchanger combined with the radial inner and outer walls are preferably constructed from a large number of generally annular outline planar sheet metal laminates with cut-outs to form the flow passages. These laminates are assembled into an axial stack and bonded together into an annular laminate stack by brazing, soldering, welding or polymeric bonding. Aluminium alloys are generally preferred for heat exchanger applications where temperatures are under about 150° C. due to their combination of high thermal conductivity, low density and cost, though copper alloys or other metals such as stainless steels or molybdenum alloys may also be used to take advantage of higher thermal conductivity, easier processing or bonding, better corrosion resistance to heat transfer fluids or greater strength at high temperatures, particularly for hot heat exchangers.

For aluminium the two most preferred methods of bonding the laminates together are brazing, at temperatures near to 600° C., preferably utilising at least in part braze alloy clad aluminium brazing sheet to make some of the laminates, and soldering at temperatures under 450° C., preferably utilising aluminium laminates that are plated in a solder alloy. In some cases it may be possible to achieve higher strength in the aluminium by heat treatment after brazing or soldering.

An optional tensile retaining ring 519 constructed from a high tensile strength material, and preferably pre-loaded with circumferential tension to provide a radial inwards compressive force upon the radial outer wall of the annular laminate stack may usefully reduce the pressure and centripetal acceleration induced stresses within the annular laminate stack of the heat exchanger. It may be constructed from a material with lower thermal expansion coefficient than the heat exchanger laminates so as to increase the compressive load that it applies to the annular laminate stack as it increases in temperature during rotor operation. The optional tensile retaining ring may also be used to provide additional axial tensile clamping load upon the laminates so as to resist internal pressure loads that might otherwise burst the annular laminate stack apart axially. The preferred method for creating this interference fit between the tensile retaining ring and the annular laminate stack is to heat the tensile ring and/or cool the annular laminate stack to create a differential thermal expansion, as when they are then assembled and match temperature this will create a significant axial and hoop tensile stress within the ring and as a result a desirable axial, circumferential and radial compressive stress within the annular laminate stack. Additional optional inner axial tensile bolts 520 at the inner radius of the heat exchanger may also be used to provide increased axial tensile clamping load upon the annular laminate stack at its inner radius.

There are many benefits to this heat exchanger configuration. It may be constructed from cheap and easily processed sheet materials in a highly automated process of stamping and brazing or soldering, and may deliver very high rates of heat transfer with small temperature differentials within a lightweight and compact heat exchanger that has only a small volume of expensive working fluid within it. The thin fins that separate axially adjacent working fluid flow and heat transfer fluid flow channels are not subjected to significant pressure differentials through their axial thickness, as both sides of the fin at any location are subjected to the same fluid at the approximately the same pressure. The fins bridging between the spiral walls provide effectively distributed mechanical support to resist pressure differentials between the working fluid and heat transfer fluid that would otherwise tend to push the spiral walls circumferentially apart or together. The heat exchanger is constructed with very small axial gaps between the axially adjacent fins so that high heat transfer rates may be achieved with low flow losses in a low Reynolds number laminar flow regime. The plane of the thin fins is perpendicular to the rotor axis so that there is little centripetal acceleration induced bending load or fluid Coriolis acceleration induced pressure loads upon them, and the fins themselves contribute circumferential and radial strength to the annular laminate stack to resist the centripetal acceleration and fluid pressure induced loads. The outer and inner walls are connected to the spiral walls to better transfer radial loads and also seal the fluids within the annular laminate stack while the optional outer tensile ring may be pre-loaded in tension to compressively load the heat exchanger within and thereby reduce the stress levels of the heat exchanger created by fluid pressure forces and centripetal accelerations on the fluids and annular laminate stack mass.

FIG. 22 shows an isometric cross section taken in a plane coincident with the rotor axis of the heat exchanger of FIG. 21, in isolation from the rest of the rotor. The annular laminate stack 522 sits between left and right hand axial end plates 524, 526 that are rigidly bonded to the laminate stack by similar means to the bonding between the laminates of the annular laminate stack of which brazing, soldering, welding or polymeric bonding are preferred means. This bonding means is preferably sufficiently strong that it will provide the necessary axial tensile strength to prevent the internal fluid pressures within the heat exchanger from bursting the laminate apart, however if these bonds do not have sufficient strength then additional axial compressive loading of the laminate stack may be provided by the optional tensile retaining ring 518 clamped to the right hand axial end plate by bolts 528 and/or the optional inner axial tensile bolts 520. The axial end plates provide the rigidity necessary to resist the discontinuous fluid pressure forces acting across the annular face without unacceptable deformation that would otherwise tend to de-laminate the bonds between the axial end plates and the ends of the annular laminate stack. The axial end plates also provide a suitably thick rigid base to which working fluid and heat transfer fluid transfer passages (not shown, but including warm heat transfer fluid or cold heat transfer fluid or coolant fluid or hot heating fluid transfer passages) that transfer the fluids in the heat exchanger to and from other components of the rotor may be bonded to using leak-proof means such as welding or brazing while also providing sufficient strength to withstand centripetal accelerations and fluid pressure forces acting upon these fluid transfer passages. In this preferred embodiment the working fluid enters the heat exchanger through multiple inlet holes 530 that are distributed circumferentially about the rotor axis 2 in the right hand axial end plate, and leaves the heat exchanger through multiple outlet holes 532 that are also distributed circumferentially about the rotor axis in the right hand axial end plate. The heat transfer fluid (including warm heat transfer fluid or cold heat transfer fluid or coolant fluid or hot heating fluid) enters and exits the heat exchanger through multiple inlet and outlet holes distributed circumferentially around the rotor axis in the left hand axial end plate. A single heat transfer fluid inlet or outlet hole 534 is visible, and is one of an array of such holes about the rotor axis and is complemented by an equivalent number of holes near the outer radius of the left hand axial end plate through which the heat transfer fluid flows in the opposite direction to the visible hole.

Three different types of generally annular outline form laminates are shown in FIG. 23, each laminate shown in isolation, but with the laminates arrayed as they would be in use, along the rotor axis 2. When appropriately angularly positioned with respect to each other about the rotor axis appropriate selections of these laminates may be axially stacked in large numbers and bonded together to form the annular laminate stacks of the heat exchanger shown in FIG. 21 and FIG. 22.

The first laminate type 536 provides the material that forms the fins within the heat exchanger and is perforated only by holes that form the axial connecting fluid passages. With its relatively complete annular form it is most advantageously manufactured from a material with relatively high tensile strength so as to contribute to the structural strength and integrity of the annular laminate stack. This first laminate type is combined in an alternating axial sequence with the second laminate type 538 that has perforations that form the axial connecting fluid passages as well as the spiral fluid flow passages for both the working fluid and the heat transfer fluid that is one of: warm heat transfer fluid, cold heat transfer fluid, coolant fluid, hot heating fluid. In the case of an annular laminate stack formed from brazed aluminium sheet it is preferred that the second laminate type be cut from aluminium brazing sheet in which there is a thin layer of a brazing alloy clad on either side of a thicker core alloy sheet with higher melting temperature than the clad brazing alloy, thereby supplying the brazing alloy required to bond the annular laminate stack together. In the case of soldering an aluminium annular laminate stack together, both the first and second type of laminate will generally need to be plated or clad with a solderable alloy layer. Both of these first and second laminate types may be manufactured by cutting them from constant thickness sheet metal stock that is then clamped together into stacks and heated with appropriate fluxes and surrounding gases to braze or solder the annular laminate stack together, thereby providing a very simple and relatively low cost means for creating the heat exchanger.

The third laminate type 540 is effectively a combination of the first type of laminate and the second type of laminate joined together into a single laminate component having different axial thicknesses in different areas across its face. It has the same areas of perforation for axial connecting fluid passages as the first type of laminate, but it also has areas of reduced thickness between the spiral wall features that form the spiral flow passages 542. The thickness of the axial thickness of these spiral fluid flow channels may be made different for the working fluid and the heat transfer fluid, which may have advantages in improved rates of heat transfer or reduced flow losses. This third laminate type has advantages in that it requires only a single laminate type to form the annular laminate stack and that each laminate is thicker and more robust than for the first and second types of laminate, with half the total amount of bonding area required. But forming the laminate is more difficult, and will likely require either chemical machining, forging or other stamping processes to form the areas of different thickness from appropriate sheet metal stock. For construction from aluminium using brazing a brazing sheet with only a single side of braze alloy cladding could likely be used as the sheet metal stock, though for soldered aluminium construction there would likely need to be solder alloy plating on both sides of the third laminate type.

Figure 24:
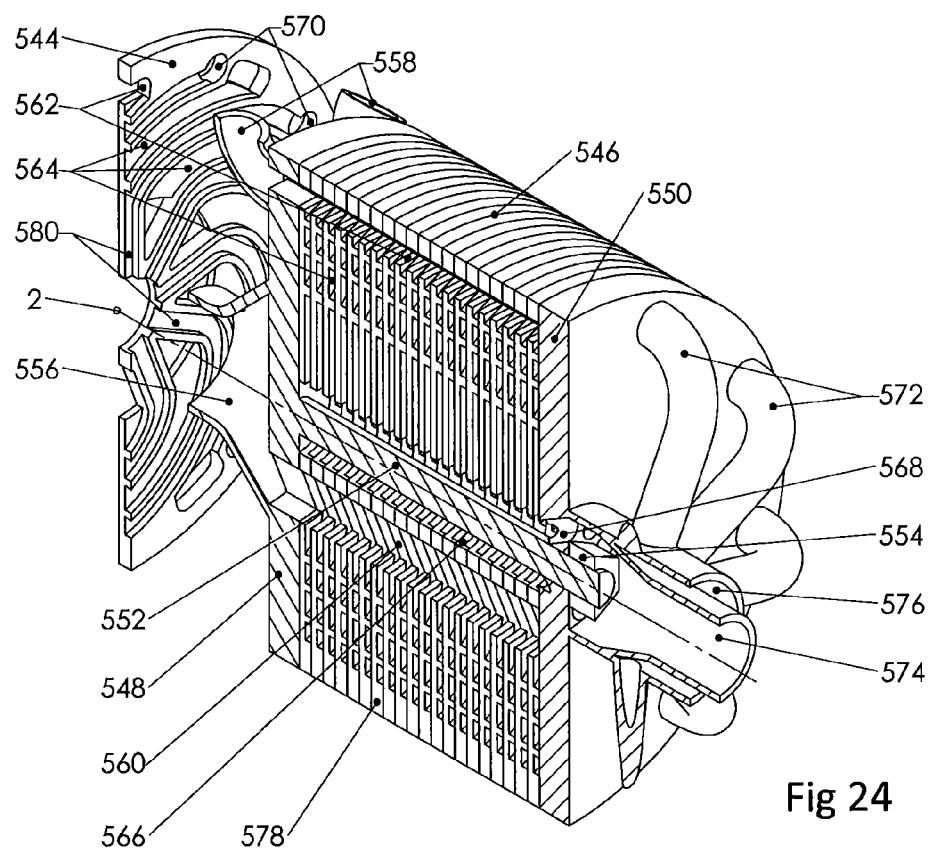
FIG. 24 shows a perspective view of a cross section taken in a plane coincident with the rotor axis of an embodiment of heat exchanger in isolation from the rest of the rotor, and with a single laminate from within the heat exchanger shown axially displaced to the left, the annular laminate stack bonded between axial end plates that are rigidly bonded to the laminate stack, additional axial compressive loading of the laminate stack provided by a central tensile member that is tensioned by a nut to apply an axial compressive load to the annular laminate stack, working fluid entering and exiting the heat exchanger via a central working fluid transfer passage, an outer circular array of working fluid transfer passages shown which transfer the working fluid to and from other components of the rotor (not shown) and connect to holes that penetrate through the left hand axial end plate to connect to axial working fluid connecting passages within the annular laminate stack.

An alternative embodiment of heat exchanger is shown in FIG. 24, the heat exchanger shown as an isometric cross section taken in a plane coincident with the rotor axis, in isolation from the rest of the rotor, and with a single cross sectioned laminate 544 from within the heat exchanger shown axially displaced to the left. With the close proximity to the rotor axis 2 of the heat exchanging flow passages this heat exchanger is of a type that would be most usefully applied in an engine of the current invention to cool the working fluid or in a heat pump of the current invention to warm the working fluid. The annular laminate stack 546 is bonded between left hand axial end plate 548 and right hand axial end plates 550 that are rigidly bonded to the laminate stack by similar means to the bonding between the laminates of the annular laminate stack of which brazing, soldering, welding, diffusion bonding or polymeric bonding are preferred means. In general this bonding means must have sufficient axial tensile strength to prevent the internal fluid pressures within the annular laminate stack of the heat exchanger from splitting the bonds that hold the laminate together apart axially, however if these bonds do not have sufficient strength then additional axial compressive loading of the laminate stack may be provided by the optional central tensile member 552 that is tensioned by nut 554 to apply an axial compressive load to the annular laminate stack.

Working fluid enters and exits the heat exchanger by means of a central working fluid transfer passage 556 and an outer circular array of working fluid transfer passages 558 that transfer the working fluid to and from other components of the rotor (not shown) and that connect to holes that penetrate through the left hand axial end plate to connect to axial working fluid connecting passages within the annular laminate stack. Radially inner 560 and outer 562 pairs of these axial working fluid connecting passages are fluidically connected together by a large number of working fluid flow channels 564 through which the working fluid flows in parallel and in which the majority of the heat transfer into or out of the working fluid occurs and that are of generally spiral form and preferably decreasing cross sectional area with increasing radius to thereby compensate for increasing working fluid density with radius and maintain a more consistent flow velocity. The heat transfer fluid is one of a list that includes: warm heat transfer fluid or cold heat transfer fluid or coolant fluid or hot heating fluid. The heat transfer fluid flows into and out of the heat exchanger by means of holes through the right hand axial end plate that connect to the axial heat transfer fluid connecting passages, of which only the single inner axial heat transfer fluid connecting passage 566 is shown. One of the radial innermost holes through the right hand axial end plate 568 is also shown. Outer axial heat transfer fluid connecting passages 570 within the annular laminate stack are indicated on the single isolated laminate and connect through the right hand axial end plate with the heat transfer fluid radial transfer passages 572. The heat transfer fluid inlet and outlet flow is through two flow passages 574 and 576 that are concentric with the rotor axis, one of which will be the inlet and the other of which will be the outlet for the heat transfer fluid. Without a surrounding tensile ring as in the embodiment shown in FIG. 22, the solid circumferential radial outer wall 578 of the annular laminate stack must provide sufficient strength to resist the centripetal acceleration and fluid pressure induced loads within the annular laminate stack.

Within the annular laminate stack the heat transfer fluid flows in parallel through heat transfer flow passages 580 that fluidically connect the inner axial heat transfer fluid connecting passage and the circular array of outer axial heat transfer fluid connecting passages.

Figure 25:
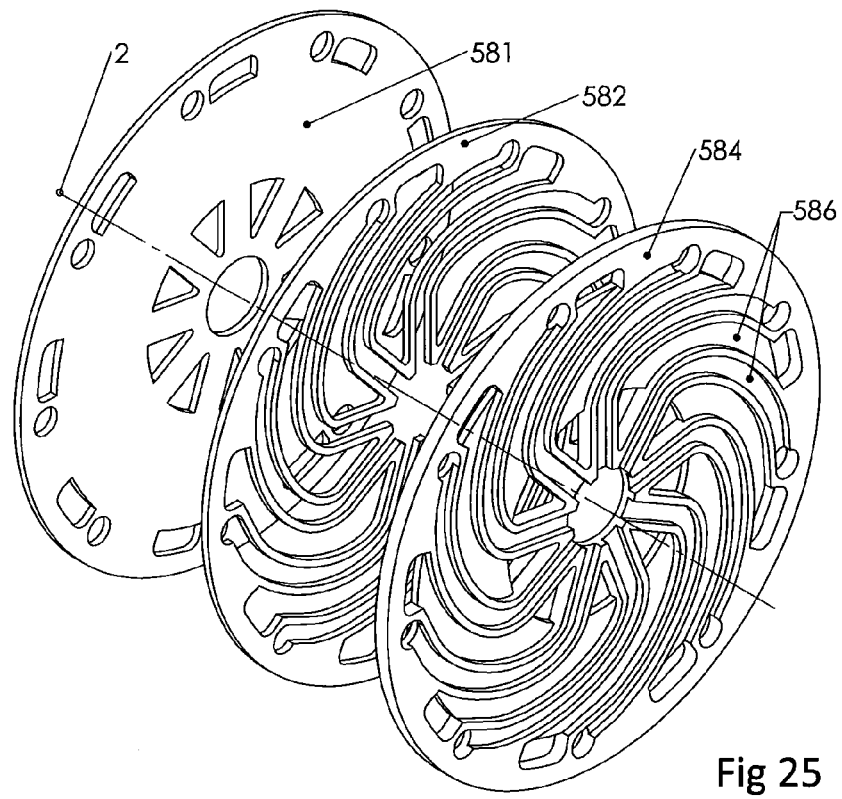
FIG. 25 shows a perspective view of three different types of laminate that could be used with the heat exchanger of FIG. 24, each laminate in use angularly positioned about the rotor axis and combined with other laminates selected from this group to be axially stacked in large numbers and bonded together to form the annular laminate stacks of the heat exchanger shown in FIG. 24.

Another three different types of laminates are shown in FIG. 25, each laminate shown in isolation, but with the laminates arrayed as they would be in use, along the rotor axis 2. These laminates are for use in the more radially compact heat exchanger shown in FIG. 24. Each laminate is shown in isolation arrayed along the rotor axis 2 and when appropriately angularly positioned about the rotor axis and combined with other laminates selected from this group may be axially stacked in large numbers and bonded together to form the annular laminate stacks of the heat exchanger shown in FIG. 24.

The first laminate type 581 provides that material that forms the fins within the heat exchanger and is perforated only by holes that form the axial connecting fluid passages. With its relatively complete annular form it is most advantageously manufactured from a material with relatively high tensile strength so as to contribute to the structural strength and integrity of the annular laminate stack. This first laminate type is combined in an alternating axial sequence with the second laminate type 582 that has perforations that form the axial connecting fluid passages as well as the spiral fluid flow passages for both the working fluid and the heat transfer fluid that is one of: warm heat transfer fluid, cold heat transfer fluid, coolant fluid, hot heating fluid.

The third laminate type 584 is effectively a combination of the first type of laminate and the second type of laminate joined together into a single laminate component having different axial thicknesses in different areas across its face. It has the same areas of perforations for axial connecting fluid passages as the first type of laminate, but it also has areas of reduced thickness between the spiral wall features that form the spiral fluid flow channels 586.

A further five alternate laminates are shown in FIG. 26, each laminate again shown in isolation, but with the laminates arrayed similarly to as they would be in use, along the rotor axis 2. These laminates may be combined and bonded together to form a heat exchanger with more working fluid fins than heat transfer fluid fins. Each laminate is shown in isolation arrayed along the rotor axis 2 and when appropriately angularly positioned about the rotor axis and combined in appropriate sequence with other laminates selected from this group may be axially stacked in large numbers and bonded together to form the annular laminate stacks of the heat exchanger shown in FIG. 24.

The first laminate type 588 forms most of the fins within the heat exchanger and is perforated only by holes that form the axial connecting fluid passages for the working fluid and the heat transfer fluid. This first laminate type is followed in axial sequence by the second laminate type 590 that in addition to cut outs that form the axial connecting fluid passages also has a first circular array of spiral channel cut-outs that fluidically connect pairs of radially inner and radially outer axial working fluid connecting passages, as well as a second circular array of an equal number of spiral channels that alternate in circumferential sequence with the first set of spiral channels and that in fluid isolation to the working fluid fluidically connect the radially inner axial heat transfer fluid connecting passage to all of the radially outer axial heat transfer fluid connecting passages. Following on from the second laminate in this axial sequence is the third laminate type 592 that has the same cut-outs for the axial connecting fluid passages, but only has a circular array of spiral channels connecting the radially inner axial heat transfer fluid connecting passage to all of the radially outer axial heat transfer fluid connecting passages, without a matching set of spiral channels for the working fluid. The forth laminate type in this sequence is the same as the second, completing the repeating sequence that is then continued by the first and second and so on. Combined together this four layer axial sequence forms the four layer annular laminate stack repeating group 594 that illustrates this four layer sequence, and in which there are twice as many fins 596 in the working fluid spiral flow paths, that therefore have smaller axial gaps between the fins, as there are in the heat transfer fluid flow paths.

This four-laminate sequence, and the two-laminate sequence, single multi-thickness laminate described above with reference to FIG. 23 and FIG. 25 can be represented generally as a repeating axial sequence within the laminate stack of 1, or 2n laminates, where n is a natural number. That is, the sequence repeats every 1st, 2nd, 4th, 6th laminate, etc.

This arrangement may have significant advantages for some combinations of working fluid and heat transfer fluid, and in particular when the viscosity and thermal conductivity of the working fluid and heat transfer fluid are not well matched. For example water has typically far higher thermal conductivity and viscosity than xenon, and this may make it advantageous to have narrower axial gaps between the fins for the xenon than between the fins of the water in order to produce a desirable compromise between pressure losses and rates of heat transfer for both fluids. It will also be appreciated that this style of construction could also accommodate not just two but also three, four or more fins in the repeating axial sequence of laminate layers for one fluid for each single fin in the repeating axial sequence of laminate layers for the other fluid.

Figure 26:
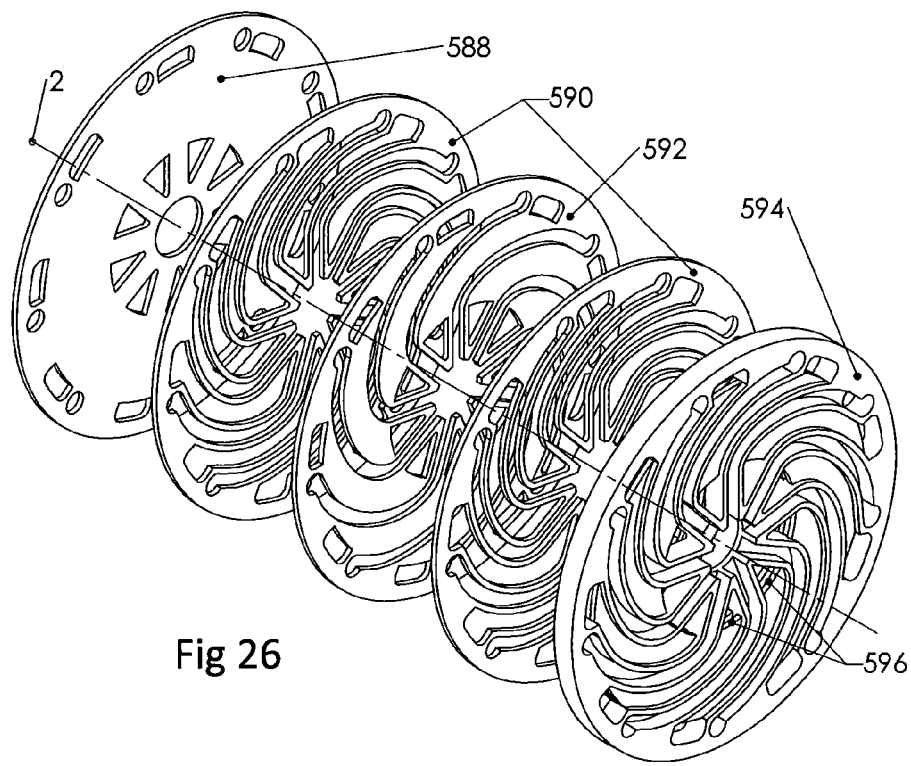
FIG. 26 shows a perspective view of a group of four laminates each shown in isolation, that could be used in repeated axial sequence within the heat exchanger of FIG. 27, as well as a body at the right hand end that the four laminates in sequence would combine to form when bonded together. Each of the four laminates in the sequence in use angularly positioned about the rotor axis and combined with the other laminates selected from this group to be axially stacked in large numbers and bonded together to form the annular laminate stacks of the heat exchanger shown in FIG. 27.
Figure 27:
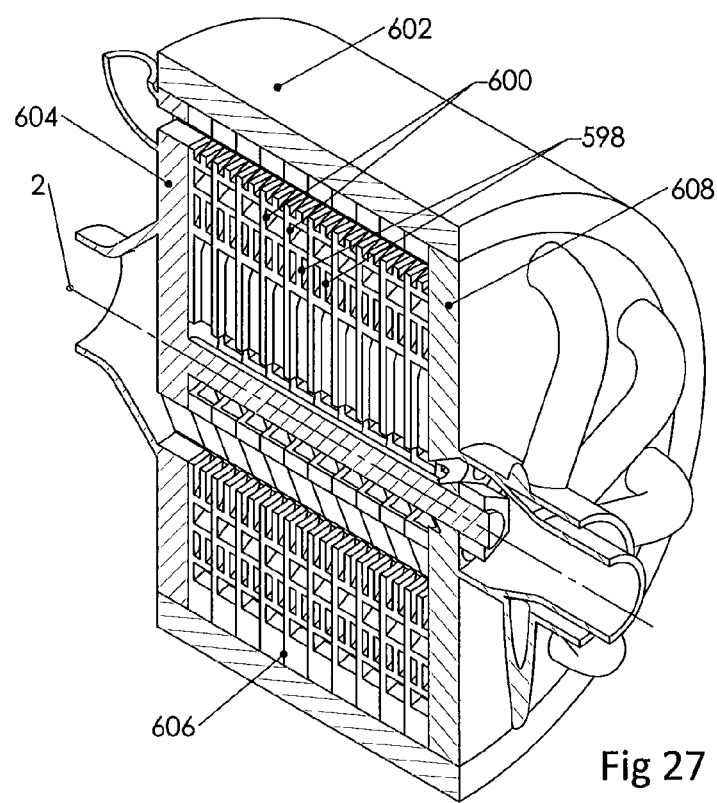
FIG. 27 shows a perspective view of a heat exchanger cross sectioned in a plane coincident with the rotor axis, the heat exchanger incorporating the four layer repeating sequence annular laminate stack illustrated in FIG. 26 and showing double the number of working fluid spiral flow passage fins within the annular laminate stack compared to the heat transfer fluid spiral flow passage fins, the heat exchanger further having a tensile retaining ring shrink-fitted over the bonded-together left hand axial end plate, annular laminate stack, and right hand axial end plate.

A variant of heat exchanger that incorporates the four layer repeating sequence annular laminate stack illustrated in FIG. 26 is shown in FIG. 27, the heat exchanger shown in isometric view and cross sectioned in a plane coincident with the rotor axis 2. The doubled number of working fluid spiral flow passage fins 598 within the annular laminate stack compared to the heat transfer fluid spiral flow passage fins 600 is shown. Additionally there is a tensile retaining ring 602 that is preferably shrink-fitted over the bonded-together left hand axial end plate 604, annular laminate stack 606 and right hand axial end plate 608 so that the tensile ring in contracting due to differential thermal expansion onto the outer cylindrical surfaces of this stacked axial assembly of laminates and axial end plates will create compressive stresses in circumferential, radial and axial directions in the stacked axial assembly that help to overcome centripetal acceleration and fluid pressure induced stresses that might otherwise burst the laminate stack and axial endplates apart. This may permit the use of materials and bonding methods in the laminate stack and axial end plates that would otherwise be insufficiently strong for the required speeds of rotation of the heat exchanger about the rotor axis.

Figure 28:
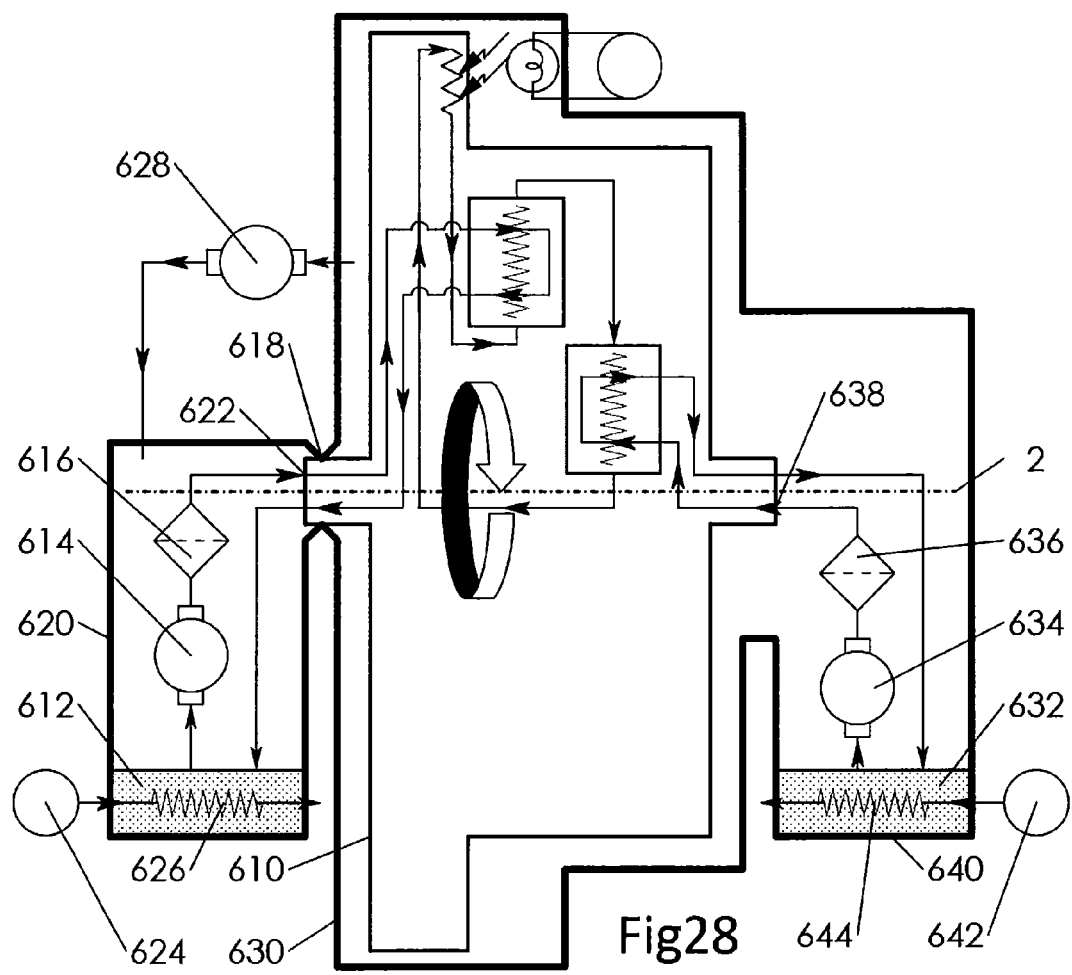
FIG. 28 shows a simplified flow diagram and cross section of a variant of the thermodynamic machine of the current invention configured as a heat pump, showing the general configuration of fluid flows within the heat pump, and illustrating two not necessarily mutually compatible rotor heat transfer fluid inlet options, the rotor rotating about the rotor axis on rotor support bearings that are not shown.

A simplified flow diagram and cross section of a heat pump of the current invention illustrating two, not necessarily mutually compatible, rotor heat transfer fluid inlet options is shown in FIG. 28. Details of the fluid circulation within the rotor and the radiative heat transfer are the same as for the embodiment illustrated in FIG. 7 and described above. The rotor 610 rotates about the rotor axis 2 on rotor support bearings that are not shown.

The warm heat transfer fluid (of which water is a preferred example) from warm heat transfer fluid external reservoir 612 has a vapour pressure significantly lower than atmospheric pressure. It is pumped by a warm heat transfer fluid pump 614 through warm heat transfer fluid filter 616 and into the rotor through a rotor vacuum seal 618 that is only subjected to relatively low pressure differentials owing to the gas pressure within the sealed warm heat transfer fluid reservoir 620 bring equal to the vapour pressure of the warm heat transfer fluid. The rotor vacuum seal is preferably a magnetic fluid seal or dynamic seal or some other form of liquid barrier seal to reduce leakage. Any leakage from the warm heat transfer fluid rotor inlet 622 and any vapour condensate on the warm heat transfer fluid reservoir side of the rotor vacuum seal drains by gravity back into the warm heat transfer fluid reservoir. The warm heat transfer fluid is heated within the rotor and cooled by a heat sink fluid 624 in off rotor cooler 626 while maintaining fluid isolation between the warm heat transfer fluid and the heat sink fluid. A vacuum pump 628 evacuates any warm heat transfer fluid vapour that leaks into the rotor casing 630 back into the already low pressure warm heat transfer fluid reservoir thereby reducing the necessary vacuum pumping power required compared to evacuating the rotor casing into the atmosphere.

The cold heat transfer fluid from cold heat transfer fluid external reservoir 632 is pumped by a cold heat transfer fluid pump 634 through a cold heat transfer fluid filter 636 to enter the rotor at the cold heat transfer fluid rotor inlet 638. There is no rotor vacuum seal between the cold heat transfer fluid and the rotor casing because the cold heat transfer fluid used has very low vapour pressure at its operating temperature and so is the cause of very little windage. Sodium potassium eutectic liquid is a preferred example of an appropriate liquid for this non-rotary-sealed heat transfer fluid inlet and there are also other low vapour pressure liquids such as various vacuum pumping oils that may also be suitable. Leakage from the cold heat transfer fluid rotor inlet drains using gravity back into the cold heat transfer fluid reservoir 640 and the cold heat transfer fluid is warmed by an external heat source fluid 642 in off-rotor heater 644 that maintains fluid isolation between the cold heat transfer fluid and the external heat source fluid.

While there are two different rotor heat transfer fluid inlet options shown in this FIG. 28, using sodium potassium eutectic alloy may not be compatible with some other liquids that may be used for lubrication or in barrier liquid seals, or with some decomposition products that may form on hot surfaces from such lubrication or sealing liquids. With appropriate selection of fluid type either of these two different rotor heat transfer fluid inlet options could be used on any of the heat transfer fluids: cold heat transfer fluid, warm heat transfer fluid, hot heating fluid or coolant fluid.

Figure 29:
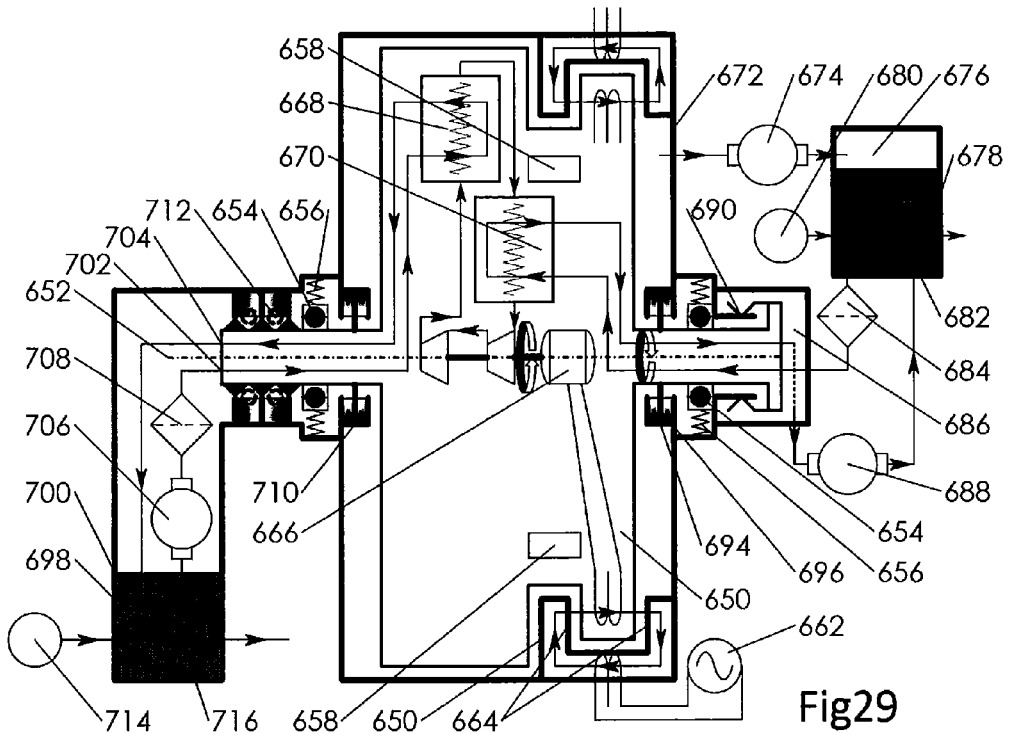
FIG. 29 shows a simplified flow diagram and cross section of a variant of the thermodynamic machine of the current invention configured as a heat pump, showing the general configuration of fluid flows within the heat pump, and illustrating two not necessarily mutually compatible rotor heat transfer fluid inlet options, with associated rotor vacuum seals and rotor bearings, as well as heat transfer fluid reservoirs, a multi stage working fluid compressor and a combined rotary inductive coupling and rotor drive.

A simplified flow diagram and cross section of a heat pump of the current invention in which circulation of the working fluid is driven by an electrically powered compressor and illustrating two, not necessarily mutually compatible, rotor heat transfer fluid inlet options is shown in FIG. 29. The rotor 650 rotates about the rotor axis 652 on two rolling element rotor support bearings 654 that are mounted off of the rotor casing on radially compliant bearing mounts 656 that allow the autobalancer rollers and a small quantity of viscous fluid within the autobalancer annular cavity 658 centred on the rotor axis to circumferentially distribute themselves in an arrangement that tends brings the centre of mass of the spinning rotor assembly into coincident alignment with the rotor axis once the rotor speed is above the first natural frequency of radial oscillation, the compliant bearing mounts helping to reduce this natural frequency. A combined rotary inductive coupling and rotor drive motor 660 drives the rotation of the rotor at the desired rotational speed and transfers electrical power into the rotor to drive the compressor motor 666 from an external electrical power source 662 by means of electromagnetic induction across two axial air gaps 664 that help to minimise the resultant net magnetic force applied to the rotor by the inductive coupling and rotor drive motor and also minimise radial magnetic forces, that might otherwise prevent the auto-balancing system from working as desired.

The compressor motor is preferably of the permanent magnet brushlessly commutated variety for high efficiency and low mass, and powers a two stage dynamic compressor that uses two impellers of either the radial or axial flow variety linked in series flow to drive the working fluid circulation such as might be most beneficial when trying to attain high values of lift. The compressor impellers and motor spin in the rotor about an axis coincident with the rotor axis but in the opposite direction with respect to the rotor to what the rotor spins with respect to the rotor casing (contra-rotating).

With the exception of the two stage compressor the working fluid circulates through the same general sequence of processes as are detailed for FIG. 6 to heat the warm heat transfer fluid in the working fluid cooler 668 and cool the cold heat transfer fluid in the cold working fluid heater 670 as so operate as a heat pump.

The rotor casing 672 is partially evacuated by vacuum pump 674 that preferably operates only discontinuously turning on when pressure inside the rotor casing is too high and turning off when it is low enough. The vacuum pump vents into a vapour space 676 in a cold heat transfer fluid reservoir 678 at a pressure that is preferably at or near the vapour pressure of the cold heat transfer fluid. The cold heat transfer fluid is warmed by a cold heat source 680 by means of heat exchanger 682. Cold heat transfer fluid flows through a filter 684 to remove any detritus from the liquid and then into the rotor by means of a cold heat transfer fluid inlet in a cold heat transfer fluid inlet vapour space 686 that is drained of liquid by a cold heat transfer fluid pump 688 that also pumps the cold heat transfer fluid exiting the rotor back into the cold heat transfer fluid reservoir.

The cold heat transfer fluid inlet vapour space is sealed from the evacuated rotor casing by two seals; a polymer lip seal 690 that limits leakage when the rotor is stopped or rotating slowly but then stops sealing as centripetal accelerations cause it to stretch and lose contact with its sealing surface at high speeds thereby reducing wear and friction of the lip seal, the second seal 692 is a non-contact expeller seal also called a dynamic seal or repeller seal, that only seals when the barrier fluid contained within the inwards facing cavity of revolution 694 is driven to spin within the cavity by impeller disk 696 attached to the rotor at a sufficiently high speed to prevent differential gas pressures between the two sides of the disk overcoming the radial pressure gradient established in the barrier fluid. This prevents gas leakage between the two sides of the impeller disk once speeds are high enough. Expeller seals have low frictional losses, no wearing parts and the ability to keep sealing even when there is significant misalignment or radial oscillation of the rotor, but only seal when the rotational speeds are sufficiently high. The lip seal of this preferred configuration only seals at low speeds and so complements the operation of the expeller seal as a rotor vacuum seal. Barrier fluids for expeller seals acting as rotor vacuum seal preferably have low viscosity and low vapour pressure, with oils developed for vacuum applications preferred.

Drainage of the cold heat transfer fluid inlet vapour space by the cold heat transfer fluid pump reduces potential contamination of the barrier fluid by the cold heat transfer fluid. The barrier liquid of the expeller seal is subject to frictional heating during operation at high speed, and is cooled in operation by heat transfer to the cold heat transfer fluid flowing through the flow passages that pass through the inner diameter of the expeller seal impeller disk.

The warm heat transfer fluid 700 is stored in a warm heat transfer fluid reservoir 698 that preferably has a gas pressure in the space above the liquid approximately the same as the vapour pressure of the warm heat transfer fluid, and into which any fluid leakage from the rotary fluid coupling of the warm heat transfer fluid rotor inlet 702 or outlet 704 (physical detail of the couplings not shown) drains by gravity. A warm heat transfer fluid pump 706 pumps the warm heat transfer fluid through a filter 708 to remove any unwanted particulates or detritus before entering the rotor. The warm heat transfer fluid enters and exits the rotor through two complementary rotor vacuum seals. The first is an expeller seal 710 that only functions at high speeds, the second is a magnetic fluid seal 712 that uses a magnetic barrier fluid containing small ferromagnetic particles that is held in place by rings of magnetic flux passing between a ferromagnetic section of the rotor and stationary ring shaped permanent magnets mounted off of the rotor casing. The barrier liquid is held in ring shaped bands that can each withstand a fluid pressure differential of typically less than 20 kPa, and so multiple such bands must be utilised to withstand larger pressures. Magnetic fluid seals seal very well at low speeds or when stopped but typically have limited high speed capabilities as frictional heat and centripetal accelerations disrupt their ability to seal. The near perfect sealing of magnetic fluid seals at low speed usefully complements the near perfect sealing that expeller seals may achieve at high speeds.

The warm heat transfer fluid cools the barrier fluids of both the magnetic fluid seal and the expeller seal as it passes through flow passages in their respective inner diameters. The warm heat transfer fluid reservoir is cooled by a coolant fluid 714 by means of a heat exchanger 716.

Figure 30:
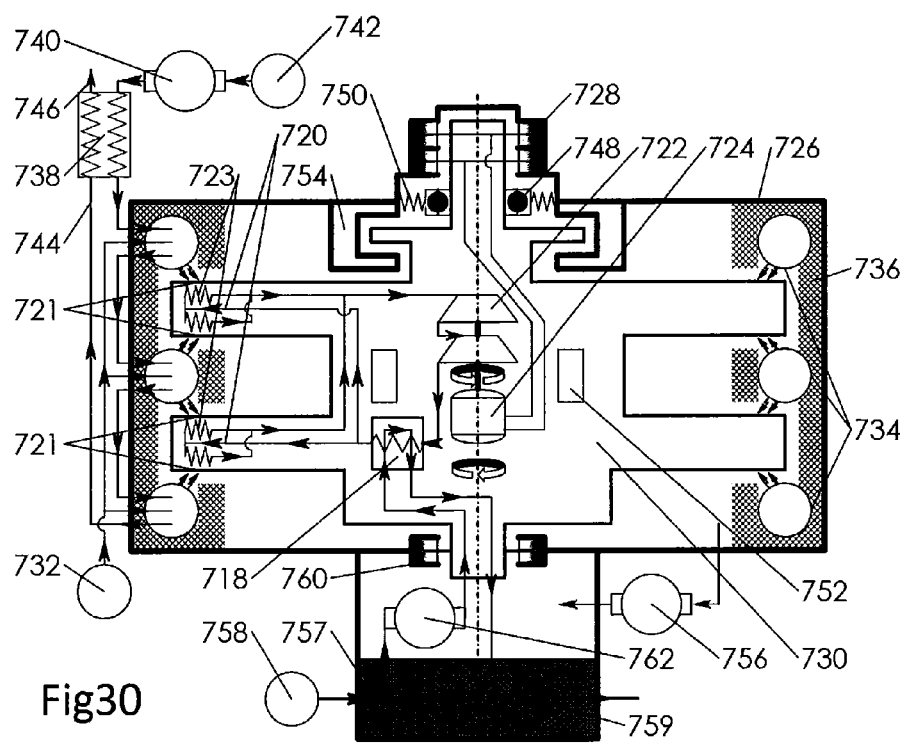
FIG. 30 shows a simplified flow diagram and cross section of a variant of the thermodynamic machine of the current invention configured as an engine, showing the general configuration of fluid flows within the engine, and illustrating multiple radiant receiver disks, combustion powered radiant tubes with multiple sequential combustion locations, a multistage power turbine with liquid metal rotary couple to transmit power and a single rotor bearing at one end of the rotor with the rotor axis aligned parallel to the externally applied acceleration.

A simplified flow diagram and cross section of an engine of the current invention in which multiple receiver disks are utilised and with a single rotor bearing is shown in FIG. 30. The thermodynamic cycle is similar to that of FIG. 11, but after flowing radially outwards through the working fluid cooler 718 the working fluid flow splits into two flow paths and the working fluid flows in parallel radially outwards undergoing preferably approximately adiabatic compression while flowing to near the periphery of the two receiver disks 720 and then flowing radially inwards absorbing heat by conduction from the radiative receiver area 721 on each side of each disk in the two circumferentially distributed hot heat exchangers 723. The working fluid then flows radially inwards with the flow branches from each disk joining back together to flow through a two stage power turbine 722 that is preferably of the dynamic type, being made up of radial or axial flow turbines linked together to drive the rotation of an electricity producing turbine generator 724 that preferably has a generator rotor containing permanent magnets attached to the turbines so as to reduce weight and increase efficiency. These dynamic turbines and generator have a rotation axis that is preferably coincident with the rotor axis and preferably rotates in the same direction with respect to the rotor that the rotor casing 726 does with respect to the rotor 730, effectively contra-rotating with respect to the rotor to reduce the absolute rotational speed of the turbine and generator and so reduce their bearing loads.

The turbine generator transmits electrical power to external loads by means of a liquid metal rotary coupling 728 in which the liquid metal preferably contains gallium.

The radiative receivers of the disks are heated by three radiative tubes 734 that encircle the rotor axis on each side of the disks and that are preferably made of a high temperature capable metal alloy or ceramic that is also preferably relatively impermeable to gases. A preferably cheap hydrocarbon fuel is combusted with air and blown through the interiors of these radiative tubes to heat them to high temperature. To reduce losses they are surrounded by high temperature insulation 736 leaving only the areas that face the radiative receivers open to radiate heat energy freely. To further enhance the efficiency of the radiative heater the hot combustion gases exhausted by the tube radiators 744 are directed through a recuperative heat exchanger 738 to preheat incoming air 742 pumped in by air blower 740 before it is mixed with air and combusted. The combustion gases flow sequentially through each radiator tube with progressively more fuel being added and combusted in each tube before being exhausted through the recuperator. A portion of the fuel is combusted in each radiator tube so as to limit the maximum combustion gas temperature and thereby do less damage to the radiator tubes and produce less harmful emissions. Preferably the amount of air introduced is limited to an amount that is only just sufficient to provide the oxygen required to fully burn the total flow of fuel, as this reduces the air and exhaust mass flow in the recuperator and air pump and reduces waste heat losses in the warm exhaust 746 from the recuperator.

The rotor is suspended from a single rotor bearing 748 mounted in a radially compliant bearing mount 750 so that the rotor axis is aligned parallel with the external acceleration applied to the thermodynamic machine. In most stationary applications the only external acceleration will be from gravity, but for some mobile or vehicular applications there may be variable acceleration directions in which case a gimbal that allows the rotor casing to be re-oriented to maintain parallel alignment of the rotor axis with the acceleration is preferred. A single bearing has the advantage of reduced frictional losses and may also make it possible to use a smaller diameter bearing with longer life and reduced friction. It may also eliminate seals that might otherwise be needed to prevent heat transfer fluids from coming into contact with the rotor bearing. Autobalancer 752 and the radially compliant bearing mount operate to maintain the turbine rotation axis approximately coincident with the rotor axis during high speed operation to reduce the loads on the turbine and generator bearings.

An axial flux motor 754 with axial flux motor stator mounted inside the rotor casing and axial flux motor rotor mounted off of the rotor accelerate and maintain the rotor speed at the required operational speed to overcome various frictional losses. The use of an axial flux motor reduces perturbing radial magnetic forces that might otherwise interfere with the operation of the rotor autobalancers that maintain the rotor's balance even as fluids move and change density within the rotor.

A vacuum pump 756 partially evacuates the rotor casing and vents into the vapour space of a coolant fluid reservoir that is cooled by an external coolant 758 in a heat exchanger 759 within the coolant fluid reservoir 757. The vacuum pump is preferably operated discontinuously to keep the vacuum pressure within the rotor casing between a desired lower and an upper limit. This reservoir vapour space is preferably at a pressure close to the vapour pressure of the coolant fluid. A rotary vacuum seal that is an expeller seal 760 is located between the vapour space of the coolant fluid reservoir and the interior of the rotor casing and is cooled by the coolant fluid that is pumped through passages within its inner diameter by coolant fluid pump 762. The expeller seal may advantageously accommodate some radial oscillation of the rotor while maintaining a gas tight seal.

Figure 31:
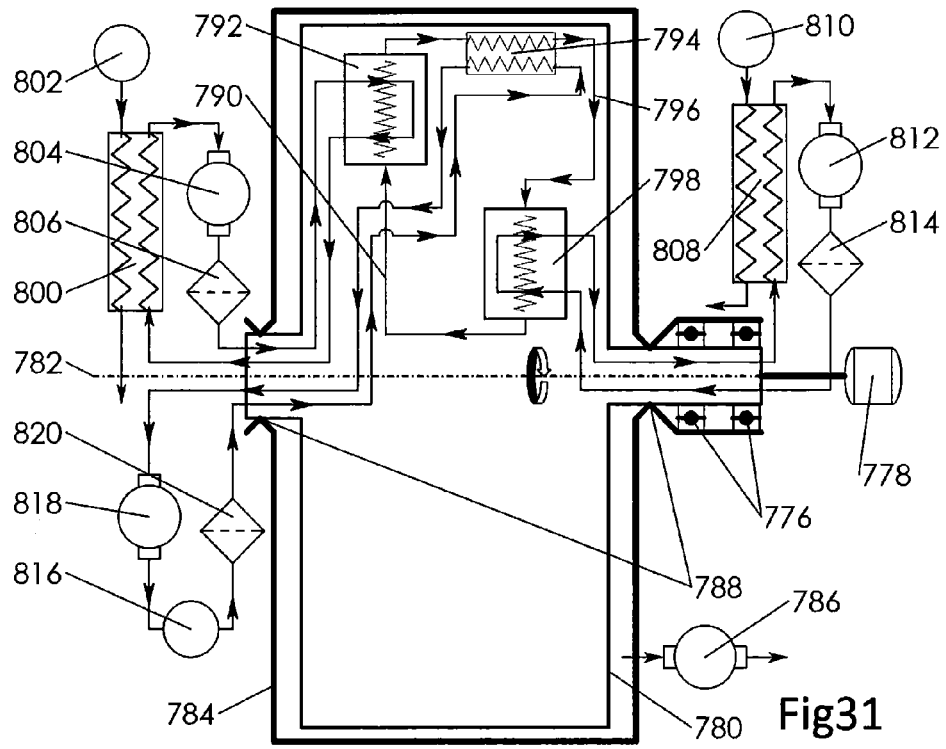
FIG. 31 shows a simplified flow diagram and cross section of a variant of the thermodynamic machine of the current invention configured as a heat pump, showing the general configuration of fluid flows within a heat pump that utilises a hot heating fluid to drive circulation of the working fluid and that has two rotor bearings at one end of the rotor and an external rotor drive motor.

FIG. 31 is a simplified flow diagram and cross section of a heat pump of the current invention that omits much detail and some components for the sake of clarity and shows the general configuration of fluid flows within a heat pump that utilises a centrifugal thermosiphon to generate the pressure gain required to circulate the working fluid through the heat pump cycle, and utilises an externally heated hot heating fluid to provide the heat energy that drives the working fluid centrifugal thermosiphon. The working fluid is circulated about a hermetically sealed working fluid circulation path within a rotor 780 that spins on rotor bearings 776 about a rotor axis 782 driven by a rotor motor 778 and within a rotor casing 784 that is partially evacuated by a vacuum pump 786 to reduce the rotor windage to a low value. Rotor vacuum seals 788 provide a rotary seal between the spinning rotor and the rotor casing at each axial end of the rotor through which fluids may enter and exit the rotor in fluid isolation from the partially evacuated space between the rotor and the rotor casing.

The working fluid that is preferably primarily one or more of a list that includes xenon, krypton and argon is circulated about a hermetically sealed working fluid circulation path within the rotor. The working fluid flows radially outwards through compression passages 790 undergoing compression and heating due to the action of rotor centripetal accelerations upon the working fluid with preferably little heat transfer into or out of the working fluid. The working fluid then flows radially outwards through the working fluid cooler 792, a heat exchanger in which the working fluid is cooled by heat transfer to the warm heat transfer fluid while simultaneously undergoing further compression in a process that preferably approximates an isothermal compression process. The working fluid then flows through a hot heat exchanger 794 at or near the maximum radius of the rotor in which it is heated by the flow of hot heating fluid, the hot heat exchanger is preferably a counter-flow heat exchanger in order to raise the temperature of the working fluid as much as possible for a given rotor inlet temperature of hot heating fluid. The working fluid then flows radially inwards through expansion passages 796 undergoing expansion and cooling due to the action of rotor centripetal accelerations upon the working fluid. To complete the working fluid circulation path the working fluid then flows radially inwards through the cold working fluid heater 798, a heat exchanger in which the working fluid is heated by heat transfer from the cold heat transfer fluid while simultaneously undergoing further expansion in a process that preferably approximates an isothermal expansion process.

The warm heat transfer fluid and cold heat transfer fluid both enter and exit the rotor via fluid couplings on the rotor axis at each end of the rotor, additionally it is preferred that the hot heating fluid also enters and exits the rotor at the same end as the warm heat transfer fluid. The warm heat transfer fluid is cooled externally to the rotor in an off rotor cooler 800 where it may be utilised for heating purposes and transfers heat to a heat sink fluid 802 that will in most cases be air, water or an alcohol. The warm heat transfer fluid then passes through a warm heat transfer fluid pump 804 and a warm heat transfer fluid filter 806 to remove detritus before it re-enters the rotor. In some instances the warm heat transfer fluid pump may not be required as it may be possible to rely entirely upon the centrifugal thermosiphon within the warm heat transfer fluid that is within the rotor to produce the pressure gain necessary to circulate the warm heat transfer fluid, or the pump may be integrated into the rotor fluid coupling with the warm heat transfer outlet from the rotor acting as a centrifugal pump powered by the rotor motor. The filter may not always be necessary and the warm heat transfer fluid may simply be supplied from a large reservoir rather than being cooled by heat transfer to another heat sink fluid. The cold heat transfer fluid is warmed externally to the rotor in an off rotor heater 808 where it may be utilised for cooling purposes and absorbs heat from a heat sink fluid 810 that will in most cases be air, water or an alcohol. The cold heat transfer fluid then passes through a cold heat transfer fluid pump 812 and a cold heat transfer fluid filter 814 to remove detritus before it re-enters the rotor. In some instances the pump may be integrated into the rotor fluid coupling with the cold heat transfer outlet from the rotor acting as a centrifugal pump. The filter may not always be necessary and the cold heat transfer fluid may simply be supplied from a large reservoir rather than being warmed by heat transfer to another heat sink fluid. The hot heating fluid is heated externally to the rotor in an external hot heater 816 by a heat source, examples of which may include: geothermal heat, solar heat, engine exhaust heat, engine coolant, nuclear heat or combustion of a fuel. The hot heating fluid is pumped by hot heating fluid pump 818 to overcome the retarding pressure of the hot heating fluid's centrifugal thermosiphon within the rotor and is filtered by hot heating fluid filter 820 prior to entering the rotor, though this filter may not always be necessary, and the hot heating fluid pump may potentially be integrated as a dynamic pump within the rotors hot heating fluid outlet. There are numerous fluids that the hot heating fluid may be composed of. At high temperatures liquid alkali metals or ionic compounds are preferred hot heating fluids, while hydrocarbons or water are preferred for lower temperatures, gaseous hot heating fluids may also be employed, with air, hydrogen and helium being preferred examples.

This configuration of heat pump is advantageous as it can potentially extract energy for heating or cooling purposes from a fluid stream such as an engine coolant or engine exhaust, even at relatively low temperatures, and may thus reduce overall energy consumption.

Figure 32:
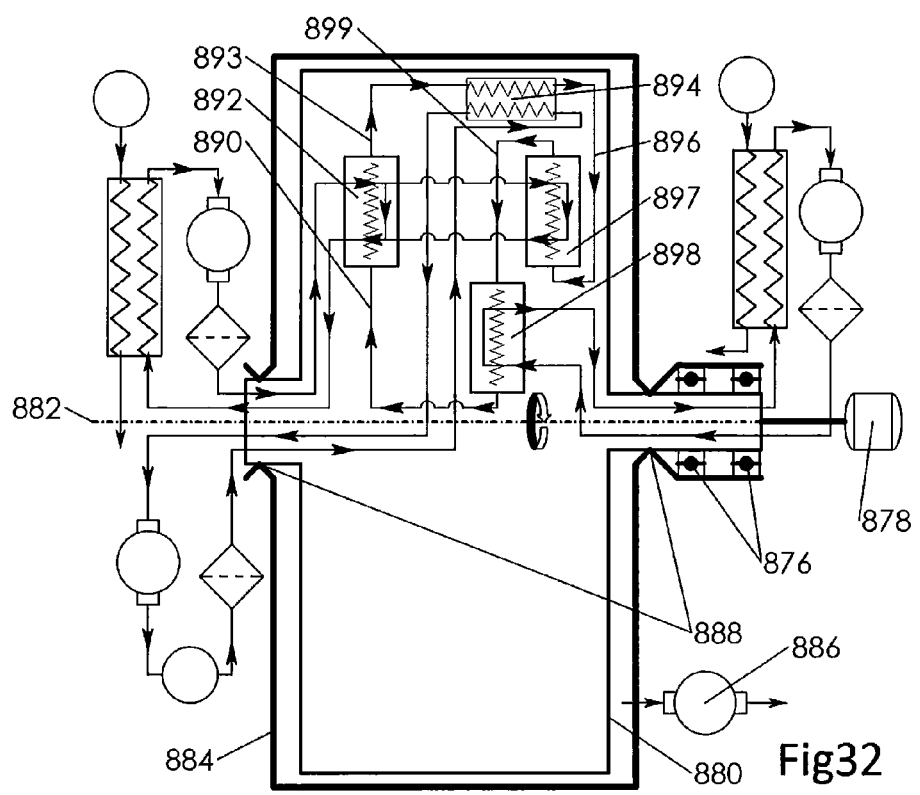
FIG. 32 shows a simplified flow diagram and cross section of a variant of the thermodynamic machine of the current invention configured as a heat pump, showing the general configuration of fluid flows within a heat pump that utilises a hot heating fluid to drive circulation of the working fluid, and splits the working fluid cooling process in the working fluid circulation path into a portion preceding the hot working fluid heater and a portion subsequent to the hot working fluid heater. The heat pump having two rotor bearings at one end of the rotor and an external rotor drive motor.

FIG. 32 is a simplified flow diagram and cross section of a heat pump of the current invention that omits much detail and some components for the sake of clarity and shows the general configuration of fluid flows within a heat pump that is the same as the hat pump of FIG. 31 excepting some differences in the working fluid flow path within the rotor.

The working fluid is circulated about a hermetically sealed working fluid circulation path within a rotor 880 that spins on rotor bearings 876 about a rotor axis 882 driven by a rotor motor 878 and within a rotor casing 884 that is partially evacuated by a vacuum pump 886 to reduce the rotor windage to a low value. Rotor vacuum seals 888 provide a rotary seal between the spinning rotor and the rotor casing at each axial end of the rotor through which fluids may enter and exit the rotor in fluid isolation from the partially evacuated space between the rotor and the rotor casing.

The working fluid that is preferably primarily one or more of a list that includes xenon, krypton and argon is circulated about a hermetically sealed working fluid circulation path within the rotor. The working fluid flows radially outwards through compression passages 890 undergoing compression and heating due to the action of rotor centripetal accelerations upon the working fluid with preferably little heat transfer into or out of the working fluid. The working fluid then flows radially outwards through the working fluid cooler 892, a heat exchanger in which the working fluid is cooled by heat transfer to the warm heat transfer fluid while simultaneously undergoing further compression in a process that preferably approximates an isothermal compression process. The working fluid then flows radially outwards through compression passages 893 undergoing further preferably approximately adiabatic compression and heating and then flows through a hot heat exchanger 894 at or near the maximum radius of the rotor in which it is heated by the flow of hot heating fluid, the hot heat exchanger is preferably a counter-flow heat exchanger in order to raise the temperature of the working fluid as much as possible for a given rotor inlet temperature of hot heating fluid. The working fluid then flows radially inwards through expansion passages 896 undergoing expansion and cooling due to the action of rotor centripetal accelerations upon the working fluid and then flows radially outwards through a second working fluid cooler 897 a heat exchanger in which the working fluid is cooled by heat transfer to the warm heat transfer fluid while simultaneously undergoing further compression in a process that preferably approximates an isothermal compression process. The working fluid then flows radially inwards through expansion passages 899 undergoing expansion and cooling. To complete the working fluid circulation path the working fluid then flows radially inwards through the cold working fluid heater 898, a heat exchanger in which the working fluid is heated by heat transfer from the cold heat transfer fluid while simultaneously undergoing further expansion in a process that preferably approximates an isothermal expansion process.

Figure 33:
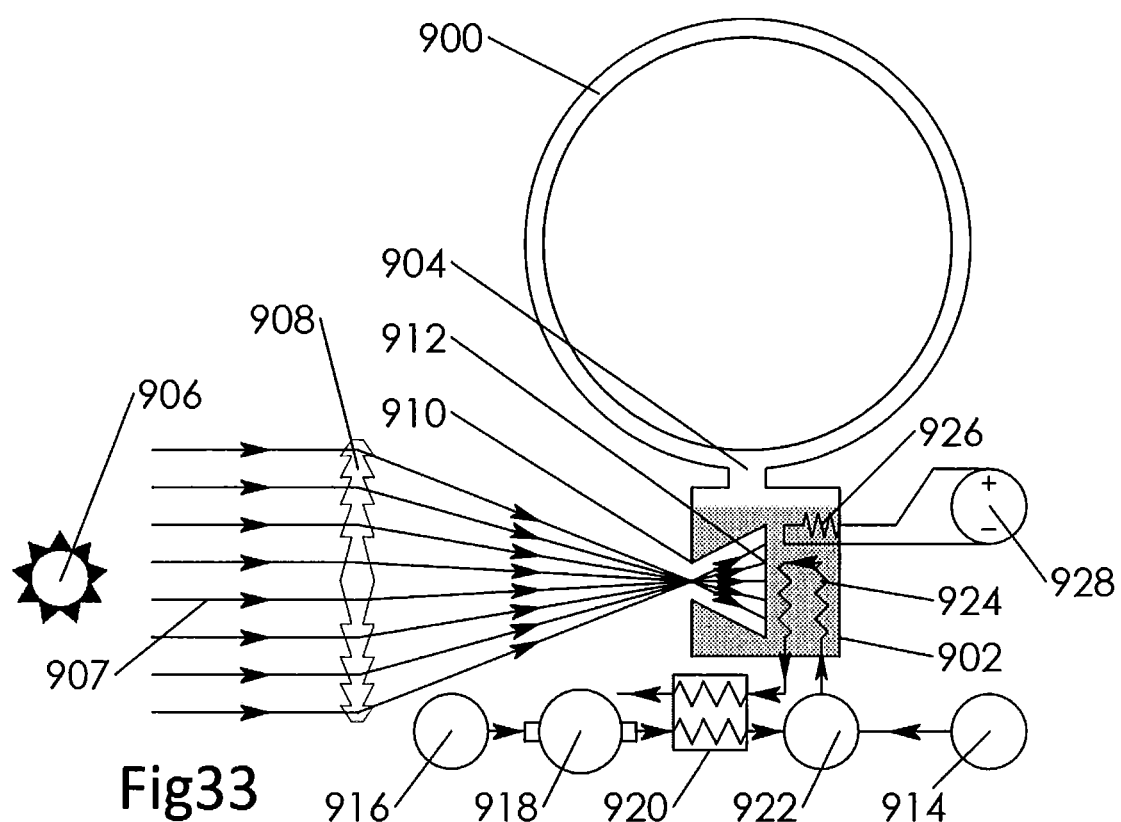
FIG. 33 shows a simplified flow diagram of a heat pipe radiant tube with attached heat pipe boiler that can be used to provide heat energy to the radiant receivers of the rotors of some variants of the thermodynamic machine of the current invention. The heat pipe boiler is configured to accept heat from concentrated solar radiation, or combustion of a fuel, or electrical heating.

FIG. 33 is a simplified cross sectional diagram of a heat pipe radiant tube for transmitting radiant heat energy to a radiant receiver attached to the rotor in a thermodynamic machine of the current invention, shown in isolation from the rest of the thermodynamic machine for clarity. The hollow radiant tube 900 is formed as a complete circle that when installed in a thermodynamic machine of the current invention is centred on the rotor axis. The tube forms the condensing surface for the heat pipe, in which vapour that is created in the boiler 902 condenses on the inner surface of the tube to form a condensate liquid that then flows back into the boiler under the influence of gravity or other acceleration applied in use by means of the connecting neck 904. Many types of fluid may be employed within the boiler, depending on the temperature range that it is desired to achieve. Likely candidate fluids for the heat pipe are, Caesium, Potassium, Sodium and Lithium.

The heat pipe boiler is a metallic container coated in thick thermal insulation that provides a more flexibility for the application of various sources of heating, and may be efficiently heated by more than one source of heat. Three different heat sources are illustrated. The first is a concentrated solar radiation 907 from the sun 906, concentrated by a Fresnel lens 908, into a small aperture 910 in the heat pipe boiler that opens out into a solar receiving cavity 912 in which the heat energy can be absorbed through the walls to boil the fluid within the heat pipe boiler. When available concentrated sunlight may provide a cheap and clean source of power for thermodynamic machines of the current invention that is very useful for cooling in sunny climates. The use of a parabolic mirror is also a preferred solution for concentrating sunlight for the heat pipe boiler.

The second heat source illustrated utilises a fuel 914 that is mixed with air 916 that is pumped by air blower 918 in through a pre-heating recuperative heat exchanger 920 to burn in a combustor 922 and then pass through a heat exchanger 924 within the heat pipe boiler to boil the fluid before passing the exhaust back through the recuperator to preheat the incoming air. The use of a recuperator reduces waste heat losses in the exhaust gases. The ability to utilise a combustible fuel to supplement solar power for the purposes of heating, cooling or electricity is likely to be highly advantageous for many installations.

The third heat source illustrated is a simple resistive heater 926 powered by an electrical supply 928. This would be useful only for heat pumps when there is no other source of cheaper heat energy available, and only for heat pumps of the current invention that do not have an internal compressor.

The invention claimed is:

1. A thermodynamic machine, comprising:
   a rotor, configured to rotate about a rotor axis in use, a working fluid circulation path and at least one coolant fluid path formed within the rotor, the coolant fluid path fluidically isolated from the working fluid circulation path, the working fluid circulation path spanning substantially radially from at or near the rotor axis to close to the periphery of the rotor, the working fluid circulation path sealed at least within the rotor;
   a working fluid circulation drive configured to drive the circulation of a working fluid about the working fluid circulation path;
   at least one working fluid cooler heat exchanger formed as part of the working fluid circulation path and the coolant fluid path, and configured so that in use coolant fluid passing through the working fluid cooler heat exchanger is in close proximity to working fluid so that heat is transferred from the working fluid to the coolant fluid;
   at least one working fluid heater formed as part of the working fluid circulation path within the rotor configured to heat a working fluid circulating around the working fluid circulation path;
   the heat exchanger forming a substantially annular body about the rotor axis, the working fluid circulation path within the heat exchanger configured so that the working fluid flows radially inwards or outwards through multiple working fluid flow channels simultaneously, each channel shaped to spiral outwards from the rotor axis, the working fluid flow spiral channels arrayed circumferentially and axially.

2. A thermodynamic machine as claimed in claim 1 wherein the spiral channels reduce in cross-sectional area with increasing radius.

3. A thermodynamic machine as claimed in claim 1 wherein the heat exchanger further comprises multiple coolant fluid channels and/or heating fluid channels.

4. A thermodynamic machine as claimed in claim 1 wherein the spiral flow channels for each fluid are axially arrayed to form axial spiral columns of multiple channels with the same fluid flowing through them, the columns aligned substantially parallel to the axis of the rotor, the heat exchanger further comprising a plurality of fins.

5. A thermodynamic machine as claimed in claim 1 wherein the spiral flow channels for each fluid are axially arrayed to form axial spiral columns of multiple channels with the same fluid flowing through them, the columns twisted helically about the rotor axis, the heat exchanger further comprising a plurality of fins aligned substantially perpendicularly to the rotor axis and located in the heat exchanger to separate axially adjacent spiral flow channels.

6. A thermodynamic machine as claimed in claim 4 wherein circumferentially adjacent spiral flow channel columns alternate between conveying working fluid and conveying coolant fluid or heating fluid.

7. A thermodynamic machine as claimed in claim 1 wherein the working fluid flow channels within the one or more heat exchangers are at least in part formed from axial layers of metallic foil component parts bonded together into a monolithic body.

8. A thermodynamic machine as claimed in claim 7 wherein the axial layers of metallic foil component parts are bonded by brazing of a surface coating alloy that is present on at least some of the metallic foil component parts of the heat exchanger.

9. A thermodynamic machine as claimed in claim 1 further comprising a hot working fluid heater and wherein the working fluid circulation path is at least in part configured to act as a centrifugal thermosiphon for the working fluid, so that heat energy input is made within the hot working fluid heater to the working fluid circulating around the working fluid circulation path at an average radius that is greater than the average radius where that same heat energy is extracted from the working fluid, the centrifugal thermosiphon heat energy input to the working fluid made at or near the outermost radius of the rotor, the centrifugal thermosiphon heat energy input to the working fluid made in the hot working fluid heater, the thermodynamic machine further comprising a radiative receiver configured to receive heat energy by way of radiative heat transfer from a radiant heat source, the hot working fluid heater heated by conduction from the radiative receiver.

10. A thermodynamic machine as claimed in claim 9 wherein the hot working fluid heater is configured so that a majority of the heat energy added to the working fluid flowing through the hot working fluid heater is added while the working fluid is flowing from a larger radius to a smaller radius.

11. A thermodynamic machine as claimed in claim 1 further comprising an axial connection passage or passages at the radial inner and/or outer ends of the spiral flow channels to distribute or collect fluid flows to or from axially adjacent spiral flow channels.

12. A thermodynamic machine as claimed in claim 1 wherein the spiral channels of the heat exchanger are formed from an axial stack of generally annular outline laminates having perforations and/or other features cut through them and/or into one or both axial faces, the laminates axially stacked and bonded together into a solid generally annular or cylindrical block so that the perforations and/or features form internal fluid flow passages for working fluid and coolant fluid or heating fluid within the heat exchanger laminate stack.

13. A thermodynamic machine as claimed in claim 12 wherein at least some of the component laminate parts are pre-plated or clad with soldering or brazing alloys before bonding so that the soldering or brazing alloys form a bond between the laminate parts during the laminate bonding process.

14. A thermodynamic machine as claimed in claim 13 wherein the laminate stack is of the type formed by the application of axial pressure during the bonding process.

15. A thermodynamic machine as claimed in claim 1 wherein the heat exchanger further comprises an axial end plate or plates at one or both axial ends having a thickness greater than the average of the individual laminate component parts arranged at one or both axial ends of the heat exchanger.

16. A thermodynamic machine as claimed in claim 15 wherein the structural bond between the axial end plate or plates and the laminate stack is of the type formed by the application of axial pressure to the plates and laminate stack during the bonding process.

17. A thermodynamic machine as claimed in claim 15 wherein the heat exchanger is configured so that one or both of the fluids in the heat exchanger pass through one or both of the axial end plate or plates.

18. A thermodynamic machine as claimed in claim 1 wherein the heat exchanger further comprises a tensile retaining ring of high strength material enclosing the outer radius of the laminate stack and/or the axial end plates, in use the tensile retaining ring applying compressive pre-load on the laminate stack.

19. A thermodynamic machine as claimed in claim 1 wherein the axial layers of metallic foil are formed from one or more alloys of which aluminium or copper is the majority constituent.

20. A thermodynamic machine as claimed in claim 1 wherein the heat exchanger further comprises axial clamping features connected and configured to in use resist axial pressure loads within the axial layers of metallic foil.

21. A thermodynamic machine as claimed in claim 20 wherein the heat exchanger further comprises tensile load carrying material configured to carry tensile axial loads at a radius outside the outer radial extent of the spiral flow channels and/or inside the inner radial extent of the spiral flow channels.

22. A thermodynamic machine as claimed in claim 1 wherein the thermodynamic machine further comprises a filter or filters configured for filtering one or more of the fluids that enter rotor prior to the fluid or fluids entering the rotor.

23. A thermodynamic machine as claimed in claim 1 further comprising a casing, and an electrical motor located within the casing and configured to rotate the rotor in use, the electrical motor of the axial flux type.

24. A thermodynamic machine as claimed in claim 1 further comprising a pump configured to maintain the fluid flow within the rotor of either a warm heat transfer fluid that is a coolant fluid flowing through the working fluid cooler, or a cold heat transfer fluid that flows through the cold working fluid heater, or a coolant fluid flowing along the coolant fluid path formed within the rotor, or a hot heating fluid flowing within the rotor, or any selection of fluids that enter the rotor, the pump integrated into a fluid outlet from the rotor, such that in use the rotor fluid outlet acts as an impeller that increases the fluid's angular momentum relative to the fluid inlet about the rotor axis and in the direction of rotor rotation.

25. A thermodynamic machine as claimed in claim 9 further comprising a casing, the rotor at least partially enclosed within the casing, and wherein the radiant heat source is a radiator mounted within the casing, the casing at least partially thermally insulated to reduce heat transfer to the casing from the radiator and the rotor, the radiator formed from one or more radiator tubes containing gases, or liquids, or both, from which the heat energy is transferred to the radiator tube(s).

26. A thermodynamic machine as claimed in claim 25 wherein the radiator tube(s) is/are configured to be heated by combustion gases of the type produced by burning a fuel in air.

27. A thermodynamic machine as claimed in claim 26 wherein fuel is mixed and combusted with air in the radiator tube(s) in distinct sequential zones as the air flows through the radiator tube(s).

28. A thermodynamic machine as claimed in claim 26 further comprising a regenerative or recuperative heat exchanger that uses heat energy from the combustion gases exhausted from the radiator tube(s) to pre-heat the incoming air before it is combusted with fuel to heat the radiator tube(s).

29. A thermodynamic machine as claimed in claim 26 further comprising a fan at the air inlet that blows air and combustion gases through the radiator tube(s).

30. A thermodynamic machine as claimed in claim 25 wherein the thermodynamic machine further comprises an aperture in the rotor casing configured so that solar radiation can be directed in use onto the radiative receiver.

31. A thermodynamic machine as claimed in claim 25 wherein the radiative receiver comprises at least one generally annular radiative receiver area extending radially inwards from the periphery of one or both sides of at least one generally disc shaped radiative receiver structure formed as part of the rotor with an axis of revolution coincident with the rotor axis and extending outwards to substantially the maximum radius of the rotor.

32. A thermodynamic machine as claimed in claim 31 wherein annular radiative receiver areas extend radially inwards from the periphery of both axial sides of at least one disc shaped radiative receiver structure.

33. A thermodynamic machine as claimed in claim 31 wherein the hot working fluid heater is formed from a plurality of working fluid flow passages bonded to or formed within the disc shaped radiative receiver structure within the radial span of the annular radiative receiver area(s).

34. A thermodynamic machine as claimed in claim 31 wherein for at least one disc shaped radiative receiver structure a plurality of working fluid flow passages are arranged to extend approximately radially outwards to the annular radiative receiver area or areas and are substantially evenly spaced around the rotor axis with alternating radial outward flow where the working fluid is compressed and radial inward flow where the working fluid expands.

35. A thermodynamic machine as claimed in claim 31 wherein there are multiple disc shaped radiative receiver structures arrayed axially along the rotor, radiators attached to the casing located between each axially adjacent pair of discs.

36. A thermodynamic machine as claimed in claim 23 further comprising a dynamic compressor internal to the rotor, the compressor supported on at least one gas lubricated bearing or at least one ceramic rolling element bearing.

37. A thermodynamic machine as claimed in claim 23 further comprising a dynamic turbine internal to the rotor, the turbine supported on at least one gas lubricated bearing or at least one ceramic rolling element bearing.

38. A thermodynamic machine as claimed in claim 23 further comprising at least one rotor vacuum seal sealing between the rotor and the casing, the space between the rotor and the casing adjacent the maximum radius of the rotor maintained in partial or complete fluid isolation from the ambient atmosphere surrounding the casing, one or more heat transfer fluids entering and exiting the rotor through the centre of the rotor vacuum seals, and wherein a vapour space maintained adjacent the higher pressure side of the one or more rotor vacuum seals has a liquid drain configured to drain any coolant fluid or heating fluid liquid that in use accumulates in this space.

39. A thermodynamic machine as claimed in claim 38 wherein the rotor is configured so that a coolant fluid or heating fluid that passes into the rotor can be drained from the spaces directly adjacent the rotor vacuum seal by gravity.

40. A thermodynamic machine as claimed in claim 38 wherein one or more of the fluids that passes into and out of the rotor has a free surface within the fluidically connected volumes that the fluid occupies outside of the rotor, the free surface maintained at a pressure substantially lower than atmospheric pressure and/or at a pressure approximately equal to the vapour pressure of the coolant fluid or heating fluid at that location.

41. A thermodynamic machine as claimed in claim 38 wherein at least one rotary vacuum seal is a dynamic/expeller/repeller seal.

42. A thermodynamic machine as claimed in claim 38 wherein at least one rotary vacuum seal is a magnetic fluid seal.

43. A thermodynamic machine as claimed in claim 42 wherein the magnetic fluid seals are combined with dynamic seals that provide sealing at high rotor speeds.

44. A thermodynamic machine as claimed in claim 43 wherein the thermodynamic machine further comprises a vacuum pump connected to the casing to partially evacuate the casing in use, the vacuum pump configured to operate intermittently to maintain the vacuum pressure below a required level.

45. A thermodynamic machine as claimed in claim 43 wherein the thermodynamic machine further comprises a vacuum pump connected to the casing to partially evacuate the casing in use, wherein the vacuum pump is configured to vent gases from inside the rotor casing into a fluid that enters and exits the rotor on the higher pressure side of one or both rotor vacuum seal/s.

46. A thermodynamic machine as claimed in claim 1 wherein the thermodynamic machine further comprises rotor bearing(s) at one or both ends of the rotor, the rotor bearings and/or the rotor bearings mounts having low radial stiffness so that the maximum rotational speed of the rotor in use is above the first natural radial frequency of oscillation for the rotor in the low radial stiffness rotor bearings and/or rotor bearing mounts.

47. A thermodynamic machine as claimed in claim 1 wherein in use the rotor axis is aligned parallel to the direction of the combined gravitational and inertial acceleration applied to the rotor.

48. A thermodynamic machine as claimed in claim 47 further comprising one or more autobalancers which comprise rolling elements that are free to circulate within an annular cavity centred on rotor axis, the autobalancer configured to passively redistribute the autobalancer rolling elements to bring the rotor centre of mass into close alignment with the rotor axis.

\* \* \* \* \*